United States Patent [19]

Ehrlich et al.

[11] 4,117,278
[45] Sep. 26, 1978

[54] SERVICE OBSERVING TERMINAL

[75] Inventors: Marilyn Carol Ehrlich; Roy Leonard Schafersman, both of Columbus, Ohio

[73] Assignee: Bell Telephone Laboratories, Incorporated, Murray Hill, N.J.

[21] Appl. No.: 834,252

[22] Filed: Sep. 19, 1977

[51] Int. Cl.² ............................................. H04M 3/22
[52] U.S. Cl. .............................. 179/175.2 C; 340/518
[58] Field of Search ................. 179/175.2 C, 175.2 R, 179/2 A, 15 BF, 15 BA, 9, 10, 12; 364/200; 340/412, 413, 414

[56] References Cited

U.S. PATENT DOCUMENTS

| | | | |
|---|---|---|---|
| 2,709,722 | 5/1955 | Rosene | 179/175.2 |
| 2,981,806 | 4/1961 | Middaugh | 179/175.2 |
| 3,420,968 | 1/1969 | Hays | 179/175.2 |
| 3,704,348 | 11/1972 | McIntosh et al. | 179/175.2 |
| 3,757,307 | 9/1973 | Cosserat et al. | 364/200 |
| 3,969,594 | 7/1976 | DeLuca et al. | 179/175.3 R |
| 3,980,839 | 9/1976 | Hutcheson | 179/175.2 R |
| 3,988,718 | 10/1976 | Filloux | 179/175.2 C |
| 4,056,684 | 11/1977 | Lindstrom | 179/5 R |

OTHER PUBLICATIONS

*Automatic Electric Technical Journal,* Jan. 1971, "Centralized Service Observation", pp. 190–196, by Flamini.
*Ericsson Review,* vol. 49, No. 4, 1972, "Centralized Maintenance in Zagreb Telephone District", pp. 114–123 by Balastrin et al.

*Primary Examiner*—Douglas W. Olms
*Attorney, Agent, or Firm*—Dwight A. Marshall

[57] ABSTRACT

A terminal for use in a service observing system which collects service observing data at a plurality of geographically dispersed locations and forwards the collected information to a central unit for evaluation. Terminal apparatus at each location scans for incoming service observing data generated from an associated group of service observing circuits which bid for connection to the central unit by placing requests with the service observing terminal. Not all requests are sent to the central unit for evaluation in that the terminal contains internal circuitry which allows control of the service observing bids forwarded to the central unit. Specifically, a memory is provided in the terminal to store the in-service or out-of-service operational status of each of the service observing circuits as determined by the central unit. Update circuitry is provided so that the central unit may change the operational status of selected ones of the service observing units during system operation. Requests from out-of-service circuits are ignored at the terminal in accordance with the status stored in the memory. One in-service circuit which is requesting service is selected by the terminal and its identity forwarded to the central unit along with a service request bid. If the bid is accepted for evaluation, information is collected, formatted, and sent to the central unit by the terminal apparatus.

22 Claims, 30 Drawing Figures

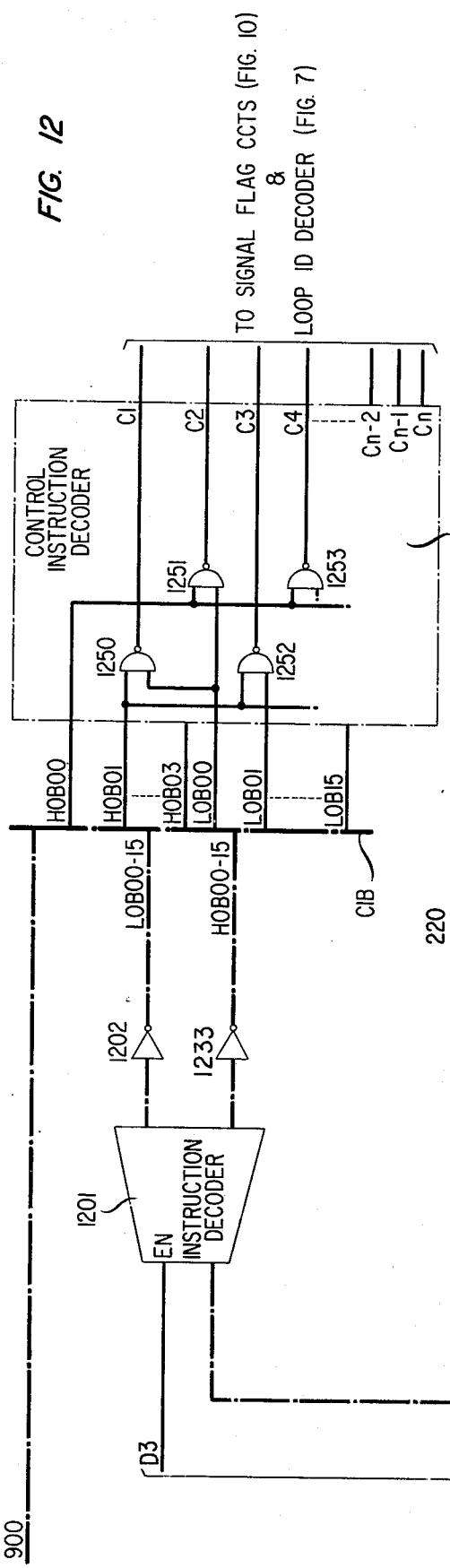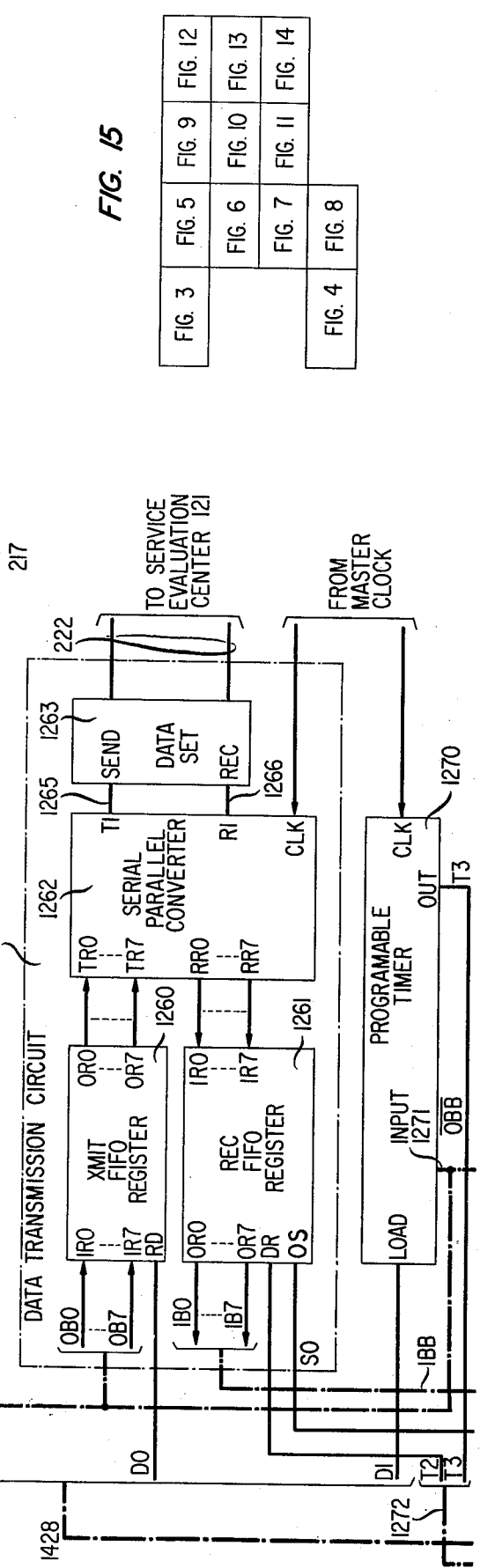
FIG. 12
FIG. 15

CLOCK WAVEFORM

DATA MOVEMENT

ARITHMETIC OPERATION

TEST OPERATON

DIRECT LOADING

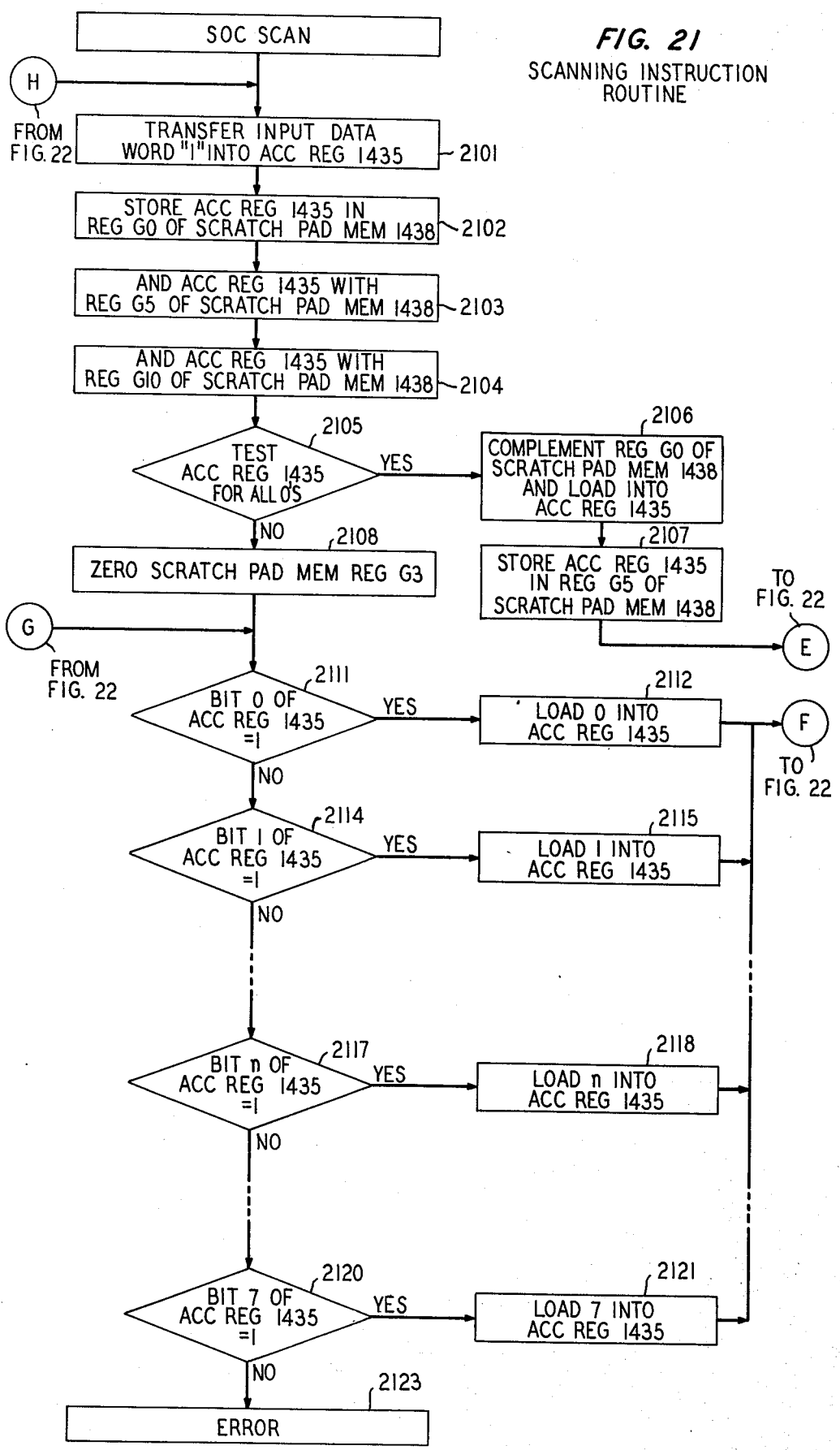

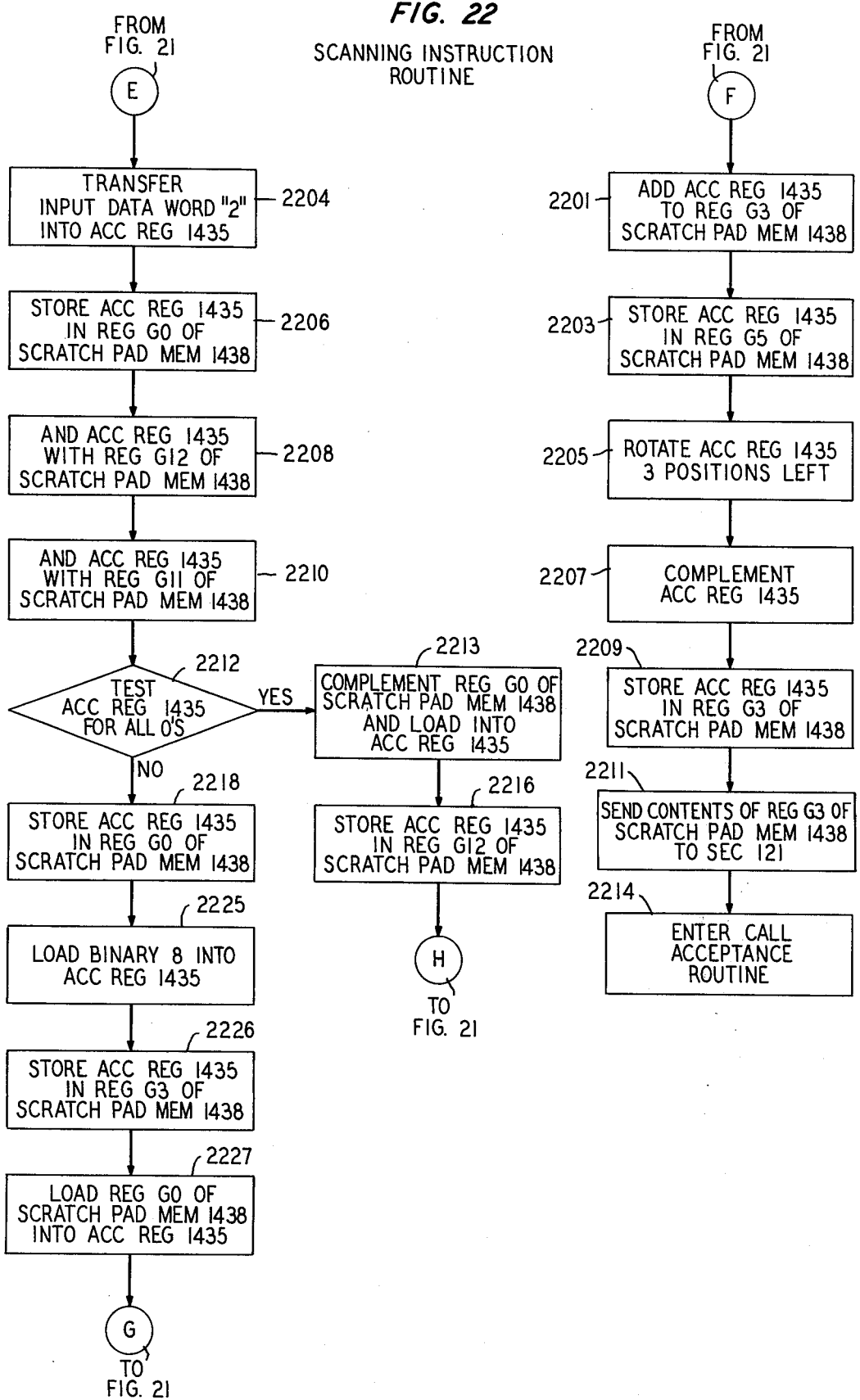
FIG. 22 SCANNING INSTRUCTION ROUTINE

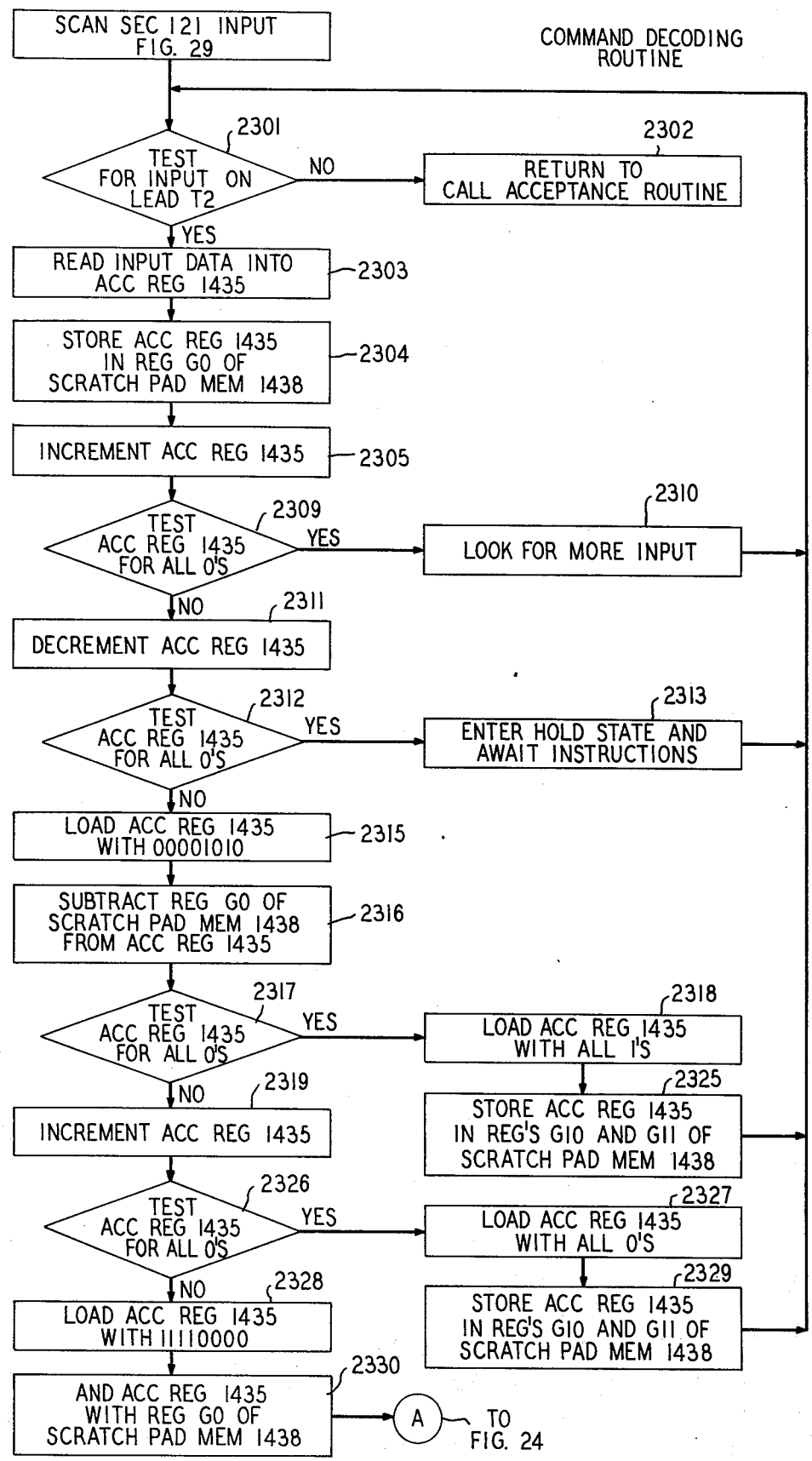

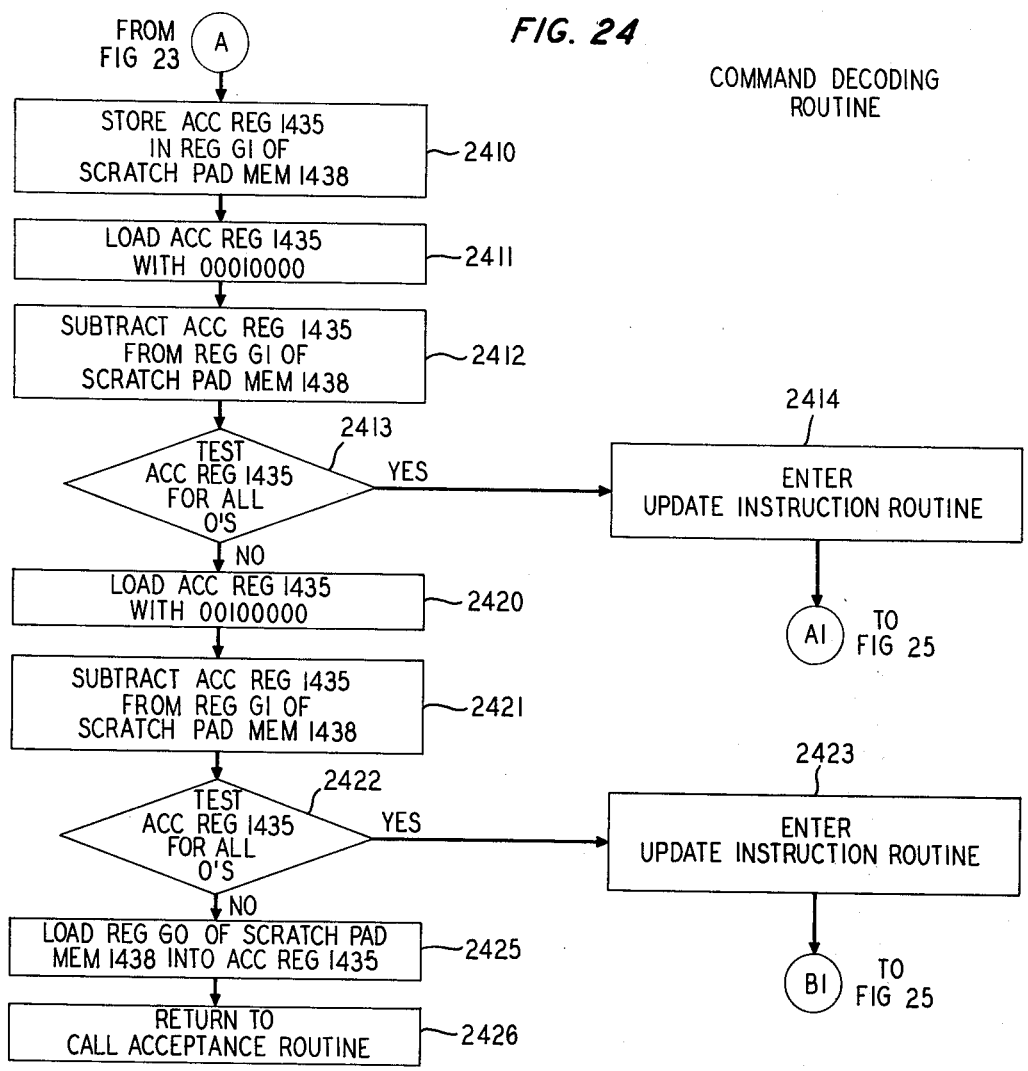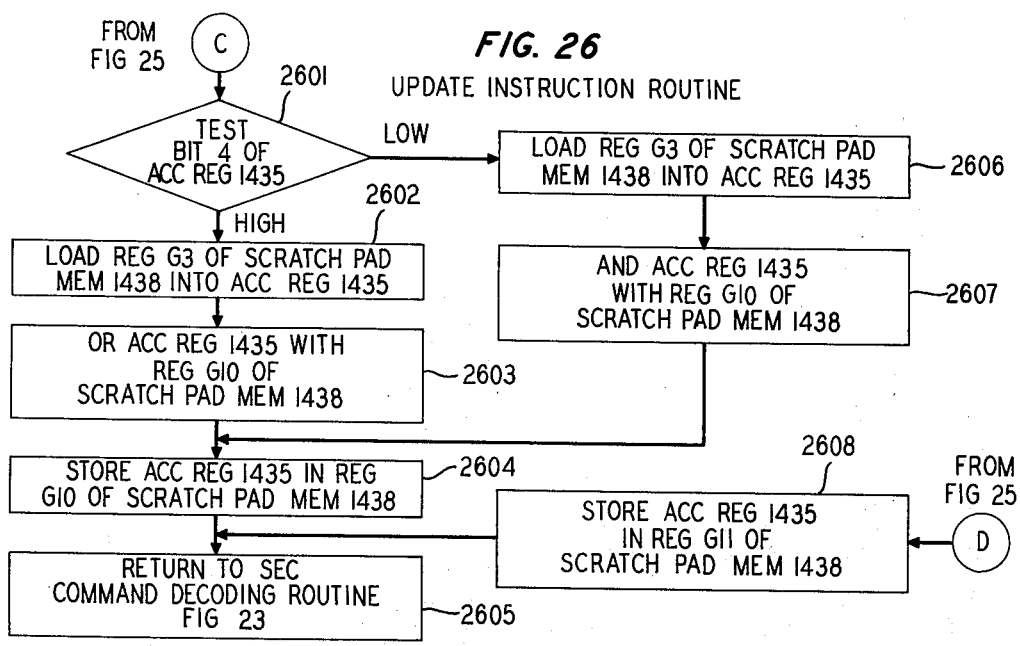

UPDATE INSTRUCTION ROUTINE

CALL ACCEPTANCE ROUTINE

SERVICE OBSERVING TERMINAL

FIELD OF THE INVENTION

This invention relates to service observing systems for monitoring the quality of service provided to telephone customers. In particular, the invention relates to service observing systems which collect data at a plurality of geographically dispersed locations and forward the collected data to a central unit for evaluation.

BACKGROUND OF THE INVENTION

In order to check the quality of service provided to customers, it is common practice for telephone companies to selectively monitor service aspects of calls placed through their equipment. Service observing systems have been designed in which a trained service observer may determine the quality of service by electrically monitoring various conditions during a call. In addition, many automatic service observing systems are available which can electrically monitor quantities such as the time for dial tone to be connected, the electrical characteristics of numbers dialed by the customer, and the various time intervals involved in the switching connection of the call. However, certain factors such as the quality of operator assistance provided to the customer can still be best monitored by the use of trained service personnel.

In order to make efficient use of service personnel, many systems have been developed which allow service personnel located in one area to monitor call conditions over a wide geographical area. For example, one system allows a service observer to dial a connection to a remotely located service observing unit over ordinary telephone lines. After the connection to the service observing unit is complete, the observer dials a further number which directs a selector switch located at the remote location to connect to telephone equipment associated with the unit for monitoring. Another system records call information on magnetic tape at a remote unit, and the tape is later sent to a central location for evaluation. In yet another type of system, trained evaluation personnel are located at a central position. Each evaluator can be connected via distributing switches to any of a plurality of register-senders. Each of the register-senders in turn communicates with a remote allotter circuit that can select one of a plurality of associated service observing lines. In operation, an idle evaluator is connected to an idle register-sender by the distribution circuitry. When the register-sender is connected, it activates a dedicated allotter unit which thereupon selects telephone equipment for observation.

In all of the above systems, however, no apparatus is provided for discriminating among signals incoming to the central location, thus all data which is generated by the remote service observing circuits is accepted for evaluation. In some situations, particularly in a large centralized service observing system, it is convenient if the central location can selectively accept service observing information from the remote circuits. For example, it has been recognized that certain types of observing equipment are slower in providing observation information than other types. Illustratively, cordboard observation circuits provide less observation data than dial observation circuits during an observation day. From an administrative point of view, it is advantageous to be able to set quotas for data from each observation circuit. If this is possible, a more accurate service picture can be developed since repeated observations from more active circuits may be ignored in favor of information from less active circuits. In some of the prior art systems described above, circuitry has been provided to reduce the number of incoming observations by dividing the observing circuits into groups. Service observing circuits connected to a remote allotter circuit may be wired in two arbitrary groups to the allotter circuit. Control can be provided at the central location so that service observations may be accepted from either or both groups. This arrangement, which has traditionally been called "loop reduction", provides some control over incoming observations; but it still suffers from the drawback that the service observing circuits must be hard-wired into the observing groups, and thus it is not possible to easily change the status of a circuit relative to its group without wiring changes.

It is therefore a problem in the prior art that no method and circuitry have been provided for dynamically controlling incoming service observations in a service observing system having a plurality of remote observation terminals.

SUMMARY OF THE INVENTION

A solution of the foregoing problem and others is provided in one illustrative embodiment by a service observing terminal located at remote locations wherein the terminal includes an internal memory which may be controlled and updated by the central location to determine the operational status of the associated service observing circuits.

In particular, under control of commands from the central location, storage circuitry in the terminal stores service status information associated with each service observing circuit in selected locations of the internal memory. The service status has a first, or active, state when the central location will accept evaluation or service requests from its associated service observing circuit and a second, or inactive, state when the central location will not accepted evaluation or service requests from its associated service observing circuit. Circuitry is provided in the service observing terminal to forward evaluation requests and call information from selected service observing circuits to the central location depending on the service status states stored in the memory. Evaluation requests from other service observing circuits are ignored.

According to one feature of the present invention, a register is provided in the service observing terminal, which register has a location corresponding to each of the service observing circuits served by the terminal. Circuitry in the terminal is responsive to a service evaluation request from a service observing circuit for storing an evaluation bid code in the corresponding register location. Each bid is thus registered for further processing.

According to another feature of the present invention, the storage circuitry includes decoding circuitry which circuitry decodes commands received from the central location to determine the address of the selected internal memory locations into which status information is to be stored and the corresponding service status information. Means are provided in the terminal circuitry for computing a correction code from the address and status information decoded by the decoding circuitry from the central location commands. Other circuitry included in the storage circuitry logically combines the contents of the internal memory with the correction code to generate corrected service status states. Finally, circuit means in the storage circuitry stores the corrected service status states in the memory.

According to yet another feature of the present invention, the circuitry which forwards information from selected service observing circuits to the central location includes circuitry which logically combines the contents of the service observing terminal register with the contents of the memory to detect selected service evaluation requests generated by service observing circuits which have a first service status state associated therewith. Additional circuitry is included which transmits one of the selected evaluation requests to the central equipment for acceptance. The circuitry that combines the contents of the service observing terminal register and memory thus effectively corrects the service evaluation request information by removing request information corresponding to service observing circuits which have a service status in a second state.

In another feature of the present invention, further apparatus is provided for collecting data from the service observing circuits. Means are provided to connect the selected one of the service observing circuits whose service evaluation bid was transmitted to the central location to the data collecting apparatus. Further circuitry is provided to forward the collected call information to the central location.

In yet another feature of the present invention, a timing circuit is provided which is activated upon transmission of a selected evaluation bid to the central location. The activated timing circuit produces a timeout signal after predetermined time interval has elapsed. Control circuitry monitors the timing circuit and scans for incoming acceptance commands from the central location. The control circuitry disconnects the selected one of the service observing circuits from the data collection apparatus when a timeout signal is produced by the timing means before an acceptance command is received from the central location.

According to a further feature of the present invention, the circuitry which logically combines the contents of the internal memory with the correction code includes circuitry which is responsive to status information from a decoded command being in a first state for logically ORing the correction code with the contents of the memory. Other circuitry is included which is responsive to status information from a decoded command being in a second state for logically ANDing the correction code and the contents of the internal memory.

In another feature of the invention, circuitry is provided to identify service observing circuits associated with an active state and to generate an identification code. Other circuitry sends the identification code to the central location along with the service evaluation requests.

In yet another feature of the present invention, the circuitry for computing the correction code includes a correction register having a location corresponding to each location in the internal memory. Circuit means responsive to status information from a decoded command being in a first state inserts a single one bit into one of the correction register locations and zero bits into the remaining correction register locations. Additional circuitry is responsive to status information from a decoded command being in a second state for inserting a single zero bit into one of the correction register locations and one bits into the remaining correction register locations. Still other circuitry, in response to address information decoded by the decoding circuitry from a command, shifts the correction register to move the single one and zero bits into a correction register location corresponding to one of the selected locations in the internal memory.

According to yet another feature of the invention, a method for operating a service observing terminal which selectively collects call information from a plurality of service observing circuits and transmits the information to the central location is disclosed. According to the inventive method, the service observing circuits are scanned to detect evaluation requests generated thereby. Commands are received from the central location specifying a service status associated with each service observing circuit, the status having a first state when the central location will accept an evaluation request from the associated service observing circuit and the status having a second state when said central location will not accept an evaluation request from the associated service observing circuit. The received service status associated with each service observing circuit is stored in selected locations in a memory contained within the terminal and information gathered from service observing circuits generating evaluation requests is forwarded to the central location depending on the service status states of the associated memory locations.

In another feature of the invention method, the step of storing the service status states in the selected memory locations is further comprises of the steps of: decoding commands received from the central location to determine the address and corresponding service status states of the selected memory locations; computing a correction code from the address and corresponding service status states: logically combining the contents of the memory with the correction code to obtain corrected service status states, and storing the corrected service status states in the memory.

According to yet another feature of the inventive method, further steps are disclosed, including the steps of: storing detected evaluation request information in a register in the terminal; logically combining the contents of the register with the contents of said memory to detect selected service evaluation requests generates by service observing circuits which have a first status state associated therewith and transmitting one of the selected evaluation requests to the central location.

BRIEF DESCRIPTION OF THE DRAWING

FIG. 12 is a diagram of the control instruction decoder and the data transmission circuitry;

FIG. 15 is a diagram showing how FIGS. 3 through 14 are to be arranged;

FIGS. 21 and 22 are flow charts of the service observing circuit scan instruction routines of the present invention;

FIGS. 23 and 24 are flow charts of the service evaluation center command decoding instruction routine of the present invention;

FIGS. 25 and 26 are flow charts for the instruction routine of the present invention which updates the status registers in the terminal control;

GENERAL SYSTEM DESCRIPTION

Figure 1:
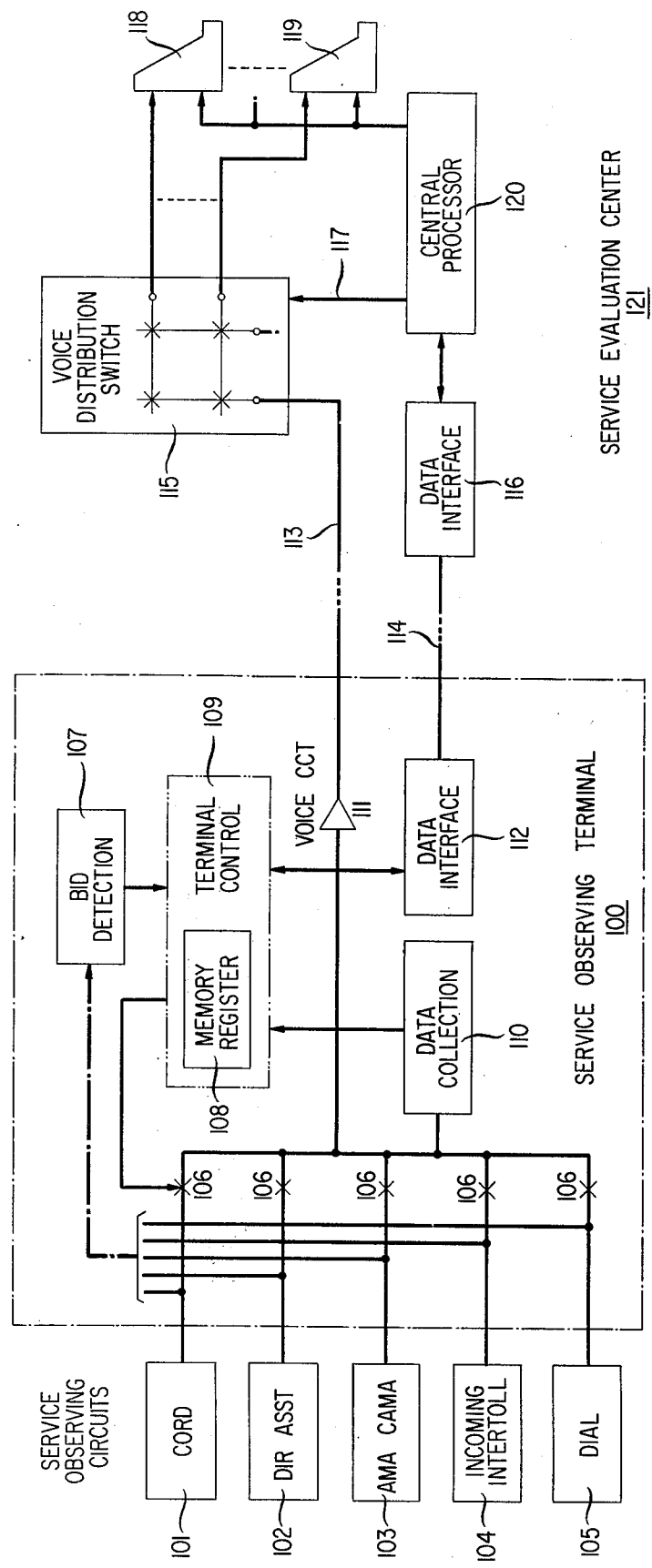
FIG. 1 is a block diagram of a centralized service evaluation system utilizing the service observing terminal of the present invention.

FIG. 1 of the drawing shows a centralized service observing system which includes a service evaluation center 121 that collects data over a wide geographic area from a plurality of remotely located service observing circuits, such as circuits 101 through 105, by means of service observing terminals such as terminal 100. Service observing circuits 101 through 105 are capable of gathering information from a variety of different switching circuitry; for example, circuit 101 gathers information from cord switchboard circuits. Similarly, service observing circuits 102 through 105 monitor directory assistance operators, toll circuits, and dial circuits, respectively. Service observing circuits such as circuits 101 through 105 are well known in the art, and their construction and operation are not important for an understanding of the present invention. Accordingly, the details of the circuitry therein will be only discussed in a general fashion and only to an extent necessary to understand the present invention. An example of a local dial service observing circuit which will be used illustratively herein is disclosed in FIGS. 1 through 5 of U.S. Pat. No. 2,017,644, issued to L. H. Allen et al. on Oct. 15, 1935. This patent will be referred to hereinafter as the Allen patent. An example of an Automatic Message Accounting (AMA) and Centralized Automatic Message Accounting (CAMA) service observing circuit which will be used illustratively herein is shown in FIGS. 3 through 13 of U.S. Pat. No. 2,816,965, issued to F. C. Kuchas et al. on Dec. 17, 1957. This patent will hereinafter be referenced as the Kuchas patent. The above-referenced patents give a more complete description of the operation of the circuitry of typical service observing circuits. Where necessary, reference will be made to various signals generated by the circuitry shown therein in order to explain the operation of the present invention.

Service observing circuits 101 through 105 typically generate data signals in the form of loop current pulses and direct current voltage levels, which data signals are unsuitable for transmission over the long distances that may be encountered in transmissions to service evaluation center 121. Therefore, service observing circuits 101 through 105 do not send data directly to service evaluation center 121, but instead forward data service observing terminal 100. Service observing terminal 100 acts as a converter which translates data signals generated by service observing circuits 101 through 105 into binary coded signals suitable for long-distance transmission. In addition, service observing terminal 100 operates as a concentrator to allow a plurality of service observing circuits to share a common data link 114 to the service evaluation center 121.

Service observing terminal 100 forwards digital data and voice information to evaluation center 121 by means of voice channel 113 and data link 114. Voice channel 113 is a one-way voice-path connection which allows personnel located at service evaluation center 121 to aurally monitor the remote service entities observed by circuits 101 through 105. Data link 114 is a two-way data path which allows data to be sent from service observing terminal 100 to service evaluation center 121 and, advantageously, allows control commands to be sent from service evaluation center 121 to service observing terminal 100. Voice path 113 and data link 114 may advantageously be ordinary voice frequency private line telephone circuits, and thus, no special circuits are necessary for the operation of the service observing system.

The voice and data signals received over voice channel 113 and data link 114 are processed in two different ways by service evaluation center 121. In particular, incoming data on link 114 is received directly by central processor 120 via data interface 116. Central processor 120 may be a hardware circuit or may be a programmed digital computer. Central processor 120 stores incoming data, correlates the data with the various observed circuit identities, times various incoming signals, and displays processed data to service evaluation personnel located at evaluation terminals or positions such as evaluation positions 118 and 119. Evaluation positions 118 and 119 also receive audio information from the observed circuits in order to monitor various service aspects such as operator responses. However, in contrast to digital data received over data link 114, which data is processed by central processor 120, incoming audio information on voice channel 113 is switched directly to evaluation positions 118 and 119 by voice distribution switch 115, which is in turn controlled over cable 117 by central processor 120. Based on digital information arriving on data link 114, central processor 120 controls voice distribution switch 115 to connect voice channel 113 to the evaluation position which is handling the service observing function.

Central processor 120 also receives data from service evaluators by means of key sets located at evaluation desks 118 and 119. The evaluator data together with the digital data arriving over data link 114 is stored for use in providing summaries and service quality tables at a later time.

Central processor 120, in addition to performing real-time processing of call evaluation data, can also perform administrative operations in a real-time basis. Specifically, central processor 120 receives observation data and observed entity identities from a plurality of service observing terminals such as service observing terminal 100 to enable central processor 120 to form a detailed service quality picture for a wide area. Furthermore, as described above, central processor 120 can control service observing terminal 100 during system operation by means of command signals sent over data link 114.

Advantageously, central processor 120 controls the incoming evaluation data from service observing circuits 101 through 105 by controlling the acceptance of bids for evaluation from each circuit. In particular, bids for evaluations generated by service observing circuits 101 through 105 are detected by bid detection or evaluation circuit 107 in service observing terminal 100. Bid evaluation circuit 107 is in turn scanned by terminal control 109 to determine if bids are present. When a bid for evaluation is scanned by terminal control 109, the bid is sent, via data interface 112, along with the identity of the bidding service observing circuit directly to service evaluation center 121 by means of data link 114 and data interface 116. When central processor 120 receives a service evaluation bid from data interface 116, it determines whether an idle evaluation desk 118 and 119 is available. If an idle evaluation desk (for example, desk 118) is available, central processor 120 sends a bid accepted signal to terminal control 109 by means of data link 114 and operates voice distribution switch 115 to connect voice channel 113 to evaluation desk 118.

Upon receiving a bid, accepted signal terminal control 109 operates one of switches 106 to connect the bidding service observing circuit to data collection circuit 110 and voice circuit 111. Data collected by data collection circuit 110 is forwarded to terminal control 109 which translates the data to a digital code, which is thereupon sent to service evaluation center 121 via data link 114. Voice frequency information generated by the service observing circuits 101 through 105 is forwarded directly to service evaluation center 121 by voice circuit 111.

In accordance with the present invention, central processor 120 may wish to prevent selected service observing circuits from even sending bids for evaluation to service evaluation center 121 in order to avoid using processing time to reject unwanted bids. In particular, central processor 120 may advantageously have a quota for each service observing circuit. Such a quota may, for example, indicate the total number of observations which central processor 120 will accept each hour from a given service observing circuit. A quota for each entity may be calculated from theoretical evaluation profiles or may be based on previous experience with service observing data. Therefore, for each service observing entity, central processor 120 keeps a table which is updated as each acceptable observation is released. When the evaluation quota for each particular entity is reached, central processor 120 will no longer accept call evaluations from that entity. In order to prevent incoming observations from entities that have reached their quota from loading the evaluation capacity of central processor 120, terminal control 109 is provided with memory register 108 which stores a status bit for each service observing circuit associated with the terminal. The value of the bit indicates whether or not evaluation bids are to be forwarded to service evaluation center 121. Memory register 108 may be selectively changed during real-time system operation by means of data signals sent from central processor 120 via data link 114. Terminal control 109, utilizing the information in memory register 108, first screens bids generated by service evaluation circuits 101 through 105. Bids from those service observing circuits that have reached their quota and have an out-of-service status stored in memory register 108 are ignored by terminal control 109 and are not forwarded to service evaluation center 121. Thus, only those bids which originate from circuits that have not reached their quota are forwarded to service evaluation center 121. As each of service observing circuits 101 through 105 reaches its service evaluation quota, its status in memory can be changed by central processor 120 by means of data link 114. Therefore, central processor 120 can control the incoming service evaluation data to obtain an accurate overall picture of the service quality in the area where it is located and to ensure obtaining data on all service observing circuits.

GENERAL TERMINAL DESCRIPTION

Figure 2:
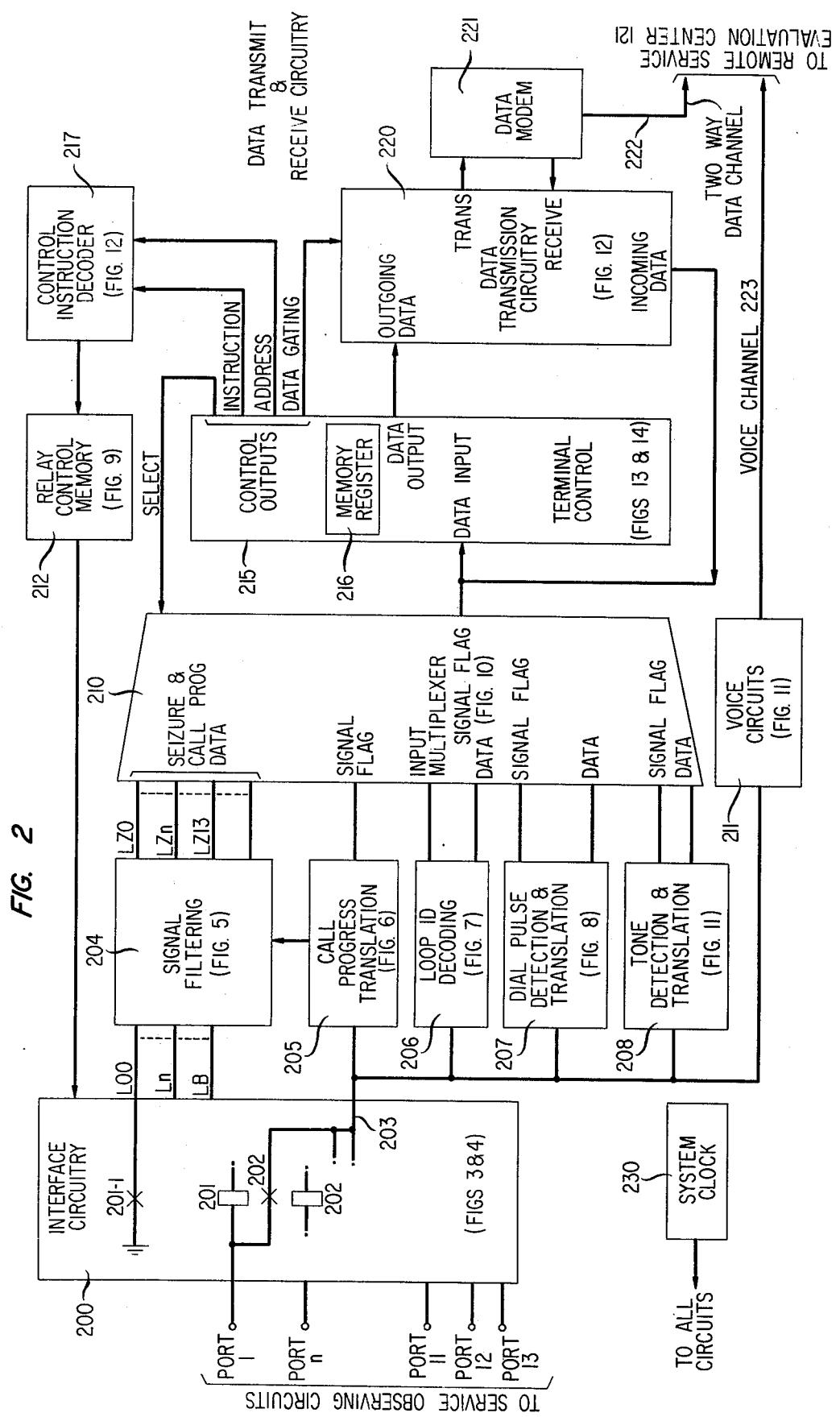
FIG. 2 is a block schematic diagram of the inventive service observing terminal.

FIG. 2 of the drawing shows a more detailed block diagram of service observing terminal 100 shown in FIG. 1. The service observing terminal set forth in the present embodiment of the invention interfaces up to fourteen service observing circuits to a remote service evaluation center via fourteen ports. It is to be understood that the disclosed service observing terminal is not limited to serving fourteen service observing circuits but may advantageously serve either a larger or smaller number. Prior to an observation, one of the fourteen service observing circuits is selected by a scanning routine hereinafter described. During an observation, the circuits of the service observing terminal and data link handle only data from the selected service observing circuit.

All data generated by the selected service observing circuit is translated from the loop signaling scheme used by the service observing circuits into binary logic signals by data translation circuits 205 through 208 and applied to terminal control 215 via multiplexer 210. Voice frequency signals from selected service observing circuits are sent directly to the remote service evaluation center by voice circuits 211.

Terminal control 215 acts as an interface between the service observing circuits and the remote service evaluation center. Detailed data generated by the service observing circuits and incoming command instruction information are applied to the input of terminal control 215. Service observing data is coded by terminal control 215 into a form suitable for transmission to the remote service evaluation center and forwarded by means of transmission circuitry 220, data modem 221, and data channel 222. Incoming instruction commands received by terminal control 215 from transmission circuitry 220 are decoded and used to control the operation of terminal control 215 and the service observing circuits. Terminal control 215 controls the operation of the service observing circuits by operating relays in interface circuitry 200 by means of relay control 212 which is in turn controlled by instructions generated by terminal control 215 and decoded by control instruction decoder 217.

Advantageously, instruction commands received from the service evaluation center can be used to program memory register 216 in terminal control 215 to screen service observing bids generated by the service observing circuits. Memory register 216 contains information associated with each service observing circuit which indicates whether service observing data should be forwarded to the service evaluation center 121. Terminal control 215 may be a hardwired sequencer or may be a programmed microprocessor. In the latter case, memory register 216 may advantageously be an internal register in the microprocessor.

A service observation begins when switching equipment that is under observation processes a call. In response thereto, the service observation circuit associated with the switching equipment places a bid for evaluation with the service observing terminal via one of the ports 0 through 13. Each port is connected to interface circuitry 200 which contains relays such as relay 201. Assuming a service observing circuit on port 0 is ready to make an observation, relay 201 is seized and operated by the associated service observing circuit. Operated relay 201 closes contact 201-1 which places a ground on lead L00. The ground signal is filtered by signal filtering circuit 204 in order to remove relay contact bounces and extraneous noise and appears on lead LZO at the input of input multiplexer 210. Input multiplexer 210 is periodically scanned for seizures by terminal control 215. When a seizure is detected by terminal control 215, it is compared to the information in memory register 216 to determine whether information is to be forwarded to the service evaluation center. When a seizure from a service observing circuit that will be accepted fpr evaluation is detected by terminal control 215, a bid for evaluation together with the identity of the bidding service observation circuit is coded and sent to the remote evaluation center. Terminal control 215 then begins circuit operations in preparation for transmission of data to the service evaluation center 121. Terminal control 215 waits a predetermined interval of time for an acceptance signal from the service evaluation center 121. If no acceptance message is received from the service evaluation center within the time interval, the bid is cancelled and another bid for evaluation from a different service observing circuit is forwarded.

When the service evaluation center 121 accepts the bid for evaluation a coded accept message is returned via two-way data channel 222. While waiting for the accept message terminal control 215 controls interface circuit 200 by means of an instruction which is decoded by control instruction decoder 217 and used to operate relay control memory 212. Relay control memory 212 in turn operates cut-through relay 202 associated with the bidding service observing circuit to connect the service observing circuit to the data gathering and translation circuits 205 through 208. When the accept message is received, terminal control 215 begins transmission of data to the service evaluation center.

For the remainder of the observation, service observing terminal 100 acts as a conduit to forward information generated by the accepted service observing circuit to the service evaluation center and to control the service observing circuit in response to commands received from the service evaluation center. At the end of an observation, a command is sent from the service evaluation center to release the service observing circuit; and the service observing terminal 100 then resumes its scanning of service observing circuits for service evaluation bids.

DETAILED DESCRIPTION OF THE SERVICE OBSERVING TERMINAL INTERFACE CIRCUITS

Figure 3:
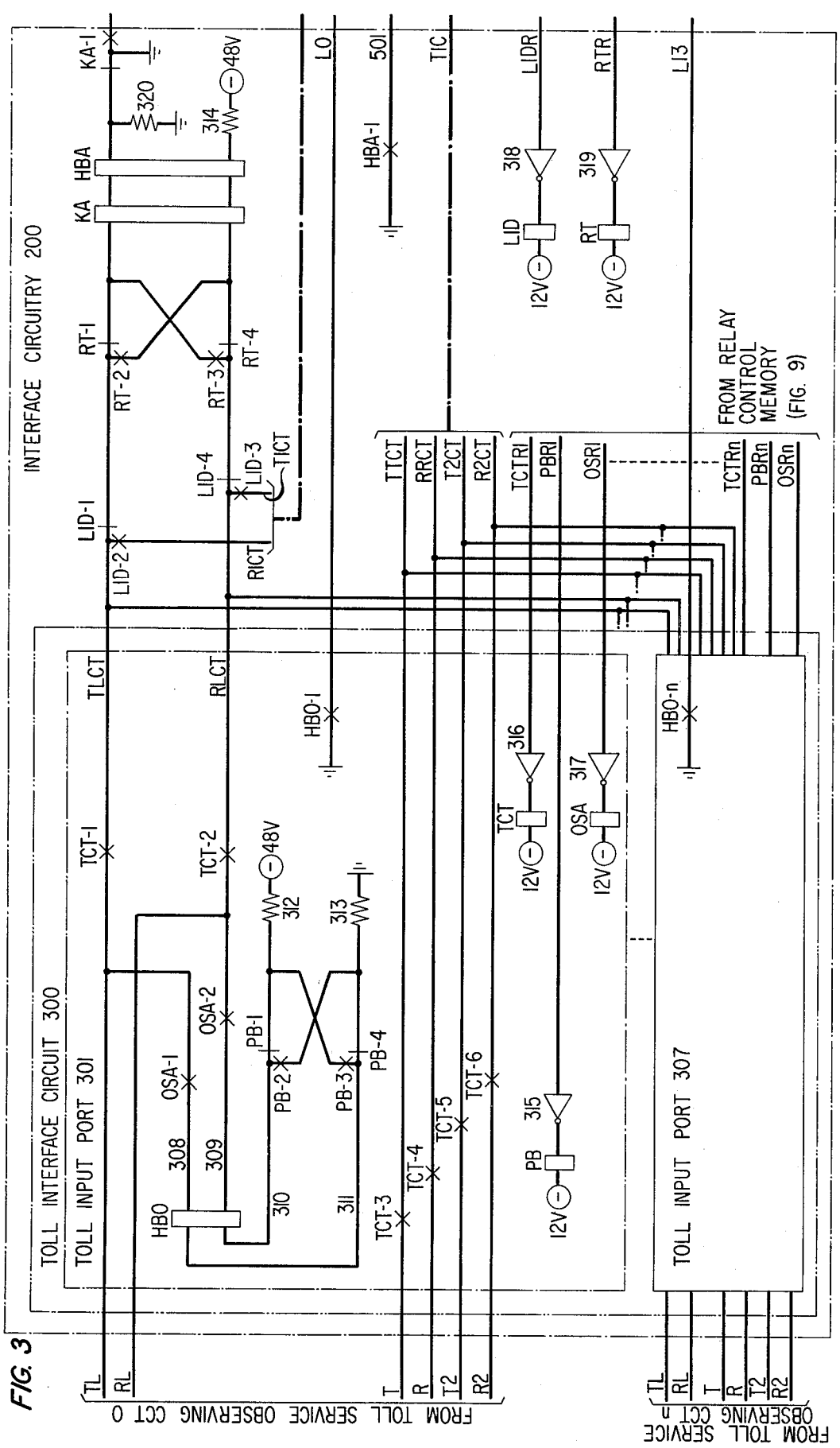
FIG. 3 is an electrical schematic of the interface circuit for a toll service observing circuit.

The function of the interface circuitry is to convert the loop signaling scheme utilized by well-known service observing circuits into logical levels acceptable by the service observing terminal 100. FIG. 3 of the drawing shows an interface circuit which can be used with service observing circuits that signal over three pairs of leads which are typically designated T, R; T2, R2; TL, and RL. Service observing circuits which utilize this type of signaling are intertoll circuits and directory assistance circuits. There may be up to fourteen toll input port circuits associated with the service observing terminal 100. However, only the circuitry in toll input port 301 is shown in detail. The circuitry in the remaining toll input ports such as toll input port 307 is identical and is omitted for clarity of description.

When a service observing circuit is connected to toll input port 301 and all relays therein are released, leads T, R, T2, R2, TL, and RL are open-circuited and the service observing circuit is out of service. In order to place the service observing circuit into service, battery and ground are applied to leads RL and TL, respectively. Assuming that service observing circuit 0 is to be placed into service, relay OSA is operated by the terminal control via the relay control memory and lead OSR1. As will hereinafter be explained in detail, terminal control 215, shown in FIGS. 13 and 14, operates as an autonomous processor or sequencer. One of the first functions that terminal control 215 performs in starting operations is to place all service observing circuits into condition to begin observations. In order to do this, terminal control 215 applies to its output bus a sequence of coded commands which are decoded by control instruction decoder 217, FIG. 12, and applied to relay control memory 212, FIG. 9. Relay control memory 212 contains a plurality of flip-flops. Commands from control instruction decoder 217 set the appropriate flip-flops causing control signals to be applied to the appropriate relays of the interface circuitry 200, FIGS. 3 and 4. The control of the various relays will be discussed in more detail in connection with the discussion of relay control memory 212. In particular, operations in terminal control 215 cause relay control memory 212 to place a high signal on lead OSR1 causing inverter 317 to apply a low signal ground to the winding of relay OSA. The resulting operation of relay OSA closes contacts OSA-1 and OSA-2. Battery is thereupon applied to lead RL over the circuit from negative battery, resistor 312, lead 310, the winding of relay HBO, operated contact OSA-2, to lead RL. Similarly, ground is applied to lead TL over the circuit from ground, resistor 313, lead 311, the winding of relay HBO, lead 308, operated contact OSA-1, to lead TL. Battery and ground on leads TL and RL inform toll service observing circuit O that service observing terminal 100 is ready to receive service observing bids.

A seizure or bid generated by the service observing circuit is detected by toll input port 301 when relay HBO operates as a result of a low resistance bridge applied across leads TL and RL at toll service observing circuit O. The circuitry in toll service observing circuit O which applies the seizure signal to leads TL and RL is described in column 16, line 33, et seq., in the aforementioned Kuchas patent. The service observing circuit requires an acceptance of the bid by an application of battery and ground signals to leads, R, T and R2, T2 within a 150 millisecond time interval. Failure to accept the bid within the time interval results in a removal of the bridge across leads TL and RL, which in turn causes relay HBO to release.

Figure 5:
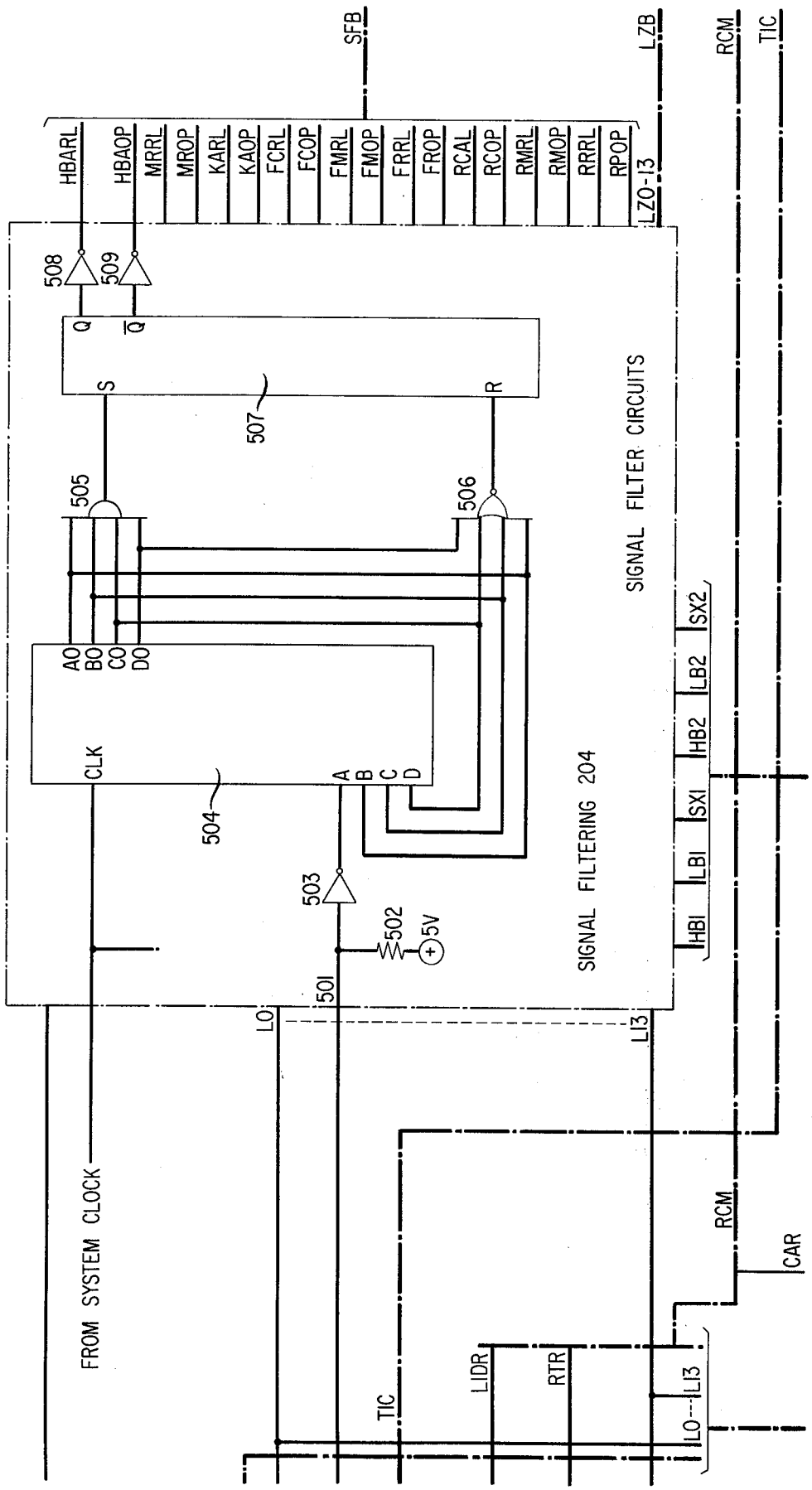
FIG. 5 shows the circuitry of the signal filters.

An acceptance routine at toll interface circuit 300 begins when operated relay HBO closes contact HBO-1 which grounds input lead LO to signal filtering circuit 204 set forth in FIG. 5. An input on lead LO results in a bid being submitted to the terminal control 215 via input multiplexer 210. As will be described in detail hereafter, service observing bids are screened by terminal control 215 and forwarded for acceptance to remote service evaluation center 121. If a bid is accepted by service evaluation center 121, an acceptance signal is returned to terminal control 215 within a one second time interval. While waiting for a bid accepted signal, terminal control 215 begins acceptance of the call by causing the call accepted relay CA, FIG. 6, and the cut-through relay TCT, FIG. 3, to be operated via relay control memory 212 by placing high signals on leads CAR and TCTR1, which high signals are inverted, FIGS. 6 and 3, by inverters 618 and 316, respectively, and applied to the windings of relays CA and TCT.

Figure 6:
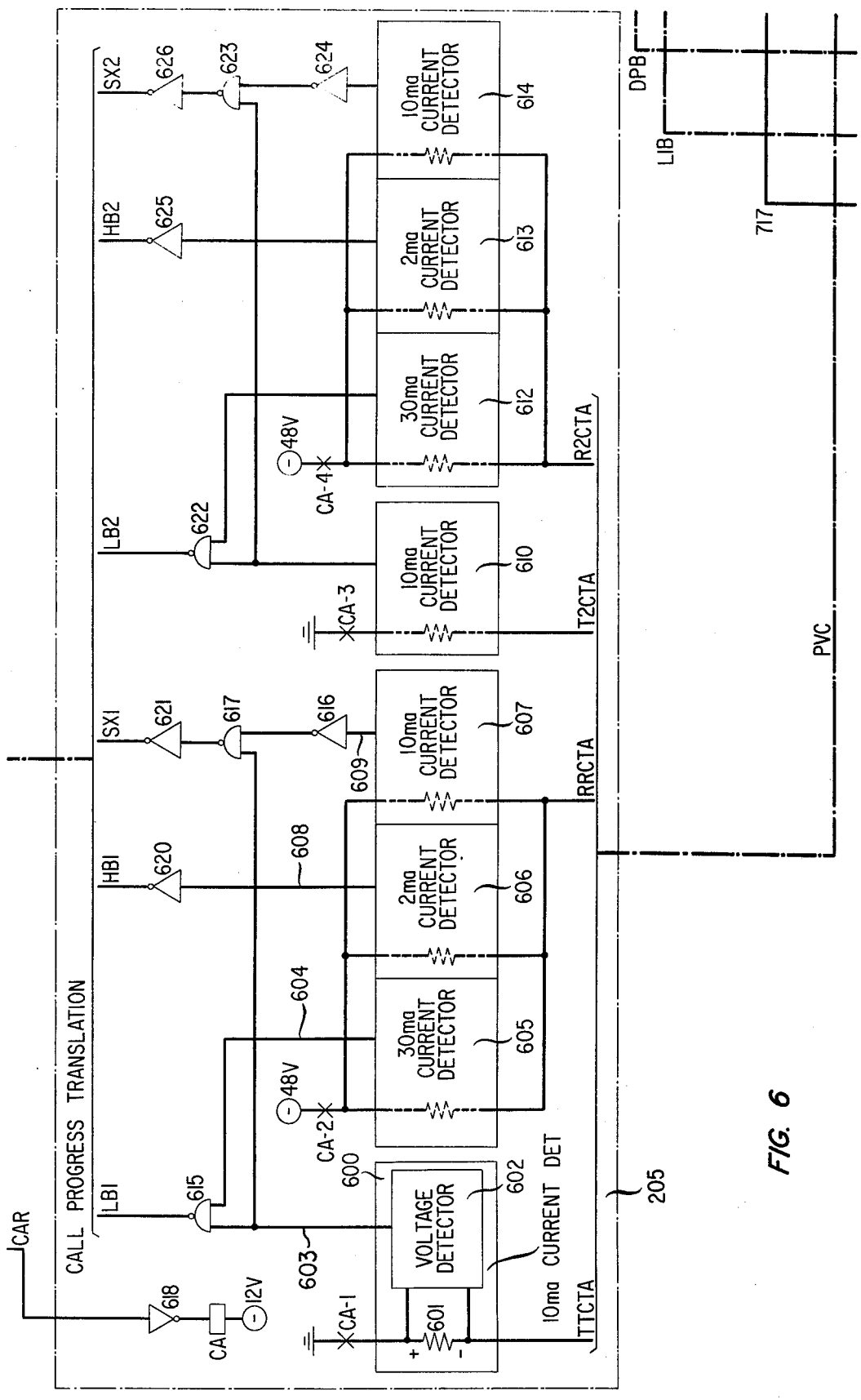
FIG. 6 is the call progress translation circuitry.

Operated cut-through relay TCT closes contacts TCT-3 through TCT-6, connecting leads T, R, T2, and R2 to leads TTCT, RRCT, T2CT, and R2CT, R2, respectively. These leads connect through transformer windings in voice amplifier circuits 211 shown in FIG. 11 to call progress translation circuit 205 shown in FIG. 6. Ground is applied to leads T and T2 when relay CA operates by means of resistors in call progress circuitry 205 and transformer coils in voice circuits 211. Similarly, battery is applied to leads R and R2 by means of call progress circuitry 205 and voice circuits 211. In particular, ground, FIG. 6, is applied to lead T via the circuit consisting of ground, contact CA-1 of operated relay CA, resistor 601 in current detector 600, lead TTCTA, normally closed contact L1D-12, FIG. 11, coil 1101, lead TTCT, and closed contact TCT-3, FIG. 3. Ground, FIG. 6, is applied to lead T2 via the circuit consisting of battery, contact CA-3, current detector 610, lead T2CTA, coil 1106, FIG. 11, lead T2CT, and closed contact TCT-5, FIG. 3. Similarly, battery, FIG. 6, is applied to lead R via the circuit consisting of battery, contact CA-2, the parallel combination of current detectors 605, 606, and 607, lead RRCTA, normally closed contact L1D-10, FIG. 11, coil 1103, lead RRCT, and closed contact TCT-4, FIG. 3. Battery, FIG. 6, is also applied to lead R2 via the circuit consisting of battery, contact CA-4, the parallel combination of current detectors 612, 613, and 614, lead R2CTA, coil 1110, FIG. 11, lead R2CT, and closed contact TCT-6, FIG. 3. The battery and ground signals on leads T, R, T2, and R2 indicate to associated toll service observing circuit O that its bid for service evaluation is being accepted by the service observing terminal 100 and that toll service observing circuit O may begin forwarding service observing information to the service observing terminal 100. If an acceptance signal from service evaluation center 121 is not received within the predetermined time interval, the observation is aborted and the call released as described hereinafter.

In order to prepare for the incoming service observing information, service observing terminal 100 controls toll interface circuit 300, FIG. 3, to connect observing circuit O to the common data gathering and translation circuits by operating relay TCT. In particular, operated relay TCT closes contacts TCT-1 and TCT-2, connecting leads TL and RL to leads TLCT and RLCT, respectively. Leads TLCT and RLCT are in turn connected to relays KA and HBA which are common to all toll input interface circuits. Relay KA operates to indicate that a key set is attached at the service observing circuit. Relay HBA replaces the function of th HBO relay in toll interface circuit 300. Since the HBO relay in toll interface circuit 300. Since the HBO relay is no longer needed, terminal control 215 at this time releases relay OSA thereby opening contacts OSA-1 and OSA-2 disconnecting relay HBO from leads TL and RL and causing it to release. The release of relay HBO is ignored by terminal control 215 since the functions on relay HBO are now performed by relay HBA.

Toll service observing circuit O may now send service observing data to the appropriate data translation circuits via interface circuitry 200. In particular, control signals present on leads TL and RL operate relay HBA. Operated relay HBA closes contact HBA-1, FIG. 5, to apply a ground to lead 501, which ground signal is filtered by signal filtering circuit 204 and applied to terminal control 215. Other control signals received on leads T and R and T2 and R2, FIG. 3, are decoded by call progress translation circuit 205 shown in FIG. 6 as will hereinafter be described.

Figure 7:
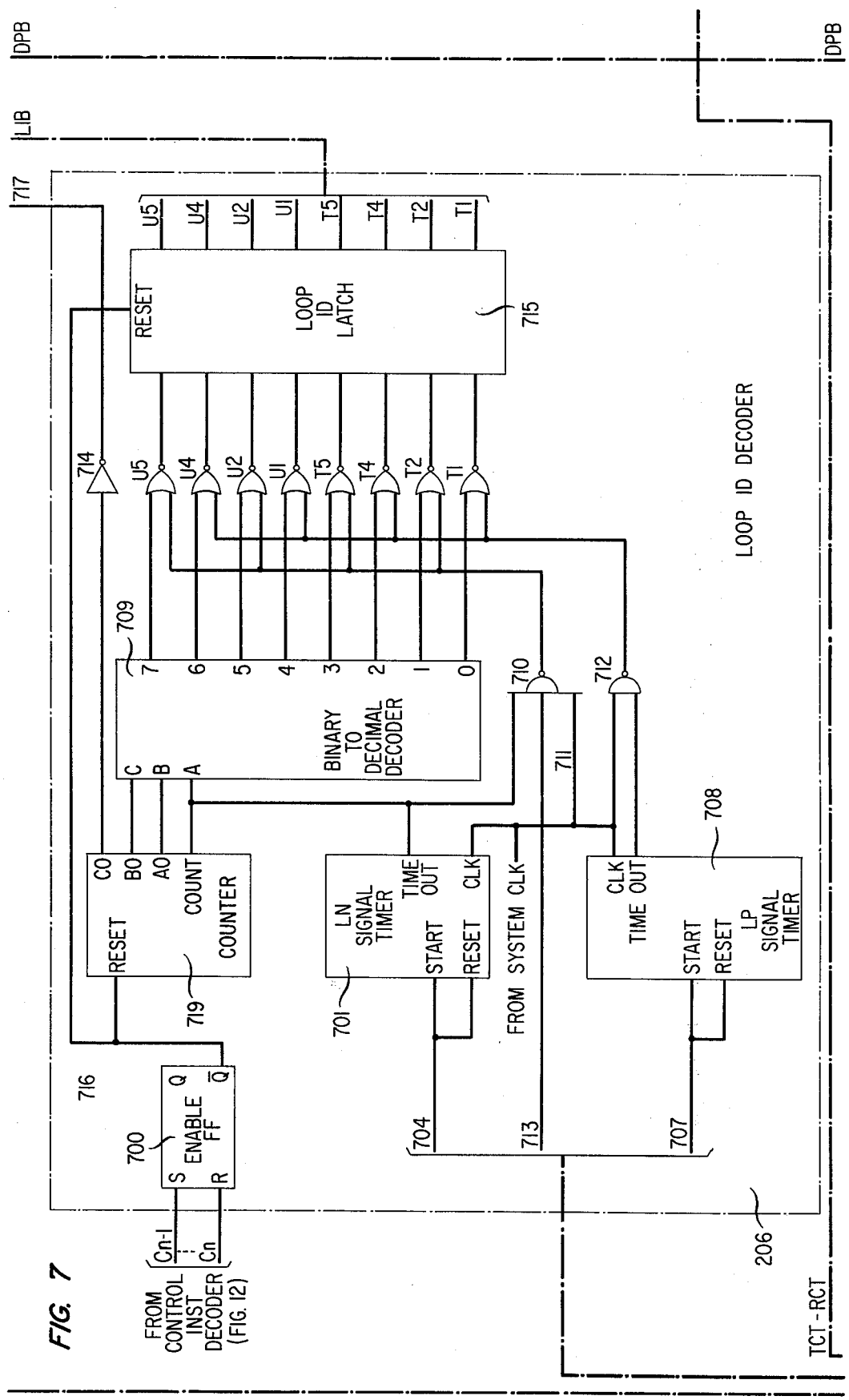
FIG. 7 shows the circuitry of the loop identification circuit.

In addition, control signals which identify the entity to which toll service observing circuit O is connected may be requested by terminal control 215. These signals are decoded by loop identification decoding circuit 206 which is shown in FIG. 7. Loop identification decoding circuit 206 decodes trunk and loop identification signals which are transmitted over leads TL and RL from toll service observing circuit O and received by relays MG, SNN, and SNP shown in FIG. 4. The identification signals are received in the form of panel call indicator pulse (PCI) signaling. This type of signaling and the response of the loop identification decoding circuit 206 to it will be discussed hereinafter. The trunk identification signals are not automatically sent to service observing terminal 100 but must be requested by it. Therefore, relays MG, SNP and SNN are not normally connected to leads TL and RL. Service observing terminal 100 requests a trunk identification and connects receiving relays MG, SNP, and SNN to leads TL and RL by operating the loop identification relay LID shown in FIG. 3.

Operated relay LID reverses battery and ground on leads T and R to signal to toll service observing circuit O that a trunk identification is required. In particular, operated relay LID opens contact LID-10, FIG. 11, and closes contact LID-9 to disconnect lead RRCTA from lead RRCT and connect it to lead TTCT. Thus, negative battery on lead RRCTA which is supplied through current detectors 605 through 607 and contact CA-2, FIG. 6, becomes connected to lead TTCT by coil 1101, FIG. 11, and to lead T through operated contact TCT-3, FIG. 3. Similarly, operated relay LID opens contact LID-12 and closes contact LID-11, FIG. 11, thereby disconnecting the ground appearing on lead TTCTA from lead TTCT and connecting it to lead RRCT via coil 1103. Ground on lead RRCT is applied to lead R by operated contact TCT-4, FIG. 3. The reversal of battery and ground on leads T, R indicates to toll service observing circuit O that trunk identification signals are requested. A typical response of a toll service observing circuit and generation of the PCI pulses is described at column 19, line 46, et seq., in the aforementioned Kuchas patent.

Operated relay LID also connects receiving relays MG, SNN, and SNP to leads TL and RL to receive the PCI identifying pulses. In particular, operated relay LID opens contact LID-1 to disconnect lead TL from relays KA and HBA. Contacts LID-2 are closed to connect lead TL to the winding of relay SNP, via lead RICT, FIG. 4. Similarly, contacts LID-3, 4, 5, 6 and 8 are operated to disconnect lead RL from relays KA and HBA and connect leads TL and RL to the windings of relays MG and SNP, FIG. 4 via lead TICT. The operation of relay LID therefore effectively connects relays MG, SNN, and SNP in series across leads TL and RL. The MG, SNN and SNP relays are then ready to receive the incoming trunk identification pulses. The operation of each relay closes a contact in loop identification decoding circuit 206 shown in FIG. 7 which will be described in detail hereinafter. After the loop identification signals have been detected and decoded, relay LID, FIG. 3, is released by terminal control 215 to disconnect loop identification decoding circuit 206 and to reconnect relays KA and HBA to receive further control signals from toll service observing circuit 0. Battery and ground is now provided on leads TL and RL via the windings of relays HBA and KA. Specifically, ground is provided to lead TL via the circuit comprising ground, resistor 320, the upper winding of relays HBA and KA, lead TLCT, normally closed contact RT-1, normally closed contact LID-1, and operated contact TCT-1. Battery is provided to lead RL via the circuit comprising battery, resistor 314, the lower windings of relays HBA and KA, normally closed contacts RT-4 and LID-4, lead RLCT, and operated contact TCT-2.

In order to prevent service observing circuits from generating bids while service observing terminal 100 is busy with toll service observing circuit 0, terminal control 215 operates relay PB in toll input port 301 and the corresponding relays in all other toll input ports to reverse battery and ground on leads TL and RL. In particular, operated relay PB opens contacts PB-1 and closes contact PB-2, thereby disconnecting lead 310 from negative battery and connecting it to ground. Similarly, relay PB opens contact PB-4 and closes contact PB-3 to disconnect lead 311 from ground and connect it to battery. The reversal of battery and ground on leads 310, 311 is applied to leads TL and RL via the windings of relay HBO and operated contacts OSA-1 and OSA-2 of relay OSA. The reversal of battery and ground on the TL and RL leads indicates to the associated toll service observing circuits that service observing terminal 100 is busy and that service evaluation bids should not be made. The operation of the PB relay in toll input port 301, however, has no effect since leads 310 and 311 are disconnected from leads TL and RL by open contacts OSA-1 and OSA-2 since rrelay OSA was previously released.

After the completion of an observation by service observing terminal 100, or if an acceptance signal is not received from service evaluation center 121 within the proper interval, terminal control 215 causes interface circuitry 200 to release toll service observing circuit 0 in preparation for another observation. The release of toll service observing circuit 0 is started when terminal control 215 releases relay CA, FIG. 6, and opens contacts CA-1, CA-2, CA-3, and CA-4 to remove ground and battery from leads T, R, T2, and R2. Terminal control 215 subsequently operates relay RT, FIG. 3, by means of lead RTR and inverter 319. OperatEd relay RT operates tansfer contacts RT-1, RT-2, RT-3, and RT-4 to reverse battery and ground on leads TL and RL via an obvious transfer circuit. The reversal of battery and ground on leads TL and RL informs the toll service observing circuit 0 that it is to release. Toll service obsrving circuit 0 responds by removing the low resistance bridge from across leads TL and RL thereby causing relay HBA to release. Released relay HBA opens contact HBA-1, removing ground from lead 501 which signal is forwarded by signal filtering circuit 204 to terminal control 215 to indicate that toll service observing circuit 0 has released. Terminal control 215 thereupon releases cut-through relay TCT, FIG. 3, in interface toll input port circuit 301 to disconnect toll service observing circuit 0. Finally, terminal control 215 releases relays RT and PB to restore toll input port 301 to the idle state with battery and ground appearing on leads RL and TL, respectively; and leads T, R, T2, and R2 open. New service observing bids may then be received from other toll service observing circuits and will be detected by relays HB—as previously described.

Figure 4:
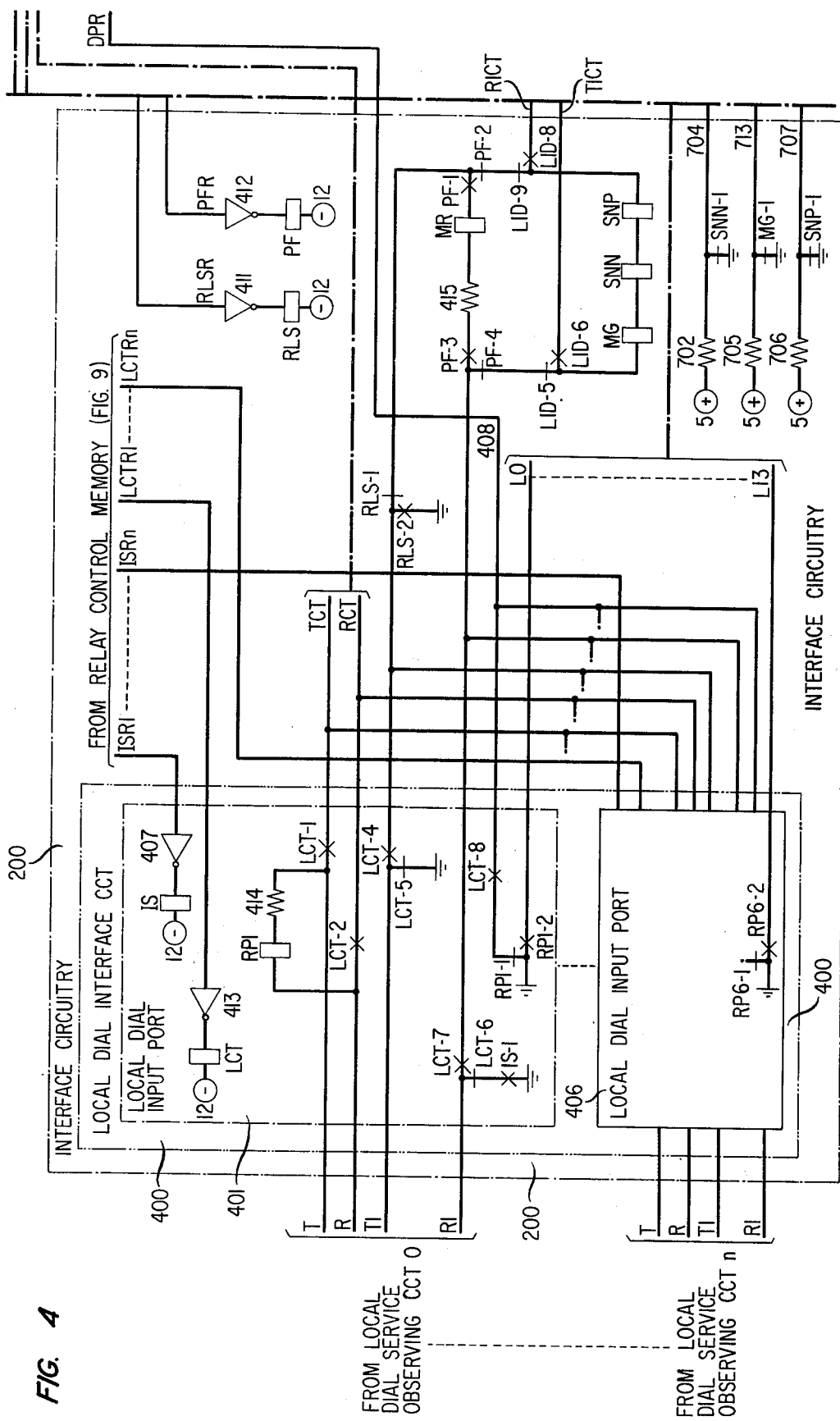
FIG. 4 is an electrical schematic of the interface circuit for a local dial service observing circuit.

FIG. 4 of the drawing shows an interface circuitry which is used with service observing circuits that signal over two pairs of leads. An example of such a circuit is shown in the aforementioned Allen patent. The interface leads are designated T, R and T1, R1. Leads 417 and 414 in FIG. 4 of the Allen patent correspond to leads T and R, respectively; and leads 433 and 434 correspond to leads T1 and R1, respectively. As with toll interface circuit 300 described above, up to fourteen local dial input ports 401 circuits may be connected to service observing terminal 100. Detailed circuitry in only local dial input port 401 is shown for clarity. The other circuits, such as local dial input port 406, are shown in block diagram form; however, the circuitry therein is identical to that described for local dial input port 401.

In order to place local dial input port 401 in condition for receiving service observing bids from the associated local dial service observing circuit 0, terminal control 215 causes a ground to be placed on lead R1. In particular, terminal control 215 operates relay IS by placing a high signal on lead ISR1, which high signal is inverted by inverter 407 and applied to the winding of relay IS. Operated relay IS closes contact IS-1 to apply ground to lead R1 by means of closed contact LCT-6. Ground on lead R1 informs local dial service observing circuit 0 that service observing terminal 100 is ready to receive service evaluation bids.

In order to make an evaluation bid as described in the aforementioned Allen patent, at page 4, left column, line 8, et seq., the local dial service observing circuit 0 places negative battery and ground on leads R and T, respectively. This bid is detected by the local dial input port 401 when the battery and ground signals on leads R and T operate relay RP1 by means of a circuit including resistor 414 and the winding of relay RP1. Operated relay RP1 closes contact RP1-2 causing ground to be placed on lead LO, which ground is forwarded to terminal control 215 by means of signal filtering circuit 204. A typical service observing circuit requires that a service evaluation bid be accepted by terminal control 215 within a 350 ms time interval. If the bid is not accepted, battery and ground are removed from leads R and T and relay RP1 releases.

As will be described in detail hereinafter, terminal control 215, in response to a service evaluation bid, screens the bid to determine whether the bidding circuit is an in-service local dial service observing circuit and forwards the service evaluation bid from the in-service local dial service observing circuit to remote service evaluation center 121 along with the identity of the bidding circuit for acceptance. If the bid is accepted at service evaluation center 121, a bid accepted signal is returned. While waiting for a bid-accepted signal, terminal control 215 operates cut-through relay LCT via lead LCTR1 and inverter 413. Operated relay LCT opens contacts LCT-5 and LCT-6, removing ground from leads T1 and R1, which action indicates to local dial service observing circuit 0 that its service evaluation bid has been accepted and that service observation information may be forwarded to service observing terminal 100.

Figure 11:
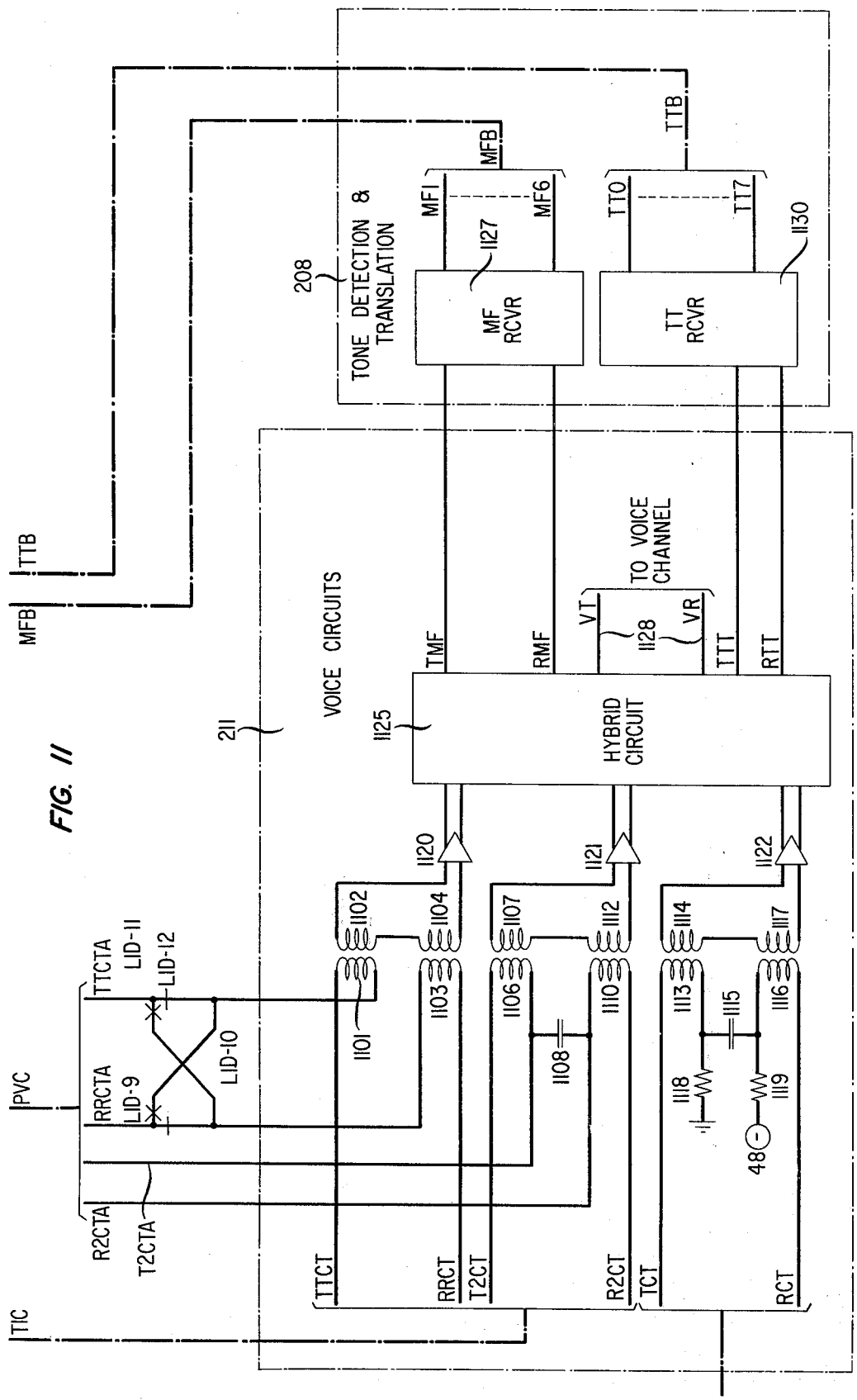
FIG. 11 is a schematic diagram of the voice channel circuitry.

Operated relay LCT also closes contacts LCT-1 and LCT-2 to connect leads T and R to leads TCT and RCT extending voice circuits 211 shown in FIG. 11, which receive voice information and TOUCH-TONE ® signals from the local dial service observing circuit 0. In addition, operated contacts LCT-4 and LCT-7 connect leads T1 and R1, FIG. 4, in series with the windings of relays MG, SNN, and SNP, which receive loop identification signals from local dial service observing circuit 0. As will be described hereinafter, the loop identification signals are detected and decoded by loop identification decoding circuit 206 shown in FIG. 7.

After the loop identification pulses have been received by local dial interface circuit 400, the pulsing finished relay PF is operated by terminal control 215 over lead PFR and inverter 412. Operated relay PF opens contacts PF-2 and PF-4 to disconnect loop identification relays MG, SNN, and SNP from across leads T1 and R1. Operated contacts PF-1 and PF-3 connect relay MR and resistor 415 across leads T1 and R1 in order that relay MR may receive additional signaling information from local dial service observing circuit 0.

Dial pulsing and switchhook signals sent by local dial service ovbserving circuit 0 over leads T and R are detected by relay RP1. Relay RP1 releases in response to dial pulse signals, causing ground pulses to be applied to lead 408 via contact RP1-1. Lead 408 is connected via closed contact LCT-8 to dial pulse detection and translation circuit 207 shown in FIG. 8. Dial pulses and switchhook actions are monitored by relay RP1 as will be hereinafter described in connection with dial pulse translation circuit 207.

After an observation is complete or if a call accepted signal is not received from service evaluation center 121 within the proper time interval, terminal control 215 causes local dial input port 401 to release locsl dial service observing circuit 0. The release sequence is initiated when terminal control 215 operates release relay RLS by means of lead RLSR and inverter 411. Operation of relay RLS closes contact RLS-2 to place ground on lead T1. The ground on lead T1 informs local dial service observing circuit 0 that the observation is complete and that the circuit should release. Local dial service observing circuit 0 responds as described in the above-referenced Allen patent at page 12, right column, line 10, et seq., by removing battery and ground from leads R and T, respectively, causing relay RP1 to release. The release of relay RP1 opens contact RP1-2, removing ground from lead LO, which action is forwarded to terminal control 215 via signal filtering circuit 204. In response to the removal of ground from lead LO, terminal control 215 releases relay LCT, thereby disconnecting local dial service observing circuit 0 from dial pulse detection and translation circuit 207. Finally, the RLS and PF relays are released by terminal control 215 to place local dial interface circuit 400 in the idle state prior to accepting a new service evaluation bid.

SIGNAL FILTERS

Figure 30:
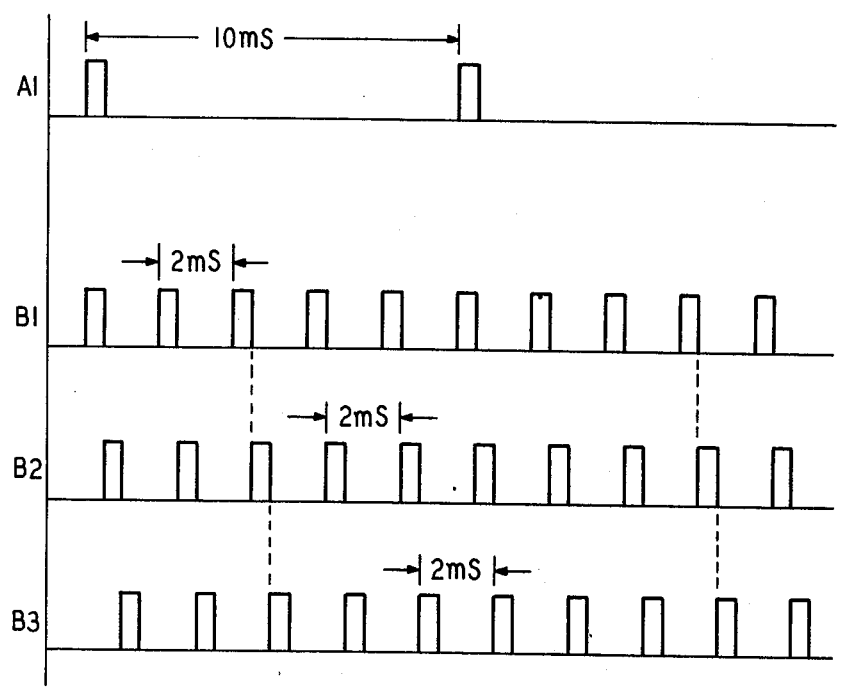
FIG. 30 shows selected electrical output waveforms generated by the master system clock.

Signal filtering circuits 204 shown in FIG. 5 function to prevent momentary transients and hits on the input lines to terminal control 215 from producing improper responses. Signal filtering circuits 204 require a signal to be present on an input line continuously for a predetermined length of time before an indication is forwarded to terminal control 215. As shown in FIG. 5, signal filter circuits 204 receive inputs from a variety of sources and from the system clock. Only one of the signal filter circuits is shown in detail in FIG. 5 for clarity. It should be understood that each is connected to a circuit equivalent to the one shown in detail. Specifically, each input signal, for example, an input signal generated on input lead 501 by relay contact HBA-1, is applied to a signal filter circuit comprising a register circuit 504, gate circuits 505 and 506, and flip-flop 507. When relay HBA of inface circuitry 200, FIG. 3, operates, a ground signal is placed on input lead 501 via operated contact HBA-1. Lead 501, FIG. 5, is normally held at positive 5 volts by means of resistor 502 so that the ground signal on lead 501 produced by the operation of relay HBA causes the output of inverter 503 to change from low to high. The high output of inverter 503 is applied to the A input of register 504. Register 504 and gate circuits 505 and 506 are connected so that a signal must be present to the A input of register 504 for a predetermined period of time before gate circuits 505 and 506 respond. In particular, register 504 consists of a plurality of flip-flops which are known as D-type flip-flops. Each of these flip-flops responds to the negative edge of a clock pulse appearing at a clock input CLK by changing its output to the state of its A input at the positive edge of the clock pulse. Register 504 receives clock pulses, FIG. 30, waveform A1 from the system clock at approximately ten millisecond intervals. On the negative edge of a clock pulse, the signal appearing at input A, FIG. 5, is produced at output A0. Similarly, signals appearing at inputs B, C, and D appear at outputs BO, CO and DO, respectively. Thus, the high signal appearing at input A from inverter 503 appears at output AO after one clock pulse. The high signal at output AO is applied to input B. Assuming the signal on lead 501 remains a constant ground, at the end of two clock pulses outputs AO and BO will both be high. The high signal at output BO is connected to input C so that at the end of three clock pulses outputs AO, BO, and CO will become high. Finally, output CO is connected to input D so that at the end of four clock pulses, assuming that the input lead 501 remains low, all outputs of register 504 will be high. This condition is detected by AND gate 505 which has inputs connected to register outputs AO, BO, CO, DO and produces a high signal to set flip-flop 507. Set flip-flop 507 produces a low signal at its Q̄ output, which signal is inverted by inverter 509 and applied to lead HBAOP. A high signal on lead HBAOP indicates to terminal control 215 via input multiplexer 210 that relay HBA of interface circuitry 200 is operated.

Assuming now that relay HBA releases, lead 501 is returned to a positive 5-volt potential by resistor 502. The resulting positive potential, or high signal, causes inverter 503 to apply a low signal to input A of register 504. If this low signal remains on input A of register 504 for the duration of four clock pulses, outputs AO through DO of register 504 will become low. The low inputs on outputs AO through DO are applied to the inputs of NOR gate 506 and cause it to apply a high signal to the reset input of flip-flop 507. Reset flip-flop 507 generates a low signal that appears at the Q output and is inverted by inverter 508 to produce a high signal on lead HBARL that indicates the release of relay HBA to terminal control 215. If, however, the signal on the input lead 501 to filter circuit 204 does not remain constant for a period of four clock pulses, the outputs of register 504 will be a combination of low and high signals. This combination of low and high signals disables AND gate 505 and NOR gate 506, thereby preventing change of flip-flop 507 in response to a transient input.

CALL PROGRESS TRANSLATION

The call progress translation circuits 205 are shown in FIG. 6 and function to detect and decode call progress signals generated by toll service observing circuits, FIG. 3. Call progress signals take the form of direct current signaling appearing on the T, R, and T2, R2 pairs of interface leads: and may be represented as a. a high resistance bridge across the T and R leads;
b. a low resistance bridge across the T and R leads;
c. a positive 130-volt simplex applied to the T and R leads in the presence of a high resistance bridge;
d. a positive 130-volt simplex applied to the T and R leads in the presence of a low resistance bridge; and
e. open circuits on both the T and R leads. Signaling may also be applied to the T2, R2 lead pair in the forms listed above either simultaneously with signals applied to the T, R lead pair or separately.

The call progress signals described above are used by toll service observing circuits to indicate various actions such as seizure, overflow, called line answer, and calling line disconnects. The exact meaning of each signal, however, depends on the type of service observing circuit which is generating the signal. Thus, call progress translation circuits 205 shown in FIG. 6 merely detect and decode the signals which are then forwarded to central service evaluation center 121 in order to determine the meaning of each signal. Illustratively, the generation of call progress signals and their relation to a service observing circuit is described in detail in the aforementioned Kuchas patent at column 20, line 46, et seq.

In order to receive call progress signals, translation circuits 205 shown in FIG. 6 are connected to the T, R, and T2, R2 pairs of the toll service observing circuits, such as toll service observing circuit 0, via toll interface circuit 300 and cut-through relay TCT of toll input port 301 shown in FIG. 3. From toll interface circuit 300, leads T and R are connected via voice circuits 211 shown in FIG. 11 to leads TTCTA and RRCTA, respectively, shown in FIG. 6. Similarly, leads T2 and R2 from toll service observing circuit 0 are connected to leads T2CTA and R2CTA, respectively. The call progress translation circuits 205 associated with leads TTCTA and RRCTA are identical to those associated with leads T2CTA and R2CTA. Thus, only the call progress translation circuitry associated with leads TTCTA and RRCTA will be described in detail. The other circuits function in an analogous manner.

During the setup of connections between the service observing circuits and service observing terminal 100, power is applied to call progress translation circuit 205 when the call accepted relay, CA, is operated by terminal control 215 by means of load CAR and inverter 618. In operating, relay CA closes contacts CA-1, CA-2, CA-3, CA-4, applying ground to leads TTCTA and T2CTA and battery to leads RRCTA and R2CTA via current detectors 600, 605 through 607, 610, and 612 through 614. In order to detect the current signals generated by the service observing circuit, leads TTCTA and RRCTA are connected to a plurality of current detectors which respond to various current levels. For example, current detector 600 responds to a current of at least 10 ma flowing in lead TTCTA. Only current detector 600 is shown in detail; however, current detectors 605 through 607, 610 and 612 through 614 contain equivalent circuitry and function in an analogous manner. Current flowing in lead TTCTA from ground causes a voltage drop across resistor 601 that is monitored by voltage detector 602. Detector 602 may be any one of a number of well-known detection circuits such as a Schmitt trigger circuit or a differential amplifier circuit. When at least 10 ma of current is flowing through resistor 601, detector 602 applies a logical low signal to output lead 603. If, however, current flows in the opposite direction towards ground in lead TTCTA, the voltage drop is reversed and detector 602 does not respond. Similarly, current detector 605 applis a low signal to output lead 604 when at least 30 ma of current is flowing in lead RRCTA towards negative battery. Detector 606 responds when at least 2 ma of current is flowing in lead RRCTA towards negative battery and applies a low signal to output lead 608. Finally, detector 607 applies a low signal to output lead 609 when at least 10 ma of current is flowing in lead RRCTA.

The hereinbefore described high bridge condition generated by toll service observing circuit O causes approximately 2 ma of current to flow in leads TTCTA and RRCTA, over the circuit from ground contact CA-1, resistor 601, lead TTCTA, contact LID-12 (FIG. 11) coil 1101, lead TTCT, contact TCT-3 (FIG. 3), lead T, the high resistance bridge in toll service observing circuit 0, lead R, contact TCT-4, lead RRCT, coil 1103 (FIG. 11), contact LID-10, lead RRCTA, current detectors 605 through 607 (FIG. 6), and contact CA-2 to negative battery. Detector 606 in response to 2 ma of current flow current therethrough places a low signal on lead 608 which is inverted by inverter 620 and applied as a high signal to lead HB1 to indicate a T and R lead high bridge condition to terminal control 215 via signal filter circuitry 204, FIG. 5.

A low bridge condition appearing on leads T and R causes at least 10 ma of current to flow in leads TTCTA and RRCTA over the circuit traced above. Ten milliamperes of current flowing in lead TTCTA causes current detector 600 to apply a low signal to output lead 603, which enables NAND gate 615 to apply a high signal to lead LB1 as an indication of a low bridge condition on leads T and R.

The call progress condition indicated by a positive 130-volts simplex in the presence of a low resistance bridge causes at least 30 ma of current to flow in lead RRCTA towards negative battery. This condition is detected by operation of 30 ma current detector 605 and the application of a low signal to lead 604. The low signal on lead 604 enables NAND gate 615 to apply a high signal to lead LB1 as an indication of a low bridge condition. In addition, since more than 10 ma of current is flowing in lead RRCTA, detector 607 applies a low signal to output lead 609 that enables inverter 616 to apply a high signal to one input of NAND gate 617. The other input of NAND gate 617 receives a high signal from output lead 603 of current detector 600 in that the +130 volts present on lead RRCTA causes current to flow towards ground. Since the current flow is to ground detector 600 does not respond. NAND gate 617 having high signals on both its inputs applies a low signal to inverter 621 which in turn applies a high signal to lead SX1, as an indication of a simplex condition.

The positive 130-volts in the presence of a high bridge call progress condition causes approximately 10 ma of current to flow in lead RRCTA. This condition causes both detectors 606 and 607 to apply low signals to output leads 608 and 609, respectively. The low signal on leads 608 enables inverter 620 to apply a high signal to lead HB1 to indicate a high bridge condition. The low signal on lead 609 is inverted by inverter 616 and applied to one input of NAND gate 617. The other input of NAND gate 617 receives a high signal from the output of inhibited current detector 600 and thus gate 617 applies a low signal to inverter 621. Inverter 621 thereupon applies a high signal to lead SX1, as an indication of a simplex condition.

An open circuit call progress condition on leads T, R causes no current to flow in either leads TTCTA or RRCTA. Thus, detectors 600 and 605 through 607 all apply high signals to their respective outputs. High signals appearing on leads 603 and 604 from detectors 600 and 605 cause NAND gate 615 to place a low signal on lead LB1. Similarly, a high signal on lead 608 at the output of detector 606 causes inverter 620 to apply a low signal to lead HB1. Finally, a high signal on lead 609 at the output of detector 607 causes inverter 616 to apply a low signal to one input of NAND gate 617 which applies a high signal to inverter 621. Inverter 621 thereupon applies a low signal to lead SX1. The presence of low signals on leads LB1, HB1, and SX1 indicates an open circuit condition on the T and R leads of toll service observing circuit 0.

The signals appearing on leads LB1, HB1, SX1, and LB2, HB2, and SX2 are processed by signal filter circuits 204, FIG. 5, in order to eliminate transients and are then forwarded to input multiplex circuitry 210 of terminal control 215 for encoding and transmission to central service evaluation center 121.

LOOP IDENTIFICATION DECODING

Loop identification decoding circuit 206, FIG. 7, functions to identify and decode signals generated by a toll service observing circuit identifying the trunk that seized the service observing circuit. Loop identification signals consist of two digits which are transmitted from the service observing circuit to service observing terminal 100 by a sequential combination of positive and negative current pulses in a code known as panel call indicator (PCI) pulsing. A description of the PCI code and its generation are discussed in detail in the aforementioned Allen patent at page 6, left column, line 62, et seq. The code basically consists of a sequential combination of positive pulses, negative pulses of two magnitudes and blank pulses. The positive pulses operate polar relay SNP shown in FIG. 4. The negative pulses of both magnitudes, hereinafter identified as light negative pulses and heavy negative pulses, operate polar relay SNN, and the heavy negative pulses operate marginal relay MG. None of the relays respond to a blank pulse. The operation of these three relays drives loop identification decoding circuit 206, FIG. 7.

During call processing, after the MG, SNN, and SNP relays are connected to the appropriate interface leads from the service observing circuit as described previously, the loop identification decoding circuit 206 is enabled by terminal control 215. In particular, as will be described in further detail hereinafter, terminal control 215 generates a control instruction that is decoded in control instruction decoder 217, FIG. 12, to produce a low signal on lead Cn-1. The low signal on lead Cn-1 sets enable flip-flop 700 and causes a low signal to be placed on the $\bar{Q}$ output. This low signal is applied via lead 716 to the reset inputs of counter 719 and loop identification latch 715, to enable counter 719 and loop identification latch 715 to receive loop identification signals.

Each incoming PCI pulse is detected by one of relays SNP, SNN, and MG, and the outputs of these relays appearing as signals on leads 704, 707, 713 are processed by signal timers 701 and 708 and counter 719 to determine the value of the digits representing the loop number. The digits are encoded in a 5-4-2-1 format, and as each digit is decoded one or more of gates T1, T2, T4 and T5 or U1, U2, U4 and U5 is enabled representing that digit. An enabled gate is registered in one section of loop identification latch 715 so that an appropriate signal can be forwarded to terminal control 215.

Specifically, as each light or heavy negative pulse is received by relay SNN, contact SNN-1, FIG. 4, is operated. Lead 704 is normally held at ground potential through contact SNN-1; however, the operation of contact SNN-1 allows lead 704 to be placed at positive five volts via resistor 702. This high logic signal appearing on lead 704 is applied to LN signal timer 701 to start the timer. LN signal timer 701 may be one of several well-known designs and is used to filter hits and noise transients which may be present on lead 704. LN signal timer circuit 701 responds to a start signal and subsequent clock pulses, set forth as waveform A, FIG. 30, by producing a signal at the time-out output after a predetermined time has passed. LN signal timer 701 may, for example, be implemented by using a digital counter which is incremented by each clock pulse. Appropriate logic circuits detect when a predetermined state is reached to provide a time-out output. If a high signal remains on lead 704 for the entire predetermined time interval, LN signal timer 701 produces a high signal at the time-out output. If, however, noise on the line is present causing a momentary release of relay SNN, contact SNN-1 closes to ground lead 704. The resulting ground signal appearing on lead 704 is applied to the reset input of LN signal timer 701 to reset the timer back to zero.

Assuming that contact SNN-1 remains operated for the entire required time interval, a high signal produced at the time-out output of LN signal timer 701 is applied to input A of binary-to-decimal decoder 709. Decoder 709 is a well-known device which produces a low signal at one of its outputs 0 through 7, corresponding to the decimal equivalent of the binary signals applied to its inputs A, B, and C. Input A, which is the least significant binary bit, thus receives a high signal from timer 701. Inputs B and C receive low signals from counter 719 which was previously reset to 0. In response to the binary signal inputs, decoder 709 applies a low signal to its output 1. At the end of the negative pulse, relay SNN releases to close contact SNN-1 and ground lead 704. Ground on lead 704 is applied to the reset input of LN signal timer 701 to reset the timer and cause the high signal at its output to change to a low signal. The output of LN signal timer 701 is connected to the count input of counter 719 and the high-to-low signal transition at the output of LN signal timer 701 causes counter 719 to increment once. Counter 719 is a well-known binary digital device which applies sequential binary codes in the form of high signals to its outputs A0, B0 and C0 in response to negative transitions applied to the count input. In response to the negative transition produced by LN signal timer 701, counter 719 applies a high signal to its A0 output which corresponds to the least significant bit. Decoder 709 thus receives a low signal at its input A from LN signal timer 701, a high signal at input B, and a low signal at input C from counter 719. In response to the input signals decoder 709 produces a low signal on its output 2. Therefore, as each negative pulse is received by the loop identification circuitry 206, timer 701 causes decoder 709 to apply a low signal to a progressively higher output. When the negative pulse is removed by the associated service observing circuit counter 719 increments once again thereby causing decoder 709 to advance its low signal output once more.

Positive pulses received from the service observing circuit are detected by relay SNP, FIG. 4, to operate contact SNP-1 and apply a high signal to lead 707 which is filtered by LP signal timer 708. As with the negative pulses discussed above, relay SNP must be operated to apply a high signal to lead 707 for a predetermined time. Assuming contact SNP-1 remains operated for the proper length of time, LP signal timer 708, FIG. 7, times out and applies a high signal to one input of NAND gate 712. A high signal is applied to lead 711 by the system clock during the next clock pulse which enables NAND gate 712 to apply a low signal to NOR gates T1, T4, U1, and U4. NOR gates T1, T4, U1, and U4 may selectively receive a low signal from counter 709 as hereinafter described.

Heavy negative pulses are detected by marginal relay MG, FIG. 4, which operates contact MG-1 to thereby enable resistor 705 to place a high signal on one input of gate 710, FIG. 7, via lead 713. Gate 710 also receives a high signal at another input from LN signal timer 701 each time a heavy negative pulse is detected by polar relay SNN. Gate 710 further receives a high signal at a third input from the system clock on the next clock pulse. All its inputs being high, gate 710 thereupon applies a low signal to gates T2, T5, U2 and U5.

Each NOR gate T1, T2, T4 and T5 and U1, U2, U4 and U5 operates when a low signal is applied to both inputs. Since one input of each gate is enabled by a corresponding output of counter 709, the particlar one of the gates which is operated depends on the exact sequence of pulses received. For example, assume a pulse train consisting of a blank, light negative, positive, and light negative pulse corresponding to the ten digit 4, is received from toll service observing circuit 0. The initial blank pulse causes no response in loop identification decoding circuitry 206. The reception of the first light negative pulse advances decoder 709 once thereby causing a low signal to appear on output 1. When the first light negative pulse is removed, counter 719 again advances causing decoder 709 to apply a low signal to output 2. The positive pulse causes a low signal to be applied to NOR gates T1, T4, U1, and U4. Since NOR gate T4 has both its inputs low, a high signal is applied to the T4 input of loop identification latch 715 thereby setting latch 715 and causing a high signal to appear at output T4 indicating a tens digit value 4. Finally, the last light negative pulse advances decoder 709 twice and inhibits gates 710, 712 so that while a low signal is present on decoder output 4 gate U1 remains inhibited. Other combinations of pulses are received and decoded in a similar manner.

Combinations of pulses received from toll service observing circuit O are decoded by further operations of loop decoding circuit 206 until four light negative pulses have been received. At this time counter 719 has received four negative transitions and thereby applies a high signal to output C0. The high signal appearing at output C0 is inverted by inverter 714 and is applied as a low signal to lead 717 connected to the signal flag circuitry of multiplexer circuitry 210 at the input of terminal control 215. The signal flag circuitry, explained in more detail hereafter, informs terminal control 215 that loop identification decoding circuit 206 has completed processing of the loop identification signals and that terminal control 215 should scan input multiplexer 210 to detect the proper signals.

After the loop identification signals have been scanned and registered, terminal control 215 causes control instruction decoder 217, FIG. 12, to place a low signal on lead 708 to reset enable flip-flop 700. The resetting of enable flip-flop 700 produces a high signal on the $\bar{Q}$ output which is applied to the reset inputs of counter 719 and loop identification latch 715 via lead 716. Counter 719 and loop identification latch 715 are thereby reset and loop identification decoding circuit 206 is returned to the idle state.

DIAL PULSE DETECTION AND TRANSLATION

Figure 8:
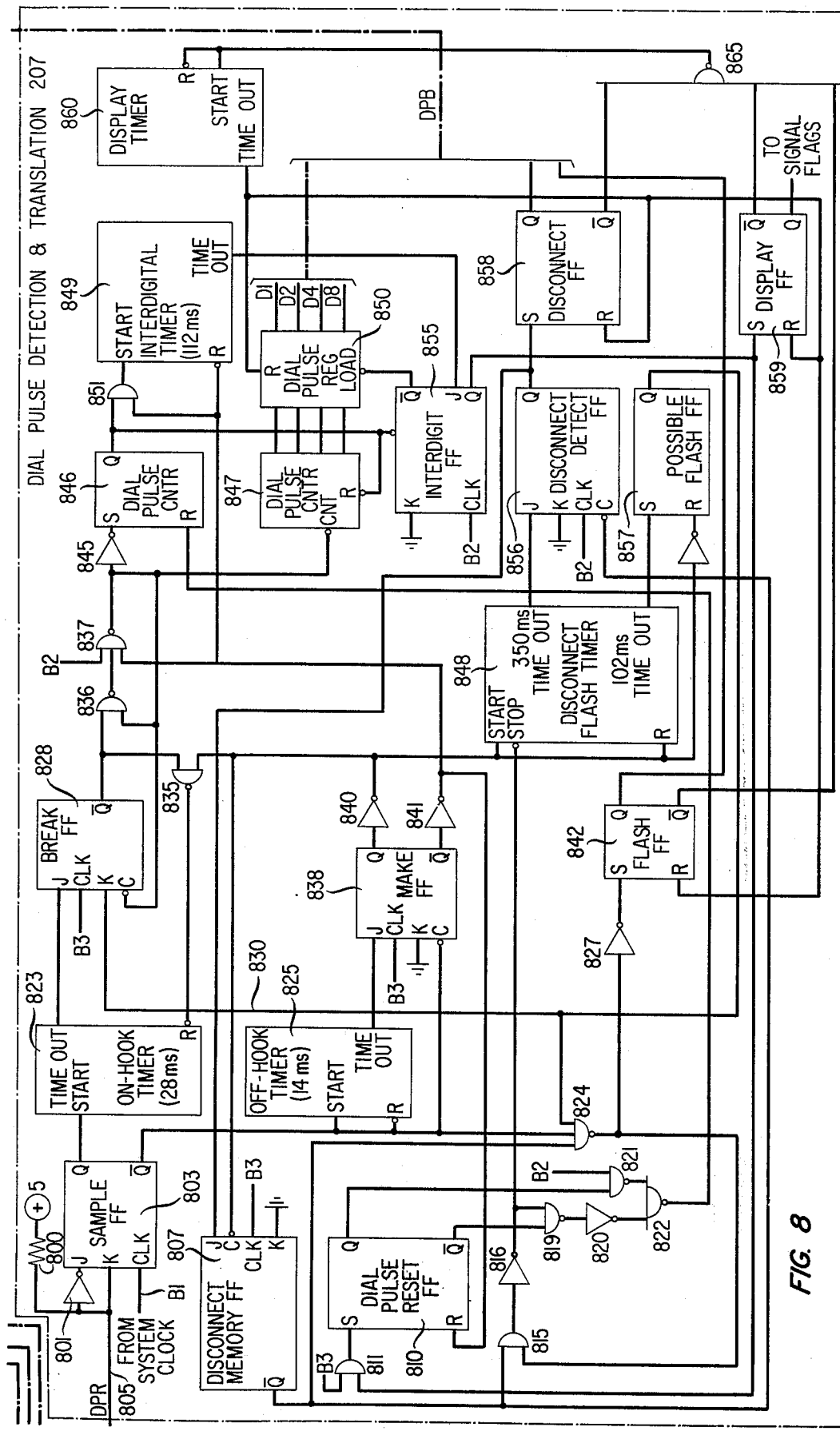
FIG. 8 is an electrical schematic of the dial pulse detection and translation circuits.

The function of dial pulse translation circuit, FIG. 8, is to monitor the on-hook and off-hook status signals generated by the local dial service observing circuits and to detect valid dial pulses, switchhook flashes, and disconnects. The dial pulse translation circuit 207 is connectable to each dial service observing circuit by means of lead DPR. As shown in FIG. 4, this lead is connected through a normally open contact on the cut-through relay of each dial interface circuit to a contact of relay RP. Relay RP is in turn connected across the T and R pairs of the service observing circuit and follows the on-hook and off-hook status of the observed local dial service observing circuit. For example, lead DPR may be connected via contact LCT-8 to contact RP1-1 in local dial input port 401. Ground is normally applied to lead DPR via contacts RP1-1 and LCT-8 to indicate that the observed circuit associated with local dial service observing circuit 0 is on-hook. When the observed circuit goes off-hook, relay RP1 operates and opens contact RP1-1 to allow register 800, FIG. 8, to place a high logic signal on lead DPR.

Dial pulse detection and translation circuit 207 consists of a plurality of timers which time off-hook and on-hook intervals appearing on lead DPR. The outputs of these timers are combined to determine the presence of valid dial pulse, switchhook flash, and disconnect signals. Specifically, high and low logic signals appearing on lead DPR are indicative of on-hook and off-hook signals, respectively, generated by the observed circuit and are sampled by a flip-flop to synchronize signal changes. The outputs of the sample flip-flop 803 are representative of the on-hook and off-hook status of the observed circuit and are timed to eliminate extraneous noise and hits on the observed line. If a signal is present for a predetermined time, a valid make or break interval corresponding to an off-hook and on-hook, respectively, is registered. A pair of logic gates detects when a sequence of make and break intervals representing a dial pulse is present and increments a counter for each dial pulse. Each on-hook interval is also timed by a separate interdigital timer. If the on-hook interval between digits exceeds a predetermined time interval, the output of the dial pulse counter containing the dialed number is loaded into a register for display to terminal control 215.

Similarly, an additional flash disconnect timer 848 monitors on-hook intervals to detect switchhook flashes and disconnects. If the maximum break interval for dial pulses is exceeded, logic circuits determine whether a switchhook flash has been received. Finally, after a predetermined interval, the flash disconnect timer 848 times out to indicate a disconnect has been received. Detected flashes and disconnects are registered in flip-flops for display to terminal control 215.

More particularly, the signal state of lead DPR is sampled by flip-flop 803. A high signal appearing on lead DPR is applied via lead 805 to the K input and as a low signal by inverter 801 to the J input of sample flip-flop 803. Sample flip-flop 803 is a well-known circuit device which changes the state of the Q and $\overline{Q}$ outputs on the negative edge of a clock pulse applied to the clock input CLK in accordance with signals present at the J and K inputs on the positive edge of the clock pulse. A continuous chain of pulses is applied by the system clock to dial pulse detection and translation circuit 207 in the form of three synchronized clock inputs B1, B2, B3, FIG. 30. The state of lead DPR is sampled during timing phase B1. Decisions as to whether on-hook signals are dial pulses, flashes, or disconnects are made during timing intervals B2 and B3. Clock pulses B1 are applied to the clock input of sample flip-flop 803. On the negative edge of a clock pulse B1, sample flip-flop 803 responds to a low signal on input J and a high signal on input K by placing a high signal on its $\overline{Q}$ output. The high signal on the $\overline{Q}$ output is applied to the start input of off-hook timer 825. Off-hook timer 825 is also a well-known circuit device which produces a high signal at the time-out output after a predetermined time interval from the application of a high signal to the start input. The predetermined time interval is illustratively set at 14 milliseconds. Thus, if a start signal is present for 14 milliseconds, off-hook timer 825 will produce a high signal at the time-out output to set make flip-flop 838 and thereby indicate a valid off-hook signal. If, however, the high signal does not persist for the full 14 milliseconds interval and is instead replaced by a low signal, the appearance of the low signal at the reset input of off-hook timer 825 resets it to restart the timing period. Thus, off-hook timer 825 functions to filter extraneous noise which might be present on lead DPR. The high signal produced by off-hook timer 825 at time-out is applied to the J input of make flip-flop 838. The K input of make flip-flop 838 is grounded and thus receives a low signal. Therefore, on the negative edge of the next clock phase B3, make flip-flop 838 applies a high signal to the Q output and a low signal to the $\overline{Q}$ output to indicate a valid make signal has been received.

Similarly, a low signal on lead DPR indicating an on-hook signal generated by the service observing circuit, is applied via lead 805 to input K of sample flip-flop 803 and as a high signal via inverter 801 to the J input of sample flip-flop 803. Accordingly, on the negative edge of the next clock phase B1, sample flip-flop 803 places a high signal on the Q output to start on-hook timer 823. On-hook timer 823 functions in a similar manner to off-hook timer 825 to filter noise on lead DPR. At the end of a predetermined interval, illustratively 23 milliseconds, on-hook timer 823 times out and applies a high signal to the J input of break flip-flop 828. Break flip-flop 828 receives a low signal on input K via lead 830 from the output Q of possible flash flip-flop 857. Thus, at the next negative edge of timing phase B3, break flip-flop 828 places a low signal on output $\overline{Q}$.

Thus, in summary, on-hook and off-hook signals on lead DPR result in high signals at outputs Q and $\overline{Q}$ of sample flip-flop 803, respectively. A valid off-hook signal causes make flip-flop 838 to apply a high signal to its Q output. Similarly, a valid break signal causes break flip-flop 828 to apply a low signal to its $\overline{Q}$ output.

Dial pulses are detected and recorded by gates 836, 837, and dial pulse counter flip-flop 846. A dial pulse begins with an on-hook interval followed by an off-hook interval and then a subsequent on-hook interval. Break flip-flop 828 responds to a valid on-hook interval by applying a low signal from its $\overline{Q}$ output to one input of NAND gate 836 which responds thereto by applying a high signal to one input of gate 837. Since make flip-flop 838 is reset due to the presence of an on-hook interval inverter 841 applies a low signal to a second input of gate 837 which does not change state at this time. However, at the end of the on-hook interval, a valid dial pulse includes an off-hook interval of predetermined length. At the end of the off-hook interval make flip-flop 838 is set by off-hook timer 825. Set make flip-flop 838 applies a low signal to its $\overline{Q}$ output which is inverted by inverter 841 and applied as a high signal to the second input of gate 837. During clock phase B2, gate 837 receives a high signal on a third input. Gate 837 responds to the all input high state by applying a low signal to the count input of dial pulse counter 847 to increment the counter and thereby indicate that an additional dial pulse has been received. The low signal appearing at the output of gate 837 is also applied to the clear input of break flip-flop 828, causing break flip-flop 828 to apply a high signal to its $\overline{Q}$ output and one input of gate 836. The output of gate 836 remains high since the low signal output from gate 837 is also applied to the lower input of gate 836. However, at the end of clock phase B2, gate 837 receives a low signal on the third input that causes gate 837 to produce a high output signal. This high signal is applied to one input of gate 836 and since both inputs are high gate 836 responds thereto by placing a low signal on one input of gate 837 to return gates 836 and 837 to their idle states. Similarly, as each dial pulse is received, dial pulse counter 847 is incremented to register the appearance of each valid dial pulse.

Interdigital intervals are monitored by interdigital interval timer 849 which is controlled by dial pulse flip-flop 846. Dial pulse flip-flop 846 is set by the first detected dial pulse and starts interdigital timer 849. However, interdigital timer 849 does not time-out during a pulsed digit because each succeeding dial pulse resets interdigital timer 849 before time-out. During an interdigital interval, interdigital timer 849 times out, and causes the dial pulse count to be registered and displayed to terminal control 215.

Specifically, as described above, the output of gate 837 generates a low signal each time a valid dial pulse is received. In response to the first dial pulse, the low signal at the output of gate 837 is applied as a high signal by inverter 845 to the set input of flip-flop 846.

The output of set dial pulse flip-flop 846 is in turn applied to gate 851 which thereupon applies a high signal to the start input of interdigital timer 849. Interdigital timer 849 times off-hook intervals to detect whether they are interpulse intervals or whether they are interdigital intervals. If the off-hook signal persists for a full interdigital interval, interdigital timer 849 produces a high signal at its time-out output to set flip-flop 855 to indicate the end of a digit. However, if the off-hook interval on lead DPR is only the interval between dial pulses and not the interval between digits, lead DPR becomes low before interdigital timer 849 times out. As previously explained, a low signal appearing on lead DPR causes a low signal to be applied to the $\overline{Q}$ output of sample flip-flop 803. The low signal produced by sample flip-flop 803 is applied to the clear input of make flip-flop 838. Make flip-flop 838 in responding the clear signal, applies a high signal to its $\overline{Q}$ output, which signal is inverted by inverter 841 and applied as a low signal to the reset input of interdigital timer 849 to reset it before the time-out interval is reached.

Assuming that an interdigital interval is present, interdigital timer 849 sets interdigital flip-flop 855. Set interdigital flip-flop 855 generates a low signal at its $\overline{Q}$ output, which signal is applied to the load input of dial pulse register 850, causing dial pulse register 850 to load the output count of the dial pulse counter 847 and to generate an output corresponding to the dial pulse digit number. The dial pulse register 850 outputs are subsequently displayed via cable DPB to input multiplex circuitry 210, FIG. 10, and from there to terminal control 215. In addition, set interdigital flip-flop 855 applies a high signal to its Q output to set display flip-flop 859. Set display flip-flop 859 generates and transmits a high signal from its Q output to signal flag circuitry 1001, FIG. 10, of the input multiplexer circuit 210 to indicate to terminal control 215 that a dial pulse number is ready for input. In addition, display flip-flop 859 generates a low signal at its $\overline{Q}$ output to disable NAND gate 865, and cause it to apply a high signal to the start input of display timer 860. After a predetermined interval, display timer 860 applies a high signal to its time-out output. This high time-out signal is applied to the reset input of dial pulse register 850 and display flip-flop 859 to reset them in preparation for the next dial pulse digit. Also in preparation for the reception of an additional digit, the high signal appearing at the Q output of interdigital flip-flop 855 set by interdigital timer 849 at the end of an interdigital interval is applied to one input of gate 811. During timing phase B3, a high signal is applied from the system clock to the other input of gate 811 that responds by applying a high signal to the set input of dial pulse reset flip-flop 810. Set dial pulse flip-flop 810 generates a high signal at its Q output which is applied to one input of NAND gate 821. Gate 821 responds to a high clock pulse signal appearing on the other input during clock phase B2 by applying a low signal to gate 822. Gate 822 is inhibited and thereby applies a high signal to the reset input of dial pulse flip-flop 846. Dial pulse flip-flop 846 is thus reset in preparation for the next digit. Reset dial pulse flip-flop 846 in turn applies a low signal from its Q output to the clear input of interdigital flip-flop 855 and the reset input of dial pulse counter 847 to return the dial pulse detection circuitry to the idle state. Dial pulse flip-flop 810 is reset by a high signal applied to its reset input by inverter 841 when make flip-flop 838 is set in response to a subsequent off-hook signal appearing on lead DPR.

Flashes and disconnects are initiated by disconnect flash timer 848 upon receipt of a start signal from make flip-flop 838 via inverter 840 during an on-hook interval.

Disconnect flash timer 848 has two outputs for indicating a disconnect or release condition on lead DPR. One output generates a high signal after the maximum break interval for a dial pulse has been exceeded approximately 102 milliseconds and the other output generates a high signal after approximately 350 milliseconds. Thus, if the maximum break interval is exceeded, a high signal appearing at the 102 millisecond time-out output of disconnect flash timer 848 is applied to the set input of possible flash flip-flop 857. Set possible flash flip-flop 857 produces a high signal on the Q output thereof which is applied to the K input of break flip-flop 828 to indicate that the on-hook interval is a flash interval and not a valid dial pulse interval. Break flip-flop 828 having a high signal on the J input from on-hook timer 823 generates a high signal on the $\overline{Q}$ output on the negative edge of the phase B3 clock pulse.

The high signal appearing at the Q output of possible flash flip-flop 857 is also applied to the one input of NAND gate 824. NAND gate 824 responds to the presence of three conditions to determine if the on-hook interval is a flash or a disconnect. One condition is that the maximum break interval for dial pulses has been exceeded as indicated by a high signal from possible flash flip-flop 857. Another condition is that a disconnect signal has not been received as indicated by a high signal on another input of gate 824 from the $\overline{Q}$ output of disconnect memory flip-flop 807. A third condition is the appearance of an off-hook interval which must appear before disconnect flash timer 848 indicates that a disconnect signal has been received. The third input of NAND gate 824 receives a high signal from the $\overline{Q}$ output of sample flip-flop 803 during an off-hook interval appearing on lead DPR. Assuming the presence of a valid switchhook flash wherein with all inputs are high, NAND gate 824 generates a low signal at its output which is inverted by inverter 827 and applied as a high signal to the set input of flash flip-flop 842. Set flash flip-flop 842 generates a Q output high signal which is forwarded to the input multiplexer circuitry 210 via cable DPB to indicate receipt of a flash. In addition, flash flip-flop 842 generates a $\overline{Q}$ output low signal which inhibits NAND gate 865 to start display timer 860. After a predetermined time, display timer 860 times out and generates a high output signal which is applied to the reset input of flash flip-flop 842 to clear the flip-flop after display to terminal control 215 via input multiplexer 210.

The low signal appearing at the output of NAND gate 824 and indicating the detection of a flash is also applied to an input of NAND gate 815. Responsive thereto, NAND gate 815 generates a high signal which is inverted by inverter 816 and applied as a low signal to the stop input of disconnect flash timer 848 to prevent the disconnect flash timer 848 from continuing timing and falsely indicating a disconnect signal. The low signal output of inverter 816 is also applied to an input of NAND gate 819. NAND gate 819 responds by generating a high signal output which is inverted by inverter 820 and applied as a low signal to one input of NAND gate 822. NAND gate 822 in turn applies a high signal to the reset input of dial pulse flip-flop 846 causing interdigital timer 849 and dial pulse counter 847 to be reset due to the reception of a flash interval.

A disconnect signal is detected when an on-hook interval exceeds 350 milliseconds. In this case, NAND gate 824 does not receive an off-hook signal from sample flip-flop 803 before disconnect flash timer 848 times out after 350 milliseconds. In timing out, disconnect flash timer 848 applies a high signal to the J input of disconnect detect flip-flop 856. The K input of disconnect detect flip-flop 856 is grounded and the negative edge of clock phase B2 enables disconnect detect flip-flop 856 to generate a Q output high signal to set disconnect flip-flop 858. A high signal appearing at the Q output of set disconnect detect flip-flop 858 indicates to terminal control 215, via input multiplexer circuitry 210, that a disconnect signal has been received. A low signal appearing at the $\overline{Q}$ output of disconnect detect flip-flop 858 enables display timer 860 via gate 865 to clear disconnect detect flip-flop 858 after a predetermined display interval in the manner previously described in connection with flash flip-flop 842.

The Q output high signal of disconnect detect flip-flop 856 is also applied to the J input of disconnect memory flip-flop 807. With the K input grounded, disconnect memory flip-flop 807 generates a $\overline{Q}$ output low signal on the next negative edge of clock phase B3 that is applied to one input of NAND gate 824 to prevent it from operating to indicate reception of a flash interval. The low signal appearing at the $\overline{Q}$ output of disconnect memory flip-flop 807 is also applied to NAND gate 815 and the clear input of disconnect detect flip-flop 856 which is thereby cleared and returned to the idle state. NAND gate 815 responds to a low signal at its input by applying a high signal to inverter 816 to stop disconnect flash timer 848 and reset dial pulse flip-flop 846.

VOICE AND TONE DETECTION CIRCUITS

The voice and tone detection circuits, FIG. 11, function to amplify voice signals from the service observing circuits and to detect multifrequency and TOUCH-TONE signals produced by the toll and local service observing circuits, respectively. The circuits consist of a number of transformer and battery feed circuits which introduce battery current into appropriate pairs of the local dial interface circuits and couple voice signals produced by the service observing circuits to the outgoing voice channel which in turn transmits the signals to service evaluation center 121.

Specifically, signals arriving at the toll interface circuits, FIG. 3, on leads T and R are coupled, via transformer coils 1101 through 1104, FIG. 11 to voice amplifier 1120. The output of voice amplifier 1120 is in turn connected to hybrid circuit 1125. Hybrid circuit 1125 is a well-known isolation and impedance matching device for coupling incoming signals to selected output ports. In particular, multifrequency signals arriving via leads T and R are coupled to multifrequency receiver 1127 in tone detection and translation circuit 208. Multifrequency receiver 1127 is a well-known device which detects and registers multifrequency signals used on toll grade circuits and displays appropriate output signals in a well-known two-out-of-six code format on leads MF1 through MF6 to indicate which signals have been detected. Leads MF1 through MF6 are connected, via input multiplexer circuitry 210 to terminal control 215. In addition, voice signals appearing on leads T and R are coupled by hybrid circuit 1125 from voice amplifier 1120 to voice channel 1128 to be transmitted directly to remote service evaluation center 121.

Multifrequency and voice signals present on leads T2 and R2, FIG. 3, of the toll interface circuits are connected, FIG. 11, via coils 1106, 1107, 1110, and 1112 to voice amplifier 1121. The output of voice amplifier 1121 is in turn coupled by hybrid circuit 1125 to multifrequency receiver 1127 and voice channel 1128.

TOUCH-TONE and voice signals appearing on leads T and R of the local dial interface circuit, FIG. 4, are connected via coils 1113, 1114, 1116, and 1117, FIG. 11, to voice amplifier 1122. Hybrid circuit 1125 in turn couples the output of voice amplifier 1122 to voice channel 1128 and TOUCH-TONE receiver 1130. Receiver 1130 is a well-known circuit which detects TOUCH-TONE frequency signals and provides corresponding output signals on a two-out-of-eight code format on leads TT0 through TT7. Signals appearing on leads TT0 through TT7 are forwarded to terminal control 215 for coding and transmission to service evaluation center 121.

TERMINAL CONTROL

Figure 13:
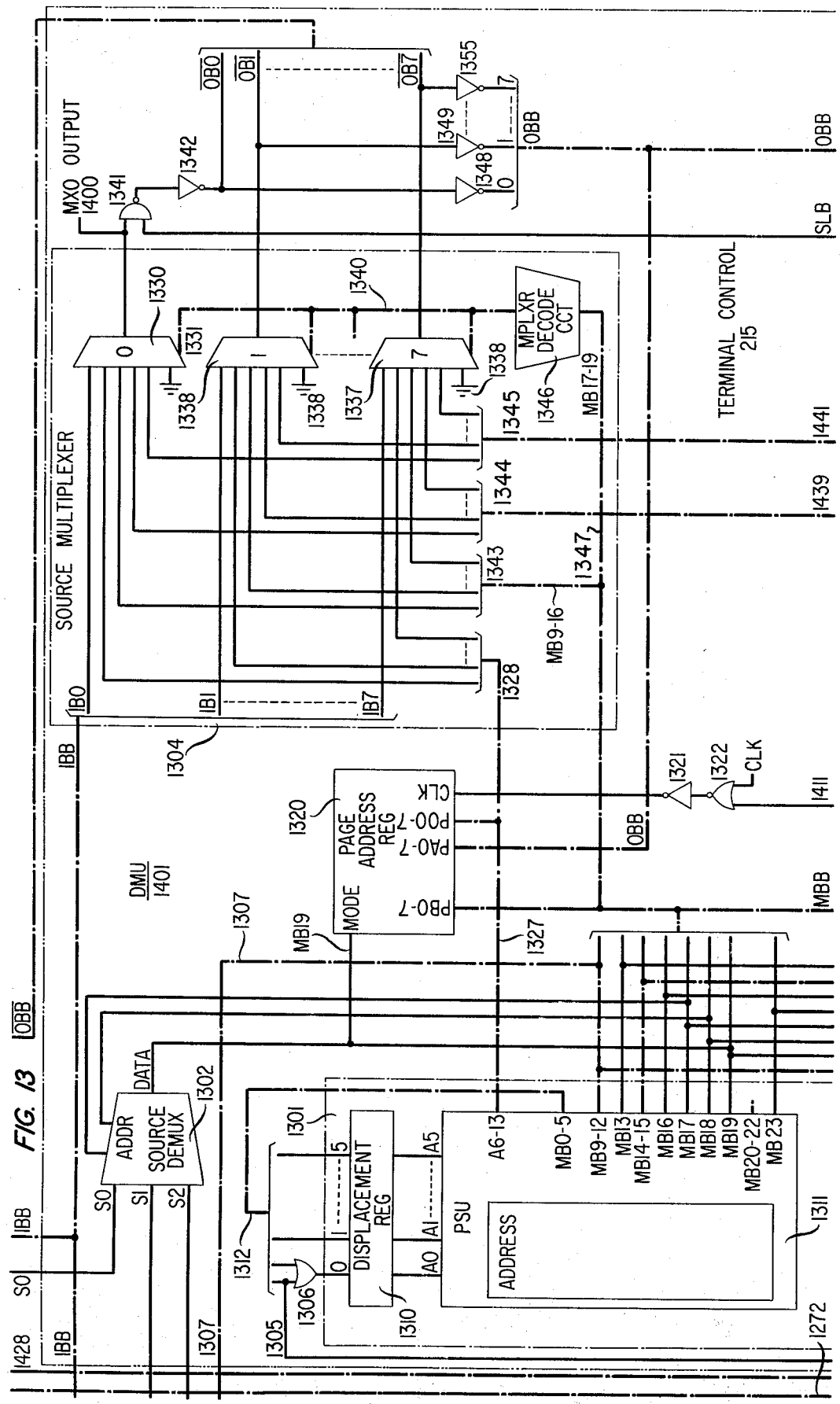
FIGS. 13 and 14 show the circuitry of the terminal control in block schematic form.
Figure 14:
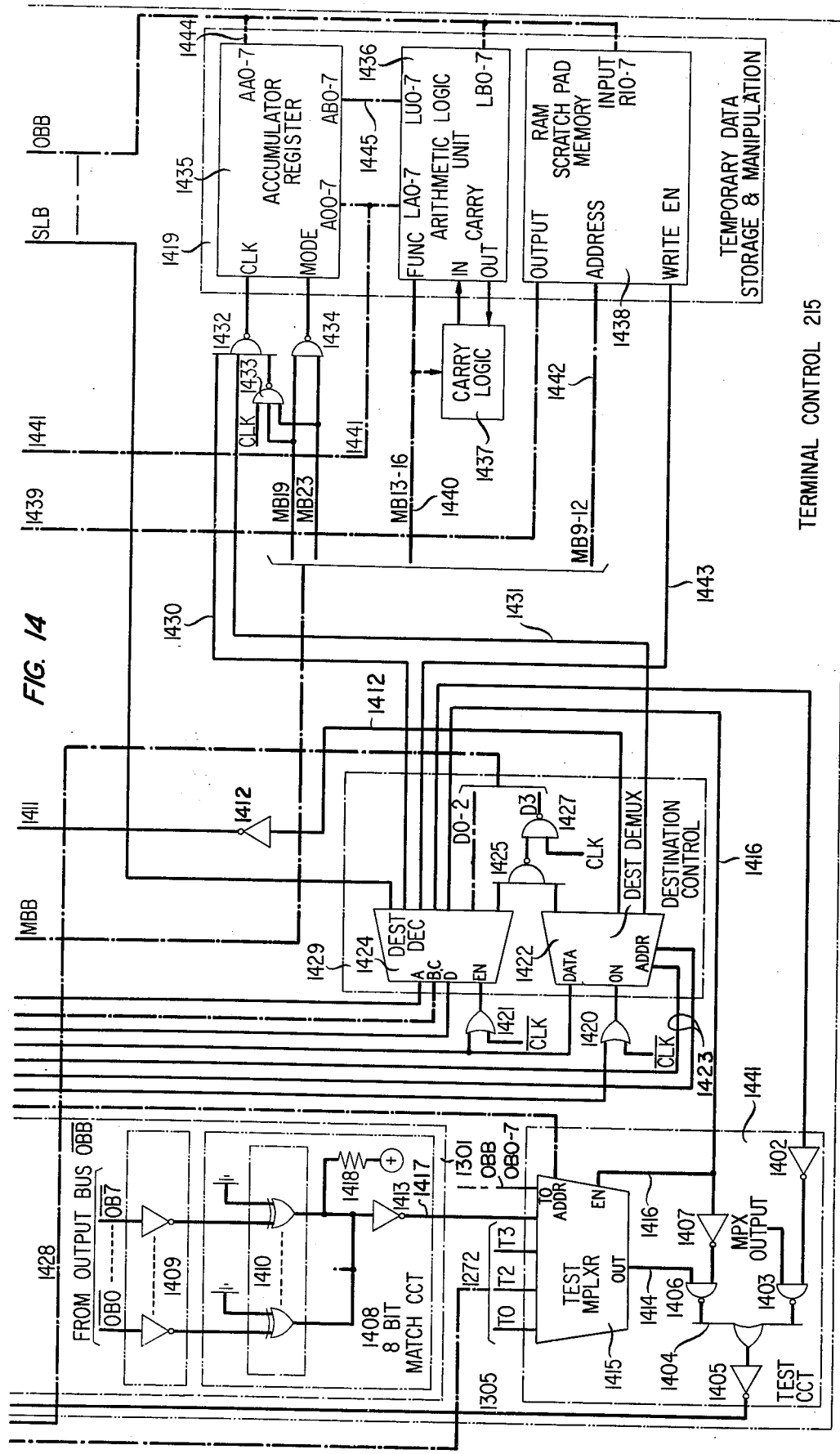

The function of the terminal control 215 circuits, FIGS. 13 and 14, is to provide sequencing and control functions for the electromechanical interface and electronic data gathering circuitry described above. Terminal control 215 is arranged in a general purpose configuration known as a programmable controller. The programmable controller is capable of performing data manipulation under control of program order words stored in an internal read-only memory. As will be hereinafter explained, the read-only memory is programmed to operate terminal control 215 as a semi-autonomous data gathering system.

The programmable controller architecture consists of three main functional blocks; a program storage unit PSU 1311, FIG. 13, a control unit CU 1301 and a data manipulation unit DMU 1401, FIGS. 13 and 14.

Program storage unit PSU 1311 includes a read-only memory and associated addressing and drive circuitry (not shown). Memories suitable for use in the illustrative embodiment are well-known in the art and thus will not be discussed in detail herein. A set of instructions or program order words is stored in the memory during its manufacture and these instructions are sequentially read from the memory to control the operation of terminal control 215. The details of the instruction set will be discussed further hereinafter.

Control unit CU 1301 includes circuitry for generating address words which are applied to the read-only memory to select a particular program order word. Control unit CU 1301 also includes various fault detection hardware and matching circuits to continuously check the operation of terminal control 215. In addition to conventional parity checking logic, the programmable processor may utilize duplicated data manipulation units which perform identical tasks. Matching circuitry in terminal control 215 compares the outputs produced by identical operations to detect multiple faults. Parity checking and duplication of circuitry to achieve fault detection are well-known techniques in the art and accordingly will not be discussed further herein. To clarify the discussion of the invention herein, parity and fault detection circuits have been omitted from FIGS. 13 and 14. A more complete discussion of fault checking circuitry suitable for use with the illustrative embodiment is given in U.S. Pat. No. 3,931,505 issued to R. W. Sevcik on Jan. 6, 1976 and assigned to the same assignee as the present invention.

Data manipulation unit DMU 1401 includes a plurality of registers and various logic circuits which can transfer data from one register to another under control of program order words generated by program storage unit PSU 1311. In addition, data manipulation unit DMU 1401 includes an arithmetic logic unit 1436 which can perform arithmetic or Boolean operations on data stored within the register. Test circuitry 1441 is also included, which circuitry allows the results of various tests to be provided to terminal control 215 to initiate a program jump as will hereinafter be further explained.

Figure 16:
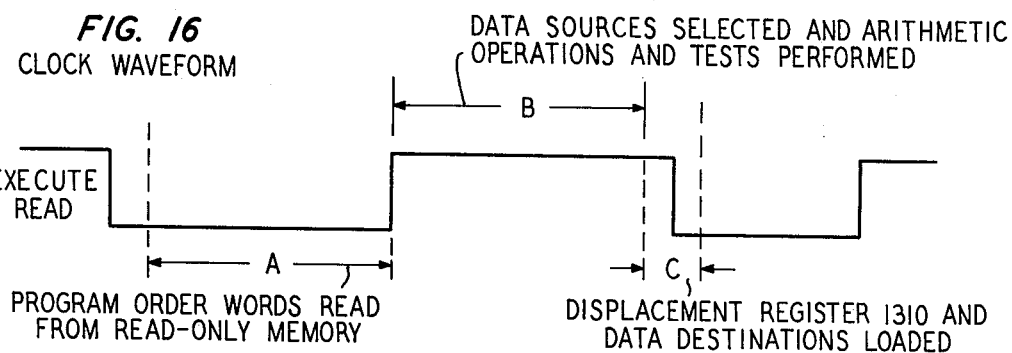
FIG. 16 shows the output waveform of the terminal control clock.

The operation of the program storage, control and data manipulation units is synchronized and regulated by well-known clock circuitry (not shown) which provides a clock waveform shown in FIG. 16. Operation of the programmable controller is carried out in two phases. During READ phase A program order words are read from the read-only memory of program store unit PSU 1311 and appear as D.C. signals at the memory outputs MB0 through MB23. During the second, or EXECUTE phase B, data sources for transfer operations are selected and arithmetic operations are performed by arithmetic logic unit 1436. The clock waveform falls at the end of the EXECUTE phase in preparation for the next TIMING phase C. As will hereinafter be explained in greater detail, most data registers are constructed from negative-edge triggered D-type flip-flops. These flip-flops are well-known logic devices whose outputs change to assume the value of the inputs on the negative edge of a clock pulse provided to the device. Thus, as the clock waveform driving terminal control 215 falls, the registers, which are selected as data destinations, are loaded with the results of the computations executed during the previous phase. In addition, the read-only memory of program store unit 1311 is designed with a slight input delay and thus the outputs thereof do not change until the end of TIMING phase C. This delay prevents timing errors.

More specifically, program storage unit PSU 1311, FIGS. 13 and 14, includes the read-only memory and associated addressing and drive circuits. The read-only memory is a well-known circuit device which receives a 14-bit address word at address inputs A0 through A13 and produces a 24-bit program order word at outputs MB0 through MB23 from a location identified by the address input. As mentioned previously, the read-only memory is designed for timing purposes with a slight input delay so that memory outputs MB0 through MB23 do not change immediately after an address has been applied to the address input. This delay is used to insure that the data at the selected data destinations has become settled before the next order is executed.

Control unit CU 1301 contains address generation circuitry which together with circuitry located in the data manipulation unit DMU 1401 is used to generate address words that are applied to the read-only memory to cause generation of the program order words. In particular, program address generation is performed on a "page" basis. The high order eight bits A6 through A13 of an address word select one out of 256 possible program "pages". The page address is stored in page address register 1320 of data manipulation unit DMU 1401 and is changed under direct program control. The change of page address occurs either by loading register 1320 directly from the read-only memory or from another register by a data transfer operation. The direct loading operation and data transfer operations will be explained in more detail hereinafter.

The address or "displacement" of a particular program order word on each program "page" is provided by the A0 through A5 bits of the program address word. These six bits are provided by the preceding program order word. Specifically, each program order word which appears at outputs MB0 through MB23 of the read-only memory contains the displacement for the next program order word in bits MB0 through MB5. These bits are applied via cable 1312 and OR gate 1306 to displacement register 1310. At the end of each EXECUTE clock phase memory bits MB0 through MB5 are loaded into displacement register 1310. The outputs of displacement register 1310 are applied to A0 through A5 memory input leads of the read-only memory to form part of the address word specifying the program order word which is to be read from the read-only memory during the next memory READ cycle.

Control unit CU 1301 also contains match circuit 1408 which is used to perform various tests on data stored in data manipulation unit DMU 1401 as will hereinafter be explained in detail.

Data manipulation unit DMU 1401 contains circuitry which falls in five main categories:

(1) Source multiplexer circuitry 1304 which comprises multiplexers 1330–1337 and associated circuitry. The source multiplexer circuitry 1304 selects, under control of a program order word, a source of data used in a data transfer or arithmetic operation;

(2) Temporary data storage and manipulation circuitry 1419 which consists of accumulator register 1435, scratch-pad random access memory 1438 and arithmetic logic unit 1436;

(3) Page address register 1320 which provides a portion of the program address circuitry as explained above;

(4) Destination control circuitry 1429 including destination decoder 1424 and destination demultiplexer 1422 which select data destinations for data transfer operations; and (5) Test circuitry 1441 including test multiplexer 1415 and logic circuitry 1402-1407 which performs tests on data selected under control of a program order word and which provides the results to OR gate 1306 in control unit CU 1301 to cause an instruction jump as will hereinafter be explained.

Data operations performed by data manipulation unit DMU 1401 fall into four general categories: 1. data movement between two general registers or between a general register and page address register 1320; 2. data manipulation in which arithmetic operations are performed on data words by arithmetic logic unit 1436 with results stored in the accumulator register 1435; 3. data test operations performed by the test multiplexer 1415 which cause an instruction jump by means of displacement register 1310 and associated logic; 4. direct loading operations in which information stored in the read-only memory is loaded in page address register 1320 or transferred to another location.

Figure 17:
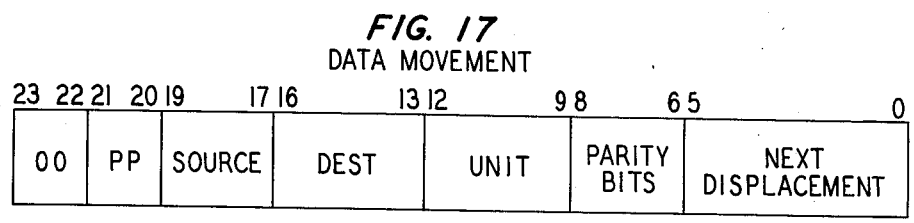
FIG. 17 shows the arrangement of information bits in a program order word specifying a data movement operation.

Data movement operations are carried out in three steps which are regulated by the terminal control clock. During the first step, a program order word is read from the read-only memory to control the data movement. The organization of information in a typical order word specifying a data movement operation is shown in FIG. 17. Bits 0 through 5 of a data movement word contain the "displacement" address for the succeeding order word in the instruction routine as explained above. Bits 6 through 8 contain parity information used to check the operation of terminal control 215. The significance of these bits is explained more fully in the above-mentioned Sevcik patent. Bits 9 through 12 contain a binary code which together with bits 17 through 19 are used to specify a particular data source for the data movement operation. A data source may be either internal circuitry of terminal control 215 or external circuitry selected by input multiplexer circuitry 210, FIG. 10. Internal data sources, FIGS. 13, 14, include accumulator register 1435, page address register 1320, and scratch pad memory 1438. External data sources are selected by input multiplexer circuitry 210 operating under control of leads S1 and S2 and source select cable 1307 comprised of leads N0 through N3. Data from external sources selected by control signals appearing on the leads of cable 1307 and leads S1 and S2 is received over the input bus IBB comprising leads IB0 through IB7. The generation of control signals on the leads of cables 1307 and 1303 is discussed in more detail below. Each data source has a unique binary code assigned to it appearing as bits 17 through 19, FIG. 17, in a program order word. The assignments are given in Table I.

TABLE I

| SOURCE | BIT 19, | 18, | 17 |
|---|---|---|---|
| Accumulator Register 1435 | 0 | 0 | 0 |
| Page Address Register 1320 | 0 | 1 | 0 |
| Scratch Pad Memory 1438 | 1 | 1 | 0 |
| External Source F1F0 Receiver 1261 (SO) | 1 | 0 | 0 |
| External Source Address Decode 1003 (S1) | 1 | 0 | 1 |
| External Source Address Decode 1003 (S2) | 1 | 1 | 1 |

Bits 13 through 16 of the program order word specify a destination to which data is to be transferred. As with the data sources, each data destination has a unique code assigned to it. Data destinations and corresponding codes are shown in Table II.

TABLE II

| DESTINATION | BIT 16, | 15, | 14, | 13 |
|---|---|---|---|---|
| Accumulator Register 1435 | 0 | 0 | 0 | 0 |
| Page Address Register 1320 | 0 | 0 | 1 | 0 |
| Scratch Pad Memory 1438 | 0 | 1 | 1 | 0 |
| Output Bus OBB | 1 | 1 | 1 | 0 |
| External Destination F1F0 Transmitter 1260 (DO) | 0 | 1 | 0 | 0 |
| External Destination Programmable Timer 1270 (D1) | 0 | 1 | 0 | 1 |
| External Destination Spare (D2) | 0 | 1 | 1 | 1 |
| External Destination Instruction Decoder 1201 (D3) | 1 | 0 | 0 | 0 |

Bits 9 through 12 of the program order word may also be used to select a data destination in combination with bits 13 through 16.

As shown in Table II, data destinations may also be external destinations selected by coded signals appearing on leads D0 through D3 of cable 1428. Data is forwarded from terminal control 215 to external destinations selected by the leads of cable 1428 over output bus $\overline{OBB}$.

Program order word bits 20 and 21, FIG. 17, are parity bits used to verify the correct coding of bits 9 through 19. The use of these bits and circuitry for fault detection is well-known and will not be discussed further herein. Bits 22 and 23 are used to distinguish between different types of program order word instructions.

After an appropriate program order word is read from the read-only memory of program store unit PSU 1311, FIGS. 13, 14, the second step of the data movement operation takes place when a data source is selected and connected to output bus $\overline{OBB}$ and internal transfer bus OBB. This step occurs during the EXECUTE phase B of the clock cycle, FIG. 16. Specifically, the selected data source is identified by the code on the MB17 through MB19 output leads of the read-only memory of program store unit PSU 1311. These coded outputs are applied via memory bit bus MBB and cable 1347 to multiplexer decode circuit 1346 which converts the coded outputs into control signals applied to multiplexers 1330 through 1337 via cable 1340. Multiplexers 1330 through 1337 are also well-known circuit devices which selectively connect one of a plurality of inputs to an output under control of signals appearing on address or control leads. Multiplexers 1330 through 1337 each have a plurality of inputs including one of leads IB0 through IB7 of input bus IBB, the leads 1343 which are connected to the MB9 through MB16 outputs of the read-only memory; and leads 1344 and 1345 which are connected via cables 1439 and 1441 to the outputs of scratch-pad memory 1438 and accumulator register 1435 respectively. Multiplexers 1330 through 1337 contain an internal inversion so that signals applied by multiplexers 1330 through 1337 to output bus leads $\overline{OB0}$ through $\overline{OB7}$ are actually the complement of the signals appearing at the multiplexer inputs. For transfers which take place between logic circuits which are "internal" to terminal control 215, signals appearing on output bus $\overline{OBB}$ are inverted by inverters 1348 through 1355 and applied to internal transfer bus OBB.

The third step in a data movement operation occurs at the end of the EXECUTE clock phase C, FIG. 16, when the clock waveform falls to its low value. At this time data on output bus $\overline{OBB}$ or transfer bus OBB is gated into the selected data destination identified by the binary code contained in bits 13 through 16 and in some cases 9 through 12 of the program order word. Accordingly, outputs MB13 through 16 of the read-only memory are applied to destination decoder 1422 which is controlled by the terminal control clock to gate data into the appropriate destination.

For example, assume that a data movement operation specifies a transfer of data from accumulator register 1435 to scratch pad memory 1438. In this case the source code present at outputs MB17 through 19 of the read-only memory is 0000 and is applied via cable 1347 to multiplex decoder 1346. Multiplex decoder circuit 1346 responds to control multiplexers 1330 through 1337 to connect input leads 1345 to output leads $\overline{OB0}$ through $\overline{OB7}$. The output of multiplexer 1330 is forwarded through NAND gate 1341 and inverter 1342 to output lead $\overline{OB0}$. NAND gate 1341 and inverter 1342 are utilized as will hereinafter be explained to set the least significant bit of a data word to zero during a transfer operation. Thus, during the EXECUTE clock phase B the outputs of accumulator register 1435 appear inverted on output bus $\overline{OBB}$ and appear as the true values on transfer bus OBB after being re-inverted by inverters 1348 through 1355. The output signals from accumulator registor 1435 appearing on bus OBB are applied to inputs RIO through R17 of random access scratch pad memory 1438.

Advantageously, each of the sixteen word locations in scratch pad memory 1438 can be treated as an independent 8-bit register. In accordance with the principles of the present invention, two word locations are utilized as a sixteen bit register to store the busy/idle status of the service observing circuits associated with service observing terminal 100. As will hereinafter be described, scratch pad memory 1438 may be loaded and changed both by terminal control 215 operating under control of the read-only memory 1311 and by commands received from remote service evaluation center 121.

In particular, each word location or register in scratch pad memory 1438 is selected by a four-bit address code. The address code is received from the read-only memory outputs MB9 through MB12 over memory bit bus MBB and cable 1442. However, even though a word location in scratch pad memory 1438 is selected by an address code appearing on cable 1442, the information appearing at inputs R10 through R17 is written into the selected location of scratch pad memory 1438 under control of destination decoder 1424. Specifically, the destination code 0110 appearing at the read-only memory outputs MB13 through MB16 in this case 0110 is applied to inputs A through D of destination decoder 1424. Destination decoder 1424 is a well-known logic device arranged to apply a low signal to one of its plurality of outputs selected by address signals appearing at address inputs A through D. However, destination decoder 1424 does not actually place a low signal on the selected output until a low signal is received at enable input EN connected to the output of OR gate 1421. OR gate 1421 receives a low signal at one input from the read only memory output MB23 coded as a 0 bit, FIG. 17, for a data transfer operation. The other input of OR gate 1421 is connected to an inverted terminal control clock signal that appears as a low signal during the clock EXECUTE cycle. Responsive to low signals applied to both inputs, OR gate 1421 applies a low signal to the enable input of destination decoder 1424 which in turn applies a low signal to lead 1443. The low signal appearing on lead 1443 is applied to the write enable input of scratch pad memory 1438 to enable the data information appearing at inputs R10 through R17 to be written in the word location specified by the address code appearing on cable 1442. The transfer of data between accumulator register 1435 and scratch pad memory 1438 is thus completed.

A data movement may also take place between a source which is "external" to terminal control 215 and an internal register. It should be noted, however, that due to the particular connection of the terminal control circuitry that a direct transfer cannot take place between an external source and scratch pad memory 1438 since program order word bits 9 through 12 are used to select the external source and a word location in scratch pad memory 1438. Thus, an intermediate transfer between an external source and accumulator register 1435 is necessary. Assume, for example, that a program order word specifying a data transfer between an input multiplexer 210 selected external source and accumulator register 1435 is read from the read only memory. In this case, the read only memory outputs MB17 through MB19 specify one of the external source codes shown in Table I. Output MB19, a "one" for all external codes S0 through S2, is applied to the data input of source demultiplexer 1302 which also receives address signals from read only memory outputs MB17 and MB18. Responding to a high signal at the data input and address signals at the address input source demultiplexer 1302 applies a low signal to a selected one of the outputs S1 and S2, connected to input multiplexer 210, FIG. 10. In addition, memory outputs MB9 through MB12 of the read only memory, FIGS. 13 and 14, are used to select an external source and bit information appearing on these outputs is forwarded via cable 1307 and leads N0 through N3 to input multiplexer 210, FIG. 10. Input multiplexer 210 responds to signals appearing on leads S0 and S2 and N0 through N3 by selecting a particular data source and connecting the source to leads of input bus IBB.

Leads IBO through IB7, FIGS. 13 and 14, of input bus IBB are each connected to a corresponding input of multiplexers 1330 through 1337. Multiplexers 1330 through 1337 are in turn controlled by multiplexer decoder 1346 which receives commands over cable 1347 and bus MBB from outputs MB17 through MB19 of the read only memory. In response to control commands received from the read only memory, multiplexer decoder 1346 controls multiplexers 1330 through 1337 to connect leads IBO through IB7 to output bus OBB. Data signals appearing on bus OBB are applied via inverters 1348 through 1355 to transfer bus OBB and to inputs AA0 through AA7 of accumulator register 1435 via cable 1444.

Accumulator register 1435 is an 8-bit register having two sets of inputs AA0 through AA7 and AB0 through AB7. Data from one set of inputs is gated into accumulator register 1435 on the negative edge of a clock signal applied to the clock input. A signal at the mode input selects the set of inputs by which data is to be gated into accumulator register 1435. One signal applied to the mode input causes data to be gated from inputs AA0 through AA7 while another signal at the mode input causes data to be gated from inputs AB0 through AB7. The mode input of accumulator register 1435 is connected to the output of gate 1434. During the specified transfer operation, gate 1434 receives a low signal at one input from output MB23 of the read only memory via memory bus MBB. Gate 1434 thereupon applies a high signal to the mode input of accumulator register 1435. Data on bus OBB is gated into accumulator register 1435 via cable 1444 and inputs AA0 through AA7 under control of signals applied to the clock input from the output of NAND gate 1432. NAND gate 1432 receives a high signal at one input from gate 1433 which is in turn inhibited by a low signal received at one input from the read only memory output MB23. NAND gate 1432 receives a high signal at another input via lead 1431 from destination demultiplexer 1422. Destination demultiplexer 1422 is inhibited by a high signal applied to the enable input from OR gate 1420 which receives a high signal at one input from output MB19 of the read only memory.

Another input of NAND gate 1432 is connected via lead 1430 to destination decoder 1424 which receives coded signals on the address inputs A through D from outputs MB13 through MB16 of the read only memory. During the EXECUTE clock cycle destination decoder 1424 receives a low signal at the enable input EN from OR gate 1421 and responds thereto by applying a low signal to lead 1430. The low signal appearing on lead 1430 enables NAND gate 1432 to apply a high signal to the clock input of accumulator register 1435. At the end of the EXECUTE clock cycle, the inverted clock input applied to OR gate 1421 rises to a high value causing OR gate 1421 to apply a high inhibit signal to the enable input EN of destination decoder 1424. Destination decoder 1424 thereupon applies a high signal to an input of NAND gate 1432 via lead 1430. With all of the inputs high NAND gate 1432 applies a low signal to the clock input of accumulator register 1435. The high to low transition appearing at the clock input, causes the data at inputs AA0 through AA7 to be gated into accumulator register 1435 thereby completing the data transfer.

Data may also be transferred from an internal source to an internal destination. This operation proceeds similarly to an internal data transfer. Data is first gated onto the output bus $\overline{OBB}$ by means of multiplexers 1330 through 1337. Output bus $\overline{OBB}$ is connected to various external destinations such as the control instruction decoder 217 and the data transmission circuitry shown in FIG. 12. Data is gated into the external locations under control of leads D0 through D3. Leads D0 through D3 are connected to destination decoder 1424 and destination demultiplexer 1422 by means of cable 1428. Destination decoder 1424, as previously described, receives the destination code from the program order word appearing at the read only memory outputs MB13 through MB16 at address inputs A through D and responds thereto by selecting one of outputs D0 and D2. Destination decoder 1424 is controlled by OR gate 1421 to apply a low signal to a selected one of leads D0 and D2. This low signal is used to control the selected destination to gate in the data appearing on output bus $\overline{OBB}$. In addition, either destination decoder 1424 or destination demultiplexer 1422 may apply a low signal to the inputs of NAND gate 1425 which thereupon applies a high signal to NAND gate 1427. NAND gate 1427 is thus enabled and applies a low signal to lead D3 during the clock EXECUTE cycle. The low signal on lead D3 is used to gate data into a selected external destination.

A data movement operation may also be used to store all zeros in a selected data destination. To accomplish this multiplexer decoder 1346 controls multiplexers 1330 through 1337 to connect grounded inputs 1338 to output bus $\overline{OBB}$ to place high signals on leads $\overline{OB0}$ through $\overline{OB7}$. These signals are then gated to a selected destination as previously described.

Finally, a data movement operation may take place with the least significant bit of the transferred word set to a logical "one". In this type of transfer destination decoder 1424 operating under control of the read only memory outputs MB13 through MB16 and the terminal control clock applies a low inhibit signal to lead SLB connected to an input of gate 1341. Inhibited gate 1341 applies a high signal to inverter 1342 which in turn applies a low signal to lead $\overline{OB0}$ thereby forcing the least significant bit to be a logical "one".

Arithmetic operations may also be performed by the terminal control 215. These operations are performed by arithmetic logic unit 1436 operating in conjunction with accumulator register 1435. Arithmetic operations may involve either one or two variables. For those operations involving only one variable, such as rotate or complement operations, the output data from accumulator register 1435 is used at the input variable. For operations involving two variables, the output of accumulator register 1435 is used as one variable and the other variable is derived from data signals appearing on data bus OBB. The results of the arithmetic operation is always stored in accumulator register 1435 at the end of the operation.

Figure 18:
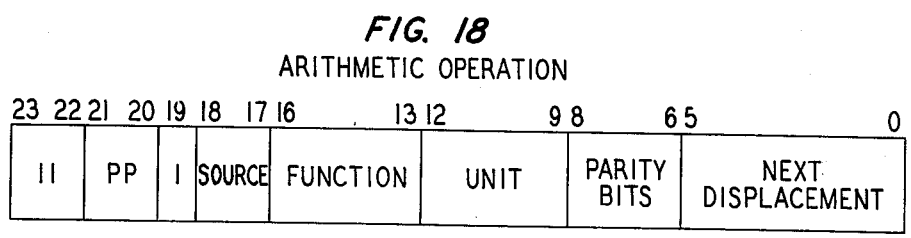
FIG. 18 shows the arrangement of information bits in a program order word specifying an arithmetic operation.

Specifically, a program order word defining an arithmetic operation is shown in FIG. 18. Bits 0 through 8 are parity and address bits as explained above. Bits 9 through 12 are used in conjunction with bits 17 and 18 to define a data source for one variable, if required. Bits 13 through 16 are used to define the function which is to be performed on the variables. Bits 19, 22 and 23 are set to "one" to define an arithmetic operation and bits 20 and 21 are used to check for parity errors in bits 9 through 19.

An arithmetic operation begins when a program order word similar to that shown in FIG. 18 is read out of the read only memory during a READ cycle of the terminal control clock. The function code appearing at read only memory outputs MB13 through MB16, FIGS. 13 and 14 is applied via memory bit bus MBB and cable 1440 to the function inputs of arithmetic logic unit 1436.

Arithmetic logic unit 1436 is a well-known circuit device which performs arithmetic operations on one or two variables. In particular, arithmetic logic unit 1436 receives one set of variable inputs at inputs LA0 through LA7 from accumulator register 1435 outputs AO0 through AO7. The other variable inputs are received at inputs LB0 through LB7 of arithmetic logic unit 1436 from transfer bus OBB. The results of computations appearing at outputs LU0 through LU7 of arithmetic logic 1436 are applied to accumulator register 1435 inputs AB0 through AB9 via cable 1445. An example of an arithmetic logic circuit suitable for use with the illustrative embodiment is circuit SN7489 described on pages 5 through 27 of the "The TTL Data Book for Design Engineer 1976, Texas Instruments, Inc." The described SN7489 device is a 4-bit circuit, however, 2 units may be used in parallel to handle 8 bits. The function code applied to the function input of arithmetic logic circuit 1436 is also applied to carry logic 1437. Carry logic 1437, under control of the function code, provides a carry operation necessary for certain operations such as rotate and complement.

Source data for computations is selected when the source code appearing at bits 17, 18 and 19 of the program order word is applied to multiplexer decoding circuit 1346 which controls multiplexers 1330 through 1337 to apply data from the selected source via output bus OBB, and transfer bus OBB, to inputs LB0 through LB7 of arithmetic logic unit 1436.

The results of the computation are applied by arithmetic logic unit 1436 via cable 1445 to inputs AB0 through AB7 of accumulator register 1445. In response to a low signal at the mode input, accumulator register 1435 gates in information appearing at inputs AB0 through AB7 under control of clock signals appearing at the clock input. The mode input of accumulator register 1435 receives a low signal from the output of NAND gate 1434 which, in turn, receives high signals at both its inputs from outputs MB19 and MB23 of the read only memory via bus MBB. High signals from the read only memory outputs MB19 and MB23 are also applied to both inputs of NAND gate 1433. During the EXECUTE cycle, NAND gate 1433 receives a high signal from the terminal control clock. NAND gate 1433 responds thereto by applying a low signal to one input of NAND gate 1432 enabling it to apply a high signal to the clock input of accumulator register 1435. At the end of the EXECUTE clock cycle, NAND gate 1433 receives a low clock signal to apply a high signal to NAND gate 1432. NAND gate 1432 receives high signals on two of its inputs via leads 1431 and 1430. Leads 1430 and 1431 are controlled by destination decoder 1424 and destination demultiplexer 1422 which are inhibited by high signals from the read only memory outputs MB23 and MB19 applied to their enable inputs via OR gates 1421 and 1420.

Responsive to high signals on all inputs, NAND gate 1432 applies a low signal to the clock input of accumulator register 1435. The high-to-low signal transition appearing at the clock input causes accumulator register 1435 to gate in computation data appearing at inputs AB0 through AB7. The arithmetic operation is thereby completed.

Figure 19:
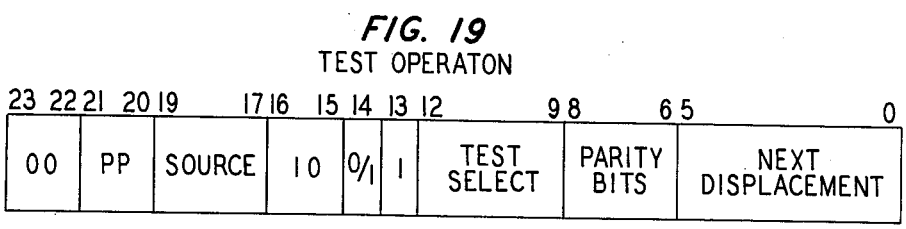
FIG. 19 shows the arrangement of information bits in a program order word specifying a test operation.

Terminal control 215 may also be used to perform tests on various internal and external data sources. If the outcome of the test is "true" then the program instruction immediately succeeding the test instruction is skipped. If the test is "false" then the normal program instruction ordering is followed. Specifically, a program order word defining a test operation is shown in FIG. 19. Bits 0 through 8 are address and parity bits whose significance is explained above with regard to data movement operations. Bits 9 through 12 select the particular test being performed. Bits 13, 15, and 16 are 101 respectively and are used to enable test multiplexer 1415 in preparation for a test. Bit 14 may be either a "zero" or a "one" depending on the type of test being performed. Bits 17 through 19 specify the source of the data to be tested. Bits 20 and 21 are parity bits as previously explained and bits 22 and 23 are set to zero to define a test operation.

Tests are performed under control of test multiplexer 1415, FIGS. 13 and 14. Test multiplexer 1415 is a well-known circuit device which connects one of the inputs T0 through Tn to the output under control of signals appearing at the address inputs. Test multiplexer 1415 contains an internal inversion so that the signal appearing at the output is the inversion of the selected input signal.

In addition, test multiplexer 1415 must receive a low signal at the enable input to become operative. Test multiplexer 1415 has a plurality of inputs, including test inputs from sources "external" to the control circuitry, coupled to leads T0 through T3; the output of match circuit 1408; and leads OB0 through OB7 of transfer bus OBB. As hereinafter explained, the output of test multiplexer 1415 is used to cause an instruction jump or decision.

Assume, for example, that a program order word present at the outputs MB0 through MB23 of the read only memory defines a test instruction to test the transfer bus OBB lead OB0. The test selection code appearing at the read only memory outputs MB9 through MB12 is applied to the address inputs of test multiplexer 1415. In response thereto, test multiplexer 1415 connects lead OB0 to its output. Test multiplexer 1415 is next enabled when the code appearing on outputs MB13 through MB16 of the read only memory is applied to address inputs A through D of destination decoder 1424. In this case the code is 1001 for outputs MB15 through MB13, respectively. Destination decoder 1424 also receives a low enable input signal from OR gate 1421 during the EXECUTE cycle of the terminal control clock. In response thereto, destination decoder 1424 applies a low signal to lead 1416. The low signal on lead 1416 is applied to the enable input of test multiplexer 1415 causing an inverted version of the input signal to appear on output 1414. The signal appearing on output 1414 is applied to one input of NAND gate 1406. The other input of NAND gate 1406 receives a high signal from inverter 1407 which in turn receives a low signal via lead 1416 from destination decoder 1424.

The output of NAND gate 1406 is applied to OR gate 1404, inverter 1405 and OR gate 1306. Depending on the value of the tested data source, OR gate 1404, inverter 1405 and OR gate 1306 either increment the displacement address appearing at outputs MB0 through MB5 of the read only memory or leave the address the same. Specifically, if the value of the signal on transfer bus OBB lead OB0 is low or "true" then a high signal will appear at output 1414 of test multiplexer 1415 due to the internal inversion. The high signal appearing on output 1414 is applied to one input of NAND gate 1406. Since both inputs of NAND gate 1406 are high, NAND gate 1406 applies a low signal to OR gate 1404. OR gate 1404 receives a low signal at one input from inhibited gate 1403, and thereby applies a low signal to inverter 1405. Inverter 1405 thereupon applies a high signal via lead 1305 to one input of OR gate 1306. OR gate 1306 thereupon applies a high signal to displacement register 1310. At the end of an EXECUTE clock cycle, as previously described, displacement register 1310 gates in the address for the next program order word from the outputs MB0 through MB5 of the read-only memory. The result of the test operation sets bit 0 to logical "one." In order to insure that an instruction "jump" occurs, it is necessary that the address stored in bits 0 through 5 of the test instruction word have bit 0 set to a logical "zero." This can be insured by proper compilation of the instruction words when the read only memory is loaded during manufacture.

If, on the other hand, the tested data source is high or "false," a low signal will be applied via NAND gate 1406, OR gate 1404 and inverter 1405 to lead 1305 and OR gate 1306. Since all test instructions have a next displacement address containing a "zero" at the bit 0 location, no instruction jump will occur. Thus, in summary, a "true" or low value of the tested source will cause an instruction jump to an instruction which has an address that is one greater than the next displacement address contained in bits 0 through 5 of the test instruction. A "false" or high value of the tested data source will cause the next instruction to be executed at the location specified in bits 0 through 5 of the test instruction.

The test instruction may be used to test individual bits of a data word stored in a register by gating the word onto the transfer bus and testing a particular one of leads OB0 through OB7 as described above. The test circuitry may also be used in conjunction with match circuitry 1408 in control unit CU1301 to test that a selected source has all zeroes contained therein. Specifically, the selected data source is gated onto output bus $\overline{OBB}$ by multiplexers 1330 through 1337 operating under control of multiplexer decoder circuit 1346. Leads $\overline{OB0}$ through $\overline{OB7}$ of bus $\overline{OBB}$ are connected to the inverters of inverter circuit 1409 in control unit CU1301. High signals appearing on leads $\overline{OB0}$ through $\overline{OB7}$, indicating all zeroes contained in the selected data source, are inverted by the inverters of inverter circuit 1409 and applied as low signals to the inputs of the exclusive OR gates of OR gate circuit 1410. Each of the exclusive OR gates of OR gate circuit 1410 have one input grounded and thus each gate thereof having both inputs low applies a high signal to its output. The exclusive OR gates of OR gate circuit 1410 are open collector gates that have no internal pull-up circuitry. Resistor 1418 normally maintains a high signal at the input of inverter 1413. If there is a match condition wherein data source are all zeroes each of the exclusive OR gates of OR gate circuit 1410 generates a high output signal. Accordingly, a high signal appears at the input of inverter 1413. Inverter 1413 thereupon applies a low signal via lead 1417 to an input of test multiplexer 1415. As explained previously, a low or "true" signal applied to test multiplexer 1415 causes an instruction jump. If on the other hand, the selected data source is not all zeroes, one of the exclusive OR gates of OR gate circuit 1410 will apply a low signal to the input of inverter 1413 and thereby cause a high signal to be applied to test multiplexer 1415 to indicate a no instruction jump.

In addition, to test operations involving test multiplexer 1415, a test operation may be performed directly on the least significant data bit of a selected data source. This test is defined by a program order word in which bit 14 is 1. During a "test low bit" operation, the selected data source is first gated onto output bus $\overline{OBB}$. The output of multiplexer 1330 is thereupon applied directly to NAND gate 1403. NAND gate 1403 receives a high signal from inverter 1402 which in turn receives a low signal from destination decoder 1424 in response to the code 1101 applied to the destination decoder address inputs A through D by the read only memory signals appearing on outputs MB13 through MB16 of the read only memory enable destination decoder 1424 to apply a low signal to inverter 1402. The output of NAND gate 1403 is applied to one input of OR gate 1404 and controls the instruction jump circuitry as previously described in connection with test multiplexer 1415.

The fourth type of operation performed by terminal control 215 is the direct loading operation in which data stored in the read-only memory of programmable store unit PSU is loaded directly into a specified data destination. This type of instruction is utilized to load a new page address into page address register 1320. As explained previously, bits 6 through 13 of the address inputs of the read only memory are provided by data stored in page address register 1320. Bits 0 through 5 of the address are provided by the preceding program order word. Thus after 64 instructions have been executed, new data must be loaded into page address register 1320 to specify a new program instruction "page". In addition, this operation may be used to load an external destination under control of lead D3 of destination control 1429 with a constant or other data stored in the read only memory.

Figure 20:
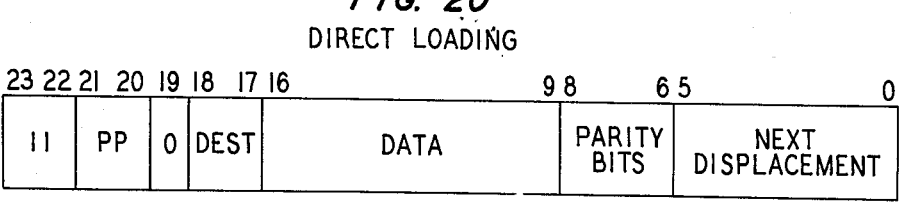
FIG. 20 shows the arrangement of information bits in a program order word specifying a direct loading operation.

The instruction word specifying a direct loading operation is shown in FIG. 20. The data to be loaded into the selected data location is contained in bits 9 through 16. Bits 17 and 18 specify the destination into which data are to be loaded and bits 19, 22, and 23 are used to control destination demultiplexer 1422 to set up the operation. The significance of the remaining bits has already been explained. Specifically, assuming a program order word specifying a direct loading operation appears at the read only memory outputs MB0 through MB23, a high signal appearing at output MB23 is applied to the data input of destination demultiplexer 1422. In addition, a high signal appearing on the read only memory output MB19 is applied to OR gate 1420. During the EXECUTE cycle of the terminal control clock, OR gate 1420 applies a low signal to the enable input of destination demultiplexer 1422. Destination demultiplexer 1422 is thereby enabled to apply a low signal to one of the outputs thereof selected by signals applied to the address inputs from the read only memory outputs MB17 and MB18 via the leads of cable 1423. Assume further that the program order word appearing at the outputs of the read only memory specifies a direct load into page address register 1320. In this case, destination demultiplexer 1422 applies a low signal to inverter 1412 via lead 1426. Inverter 1412 in turn applies a high signal to input of NAND gate 1322 via lead 1411. Enabled NAND gate 1322 receives a high signal from the terminal control clock during the EXECUTE cycle and thus applies a low signal to inverter 1321. Inverter 1321 thereupon applies a high signal to the clock input of page address register 1320 in preparation for the loading of data therein.

Page address register 1320 is constructed of negative-edge triggered D-type flip-flops which can gate in data from either of input sets PA0 through PA7 or PB0 through PB7. The selection of input data is controlled by signals appearing at the mode input of page address register 1320 which is connected to output MB19 of the read only memory. A low signal appearing at the mode input causes data to be gated in from inputs PB0 through PB7 and a high signal causes data to be gated in from inputs PA0 through PA7. For direct loading operations the read only memory output MB19 is low thereby enabling data appearing at inputs PB0 through PB7 to be gated into page address register 1320. Inputs PB0 through PB7 are connected via memory bit bus MBB to the read only memory of programmable store unit 1311.

At the end of the EXECUTE clock phase NAND gate 1322 receives a low signal at one input from the terminal control clock. NAND gate 1322 is thereby enabled to apply a high signal to inverter 1321 which in turn applies a low signal to the clock input of page address register 1320. A high to low signal transition at the clock input causes page address register 1320 to load the data appearing at the inputs PB0 through PB7 thus completing the loading operation.

Data may also be directly loaded into an external destination. In this case bits 17 through 19 of the program order word control multiplexer decode circuit 1346 and multiplexers 1330 through 1337 to connect signals appearing on the leads of cable 1343 to output bus $\overline{OBB}$. The input leads of cable 1343 are connected to the read only memory outputs MB9 through MB16 via memory bit bus MBB. Destination demultiplexer 1422 is also controlled by program order word bits 17 through 19 to apply a low signal to one input of NAND gate 1425. NAND gate 1425 in turn enables NAND gate 1427 in response to a terminal control clock signal to apply a signal to lead D3 to gate the data appearing on output bus $\overline{OBB}$ into the selected destination.

INPUT MULTIPLEXER CIRCUITRY

Figure 10:
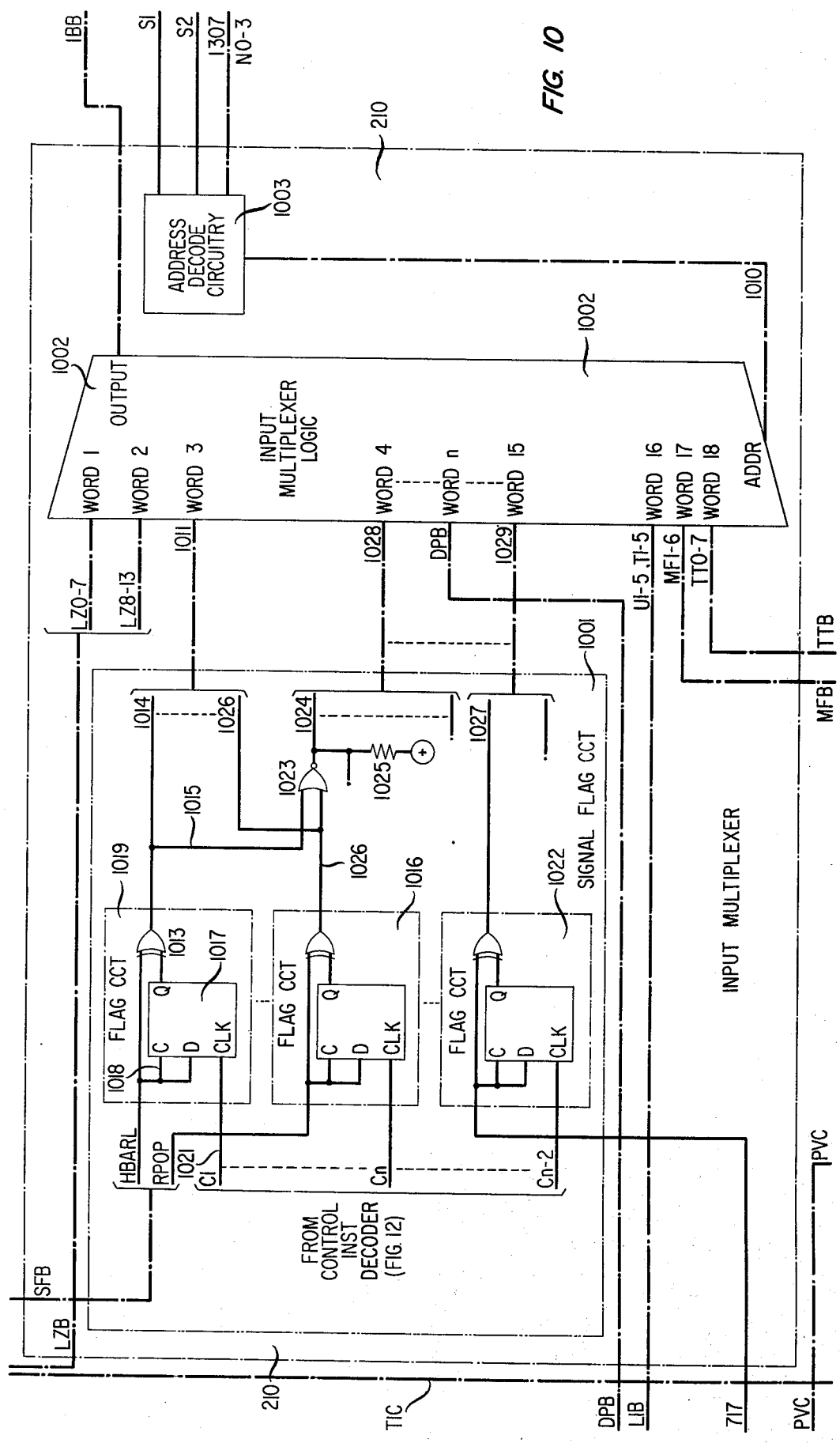
FIG. 10 shows the input multiplexer circuitry.

The function of input multiplexer 210, FIG. 10, is to channel data generated, by the data gathering circuitry shown in FIGS. 3 through 8 into terminal control 215 for processing and transmission to service evaluation center 120. The circuitry of input multiplexer 210 consists of two units: input multiplexer logic 1002 with associated address decode circuitry 1003 and signal flag circuitry 1001.

Input multiplexer logic 1002 is a well-known logic device which has a plurality of inputs and is arranged so that one of the inputs is selectively connectable under control of address signals to an output. Input multiplexer logic 1002 operates on a word basis, that is, each "input" consists of eight leads. The eight leads corresponding to the selected "input" are connected simultaneously to the "output", which also consists of eight leads. The eight output leads are connected via input bus IBB to the circuitry of terminal control 215.

The connection of an eight lead input word to the output is controlled by address signals generated by address decoder circuitry 1003 in response to signals generated and applied to leads S1,S2 and N0 through N3 by terminal control 215. In particular, terminal control 215 applies binary signals to leads S1, S2 and N0 through N3 specifying a unique input word which is to be connected to the output of input multiplexer logic 1002. The binary signals appearing on leads S1, S2 and N0 through N3 are decoded by address decoder circuitry 1003 which, in turn, applies a unique binary code to the leads of cable 1010. Responsive to the binary code appearing on leads 1010, input multiplexer logic 1002 connects the selected word input leads to the output. Multiplexer circuitry, such as input multiplexer logic 1002 is well-known and may be comprised of a plurality of well known single lead multiplexers connected in parallel.

Address decoder circuitry 1003 can be constructed with straightforward engineering techniques and may illustratively consist of a combinatorial logic circuit.

The data inputs connected to the inputs of input multiplexer logic 1002 vary according to the data word. Some data words, are connected directly to data sources. For example, one data word may consist of eight input leads connected to the outputs LZ0 to LZ7 of the signal filtering circuit 204, FIG. 5. Outputs LZ0 through LZ7 are activated by signal filter circuitry 204 when a seizure of the terminal control 215 by a service observing circuit is detected by interface circuitry 200 FIGS. 3 and 4.

Other data words are connected to the output of signal flag circuit 1001. Signal flag circuit 1001 is used to reduce the scanning time for input data. Specifically, terminal control 215 repetitively controls input multiplexer logic 1002 to sequentially connect data words appearing at the selected inputs to the multiplexer output. The digital signals appearing on these inputs are then examined by terminal control 215 to detect any changes or incoming input data. To reduce the time required for terminal control 215 to scan the input leads of input multiplexer logic 1002 not all input leads are scanned routinely. As will hereinafter be explained, some input data is connected through signal flag circuit 1001 to input multiplexer logic 1002. Data appearing at signal flag circuit 1001 causes one of a plurality of flag circuits therein to be "set". The outputs of the plurality of individual flag circuits are multipled together and when one flag circuit is "set" an output is produced which is applied to input multiplexer logic 1002. Terminal control 215 routinely scans some signal flag outputs and when a set flag is detected, terminal control 215 subsequently scans the associated inputs of input multiplexer logic 1002 to detect associated incoming data.

After an input is scanned, terminal control 215 then causes control instruction decoder 217, FIG. 12, to "clear" the set flag. For example, assume that a data input indicating release of relay HBA, FIG. 3, appears as a high signal on lead HBARL connected from the output of the signal filter circuits, FIG. 5, via cable SFB to signal flag circuitry 1001 and, in particular, to flag circuit 1019. Flag circuit 1019 identical to the plurality of flag circuits comprising signal flag circuitry 1001 consists of a negative-edge triggered D-type-flip-flop 1017 and exclusive OR gate 1013. The high signal appearing on lead HBARL is applied via lead 1012 to one input of exclusive OR gate 1013. As hereinafter explained, exclusive OR gate 1013 receives a low signal at the other input. Responsive to a high and a low signal at the inputs, exclusive OR gate 1013 applies a high signal to output lead 1014. The high signal is forwarded via cable 1011 to input multiplexer logic data word 3 input 1002. The data word 3, input, however, is not scanned on a regular basis by terminal control 215 and the signal produced by flag circuit 1019 is not directly detected by terminal control 215. However, flag circuit 1019 output is also connected via lead 1015 to an input of NOR gate 1023. NOR gate 1023 has another input connected via led 1026 to the output of flag circuit 1016. In addition, the output of NOR gate 1023 is open-collectored and is connected to the outputs of other similar NOR gates (not shown) each having inputs connected to other flag circuits and each having outputs which are all connected to lead 1024. Lead 1024 is normally held high by resistor 1025, however, when a data signal is present on any of the flag circuits, a low signal is produced on lead 1024, and forwarded via cable 1028 along with other similar signals to data word 4 input on input multiplexer logic 1002. Data word 4 input is scanned routinely by terminal control 215. In response to the low signal generated by flag circuit 1019 at data word 4 input terminal control 215 scans data word 3 input to detect the data signal appearing on output lead 1014.

After the appropriate data signal has been detected, terminal control 215 clears flag circuit 1019. Specifically, terminal control 215, as hereinafter described, causes control instruction decoder 217, FIG. 12, to place a low signal on lead 1021, which is applied to the clock input of flip-flop 1017 of flag circuit 1019. Responsive to a high to low signal transition appearing at the clock input, flip-flop 1017 generates and applies a high signal to one input of exclusive OR gate 1013. As discussed above, exclusive OR gate 1013 receives a high signal via lead HBARL. Responsive to high signals appearing at both inputs exclusive OR gate 1013 applies a low signal to output lead 1014 thus cancelling the high output signal. An output signal from flag circuit 1019 may also be cancelled if the high signal appearing on lead HBARL becomes low. A low signal is thereupon applied to exclusive OR gate 1013 and, via lead 1018 and, via lead 1018, to the clear input of flip-flop 1017. Responsive to a low signal at the clear inut, flip-flop 1017 applies a low signal to exclusive OR gate 1013 which, in turn, applies a low signal to output lead 1014.

Some flag circuits, such as flag circuit 1022 do not have data applied directly to them, but merely indicate that data is ready at another input location. For example, flag circuit 1022 receives a signal via lead 717 from loop identification decoding circuit 206, FIG. 7, indicating that data is available at input multiplexer data word 16 input via cable LIB. Set flag circuit 1022 forwards the data present signal via lead 1027 and cable 1029 to data word 15 input which is routinely scanned by terminal control 215. Responsive to a signal appearing at data word 15 input terminal control 215 scans data word 16 input to detect incoming data.

CONTROL INTERFACE CIRCUITRY

Figure 9:
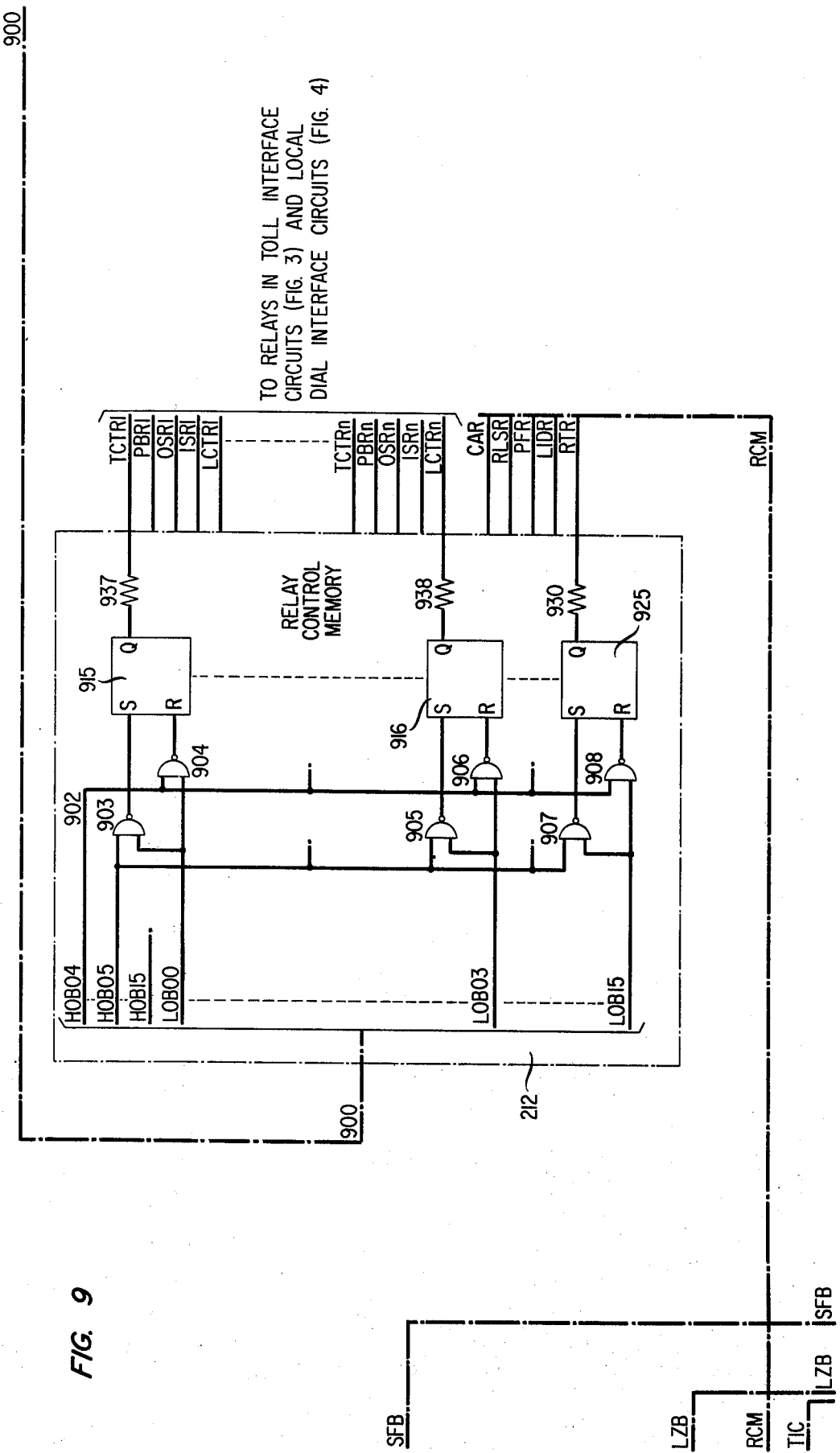
FIG. 9 shows the relay control memory.

The function of the control circuitry, FIGS. 9 and 12, is to decode and interface commands generated by terminal control 215, FIGS. 13 and 14, to the remainder of the circuitry of service observing terminal 100. Command signals generated by terminal control 215 appear on output bus $\overline{OBB}$ and are gated into destination circuits by signals appearing on leads DO through D3.

The command signals are applied to three logic circuits which convert the commands into a form suitable for use with the rest of the service observing terminal circuitry. The first logic circuit is the control instruction decoder 217 which generates control signals utilized to clear signal flag circuit 1001, FIG. 10, and perform miscellaneous functions such as enabling loop identification decoding circuitry, FIG. 7.

The second logic circuit controlled by commands from terminal control 215 is relay control memory 212, FIG. 9, which provides suitable D.C. signals for the operation of various relays in interface circuitry 200, FIGS. 3 and 4.

The third logic circuit operating under control of terminal control 215 is programmable timer 1270, FIG. 12. Programmable timer 1270 can be programmed via signals appearing on output bus $\overline{OBB}$ to time for a specified interval of time. At the end of the time interval, a low signal appears at the programmable timer output lead 1272. The programmable timer 1270 is utilized mainly to time acceptance signals arriving from service evaluation center 121. If an acceptance fails to arrive within a predetermined time interval, programmable timer 1272 times-out and initiates further action thereby preventing a malfunction in the acceptance circuitry from stopping system operation.

Specifically, command signals generated by terminal control 215 are applied by a data movement operation or by a previously described direct loading operation to output bus $\overline{OBB}$. If terminal control 215 desires to operate either control instruction decoder 217 or relay control memory 212, command signals are applied to instruction decoder 1201, FIG. 12, and, during the appropriate clock cycle, a low signal is applied to lead D3 by terminal control 215. Instruction decoder 1201 is a well-known circuit which responds to input signals and a low signal appearing at the enable input by placing low signals on selected output leads. The instruction decoder 1201 outputs are divided into two groups, a low group designated LOBOO through LOB15 and a high group HOBOO through HOB15. Responsive to the input signals, instruction decoder 1201 places a low signal on one output in each group. The low output signals are inverted by the appropriate one of inverters 1202 through 1233 and applied as a high signal to control instruction bus CIB. From bus CIB the control signals are applied to control instruction decoder 217 and, via cable 900, to relay control 212, FIG. 9.

Control instruction decoder 217, FIG. 12 consists of a NAND gate matrix including gates 1250 through 1253 and other gates not shown for sake of clarity. Each gate has one input connected to one of leads LOBOO through LOB15 and another input connected to one of leads HOBOO through HOB15. In response to high signals appearing on a pair of the leads from instruction decoder 1201 one gate in the NAND gate matrix generates a low output signal. For example, high signals appearing on leads HOB00 and LOB00 enable gate 1251 to apply a low signal to control lead C2. Control leads C1 through Cn are connected to signal flag circuit 1001, FIG. 10, and loop identification decoder 206, FIG. 7, to control the circuits as previously discussed.

Control signals on bus CIB are also applied to relay control memory 212, FIG. 9, via cable 900. Relay control memory 212 comprises a plurality of set-reset flip-flops including flip-flops 915 through 925 and others not shown. Eachh flip-flop is controlled by a pair of NAND gates connected to the flip-flop set and reset inputs. Each NAND gate has two inputs, one connected to one of leads HOB04 through HOB15 and the other connected to one of leads LOB00 through LOB15. Responsive to pairs of signals appearing on leads HOBO4 through HOB15 and LOB00 through LOB15, a flip-flop is either set or reset to produce relay control signals. For example, high signals appearing on leads HOB05 and LOB15 enables NAND gate 907 to apply a high signal to the set input of flip-flop 925. Set flip-flop 925 applies a high signal to the Q output which is coupled via resistor 930 to lead RTR. A high signal appearing on lead RTR operates relay RT of interface circuity 200, FIG. 3, as previously described. Similarly, high signals appearing on control leads HOB04 and LOB15, FIG. 9, enable NAND gate 908 to apply a low signal to the reset input of flip-flop 925. Flip-flop 925 responds thereto by applying a low signal to the Q output to cause relay RT to release.

Control commands are also applied by terminal control 215 to programmable timer 1270, FIG. 12. Programmable timer 1270 may illustratively be a well-known binary counter circuit arranged to count steady up or down under control of a continuous stream of clock pulses received from the terminal control clock. In particular, at the start of a timing interval, terminal control 215 applies a predetermined binary number of inputs of programmable timer 1270 via output bus $\overline{OBB}$. In addition, terminal control 215 applies a low signal to lead D1, connected to the load input of programmable timer 1270. Responding to a low signal appearing on the load input programmable timer 1270, loads the binary number appearing on input bus $\overline{OBB}$ into the binary counter circuit in a parallel format. At the end of the terminal control clock EXECUTE phase the low signal is removed from lead D1. Programmable timer 1270 thereupon begins incrementing or decrementing the binary number loaded therein. When the binary count reaches a predetermined value, programmable timer 1270 applies a low signal to output lead T3. This low signal is applied via cable 1272 to test circuit 1441, FIG. 14, in terminal control 215 wherein it is detected during a test operation as previously described.

DATA TRANSMISSION CIRCUITRY

Data transmission circuit 220, FIG. 12, functions to send information to and receive information from service evaluation center 121 over a standard data link. Circuitry which can format and transmit digital information over a variety of transmission media, such as telephone lines, is well known and commercially available. Accordingly, such circuitry will not be discussed in detail herein; only those details which are necessary to understand the principles of the present invention are included herein.

Specifically, data transmission circuit 220 consists of transmit first in-first out (FIFO) register 1260, receive first in-first out (FIFO) register 1261, serial-to-parallel converter 1262 and data set 1263. Transmit and receive FIFO registers 1260 and 1261 are used as buffer or temporary storage registers which prevent loss of data if information is received from service evaluation center 121 faster than service observing terminal 100 can process it or if service observing terminal 100 produces data faster than the data transmission circuit 220 can transmit it to service evaluation center 121. Serial-to-parallel converter 1262 converts the parallel data stream handled by transmit and receive FIFO registers 1260 and 1261 to a serial form suitable for transmission by data set 1263.

Assume, for example, that terminal control 215 desires to send a data word to service evaluation center 121. Terminal control 215 applies the data word signals to output bus $\overline{OBB}$. Signals appearing on bus $\overline{OBB}$ are applied to inputs IR0 through IR7 of transmit FIFO register 1260. During the appropriate clock cycle of the terminal control clock, as previously explained, terminal control 215 places a low signal on lead DO. The low signal appearing on lead DO is applied to the read input RD of transmit FIFO register 1260 enabling it to read in the data word appearing at inputs IR0 through IR7. Transmit FIFO register 1260 applies the stored data words to outputs OR0 through OR7 in the order in which they were received. Data appearing at the OR0 through OR7 outputs of transmit FIFO register 1260 is in turn applied to inputs TR0 through TR7 of serial-to-parallel converter 1262. Serial-to-parallel converter 1262 converts the parallel data appearing at inputs TR0 through TR7 into a serial data stream which is applied via output T1 and lead 1265 to the send input of data set 1263. Data set 1263 in turn formats data appearing at the send input into a form suitable for transmission to service evaluation center 121 via data link 222.

Data received from service evaluation center 121 via data link 222 is converted into a serial data stream by data set 1263 and applied via lead 1266 to the receive input RI of serial-to-parallel converter 1262. Serial-to-parallel converter 1262 formats the serial data stream into eight bit words which appear at outputs RR0 through RR7. Data appearing at outputs RR0 through RR7 is applied to inputs IR0 through IR7 of receive FIFO register 1261. Receive FIFO register 1261 stores the received data words in the order received until needed by terminal control 215. When any data words are present in receive FIFO register 1261 a low signal appears at the data ready output DR. This low signal is applied via lead T2, to test circuit 1441 in terminal control 215. Terminal control 215 FIGS. 13 and 14, routinely tests lead T2 to ascertain the presence of incoming data. When data is detected, terminal control 215 initiates a data transfer operation as previously described in which a low signal appears on lead S0. The low signal appearing on lead S0 is applied to input OS of receive FIFO register 1261, FIG. 12, to enable it to gate the first data word received onto outputs OR0 through OR7, which data is then applied via input bus IBB to terminal control 215 for further processing.

TERMINAL OPERATION

The sequence of operations of service observing terminal 100 is controlled by terminal control 215 in accordance with a set of predetermined control instructions stored in the read-only memory of program store unit PSU 1311. The set of control instructions which operate terminal control 215 are divided into a plurality of distinct routines. One routine, for example, causes terminal control 215 to scan the associated service observing circuits to detect a service evaluation request.

Illustratively, the scanning instruction routine controls input multiplexer logic 1002, FIG. 10, to examine the service observing circuits to detect a seizure or a request for service. Before requests from the service observing circuits are processed and forwarded to the service evaluation center 121 for acceptance, the requests are first screened by information stored in terminal control 215 to determine which service observing circuits will be allowed to send requests to service evaluation center 121. Specifically, a portion of scratch-pad memory 1438 is permanently dedicated as a status "register". The status register contains a bit corresponding to each service observing circuit. A "one" in a bit location indicates the corresponding service observing circuit may forward requests to service evaluation center 121. A "zero" in a bit location indicates that requests from the corresponding service observing circuit are to be ignored. During the scanning routine, the contents of the scratch pad memory status register is logically ANDed with the service request information as hereinafter explained to eliminate service requests from service observing circuits having a zero bit stored in the corresponding status memory location. After the service evaluation bids have thus been screened the illustrative scanning instruction routine selects one bid and forwards the bid for acceptance to service evaluation center 121. A flow chart for the illustrative service observing circuit scanning routine is shown in FIGS. 21 and 22 and will be discussed further herein.

Another instruction routine receives and decodes commands received from remote service evaluation center 121. Advantageously, according to the principles of the invention, commands are received that determine which service observing circuits will be allowed to forward evaluation requests to remote service evaluation center 121. Each of these commands contains the "port" number of the interface circuit to which the command corresponds and a digital code which causes terminal control 215 to place the corresponding service observing circuit in an "active" state when allowed to forward requests for evaluation to service evaluation center 215 and an "inactive" state when requests for evaluation are ignored. The illustrative instruction routine decoding the commands received from service evaluation center 121 first determines the type of command which is received. If a status command is received, the update instruction routine is entered. A flow chart for the illustrative command decoding routine is shown in FIGS. 23 and 24.

Figure 25:
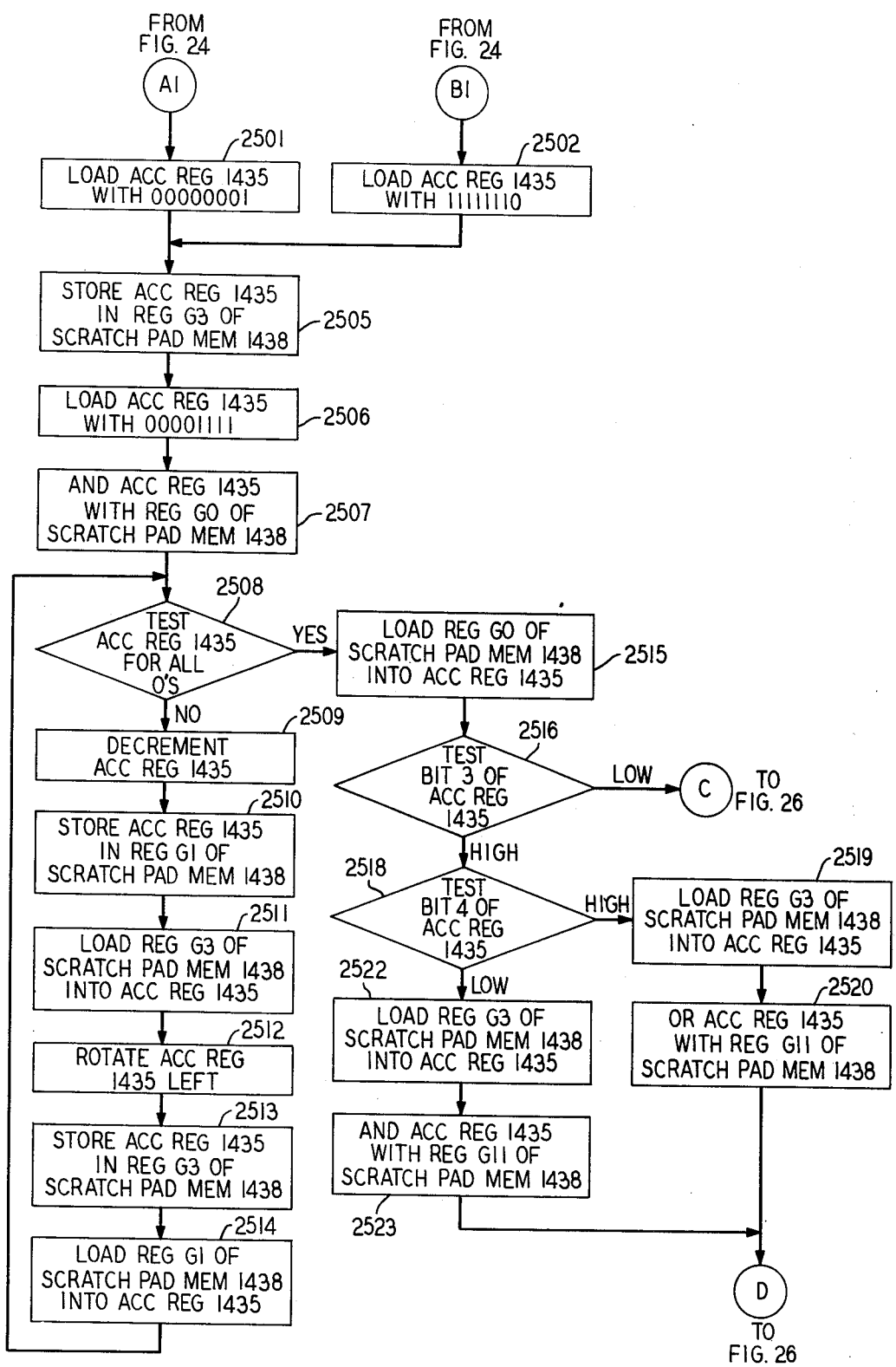

According to the principles of the present invention, an illustrative update instruction routine operates under control of commands decoded by the decoding routine to insert a "1" and "0" into status register locations specified in the decoded commands. Flow charts for an illustrative update instruction routine are shown in FIGS. 25 and 26.

A fourth illustrative instruction routine causes operation of terminal control 215 to accept a bid for evaluation. In particular, various relays are operated in the service observing interfere circuitry 200 which prepare for the collection and formatting of data.

Referring to FIG. 21, the scanning instruction routine for service evaluation requests begins with transfer instruction 2101 which reads seizure data from input ports 0 through 7 associated with the service observing circuits. Under control of instruction 2101, as previously described, terminal control 215 controls input multiplexer logic 1002, FIG. 10, to transfer input signals appearing at the word 1 input into accumulator register 1435, FIGS. 13 and 14. Signals received at the word 1 input contains data bits indicating seizures or service requests from interface circuitry input ports 0 through 7 of service observing terminal 100. In particular, the data received at the word 1 input of input multiplexer logic 1002 contains a bit location corresponding to each of the input port circuits 0 through 7. A "one" is contained in each location corresponding to a service observing circuit requesting service and a "zero" is contained in each location not requiring service. The scanning instruction routine then proceeds to step 2102. In step 2101, the received input data information is stored for future use. As previously set forth, scratch pad memory 1438 in terminal control 215 is an 8-bit by sixteen word memory. Each data word is treated by the illustrative circuitry as a separate register. Thus, there are sixteen separate registers arbitrarily designated as registers G0 through G15. Each register is assigned a different function. Some registers, for example, are used for temporary storage or as "scratch" registers. Others temporarily store the results of certain computations. Advantageously, two of the registers, G10 and G11, are used to store the status of each service observing circuit. According to the principles of this invention, registers G10 and G11 are permanently dedicated as a memory storage in terminal control 215 circuitry. As hereinafter explained, information stored in registers G10 and G11 is used to screen incoming service evaluation bids in order to prevent out-of-service service observing circuits from forwarding service evaluation bids to service evaluation center 121.

In step 2102, a data movement operation takes place in which the service evaluation bids in accumulator register 1435 are stored in register G0 of scratch pad memory 1438.

The scanning instruction routine then compares the results of the present "scan" to the results of the previous service observing circuit "scan". This is done in order to detect only new seizure signals which indicate that a service observing circuit is bidding for evaluation. In particular, at step 2103, an arithmetic operation is performed in which the contents of accumulator register 1435 containing the service evaluation bids is logically ANDed with scratch pad memory 1438 register G5 in which the complemented results of the previous scan are stored. Each service observing circuit must continue bidding until register G5 is cleared, as hereinafter described, before the scanning instruction routine will recognize a new bid. After instruction 2103 any remaining bids appear as "1" in the corresponding bit location.

Advantageously, according to the principles of the invention, the scanning instruction routine next removes bids generated by out-of-service observing circuits. The bids are thus prevented from being forwarded to service evaluation center 121 where they consume processing time. In particular, at step 2104, the contents of accumulator register 1435 containing bids remaining after comparison to the previous scan are logically ANDed with scratch pad memory 1438 register G10 which contains the service status of service observing circuits connected to input ports 0 through 7.

Each service observing circuit which is in service has a 1 in the corresponding location in register G10 of scratch pad memory 1438 and each service observing circuit "out-of-service" has a zero in the corresponding location. Thus the AND operation in step 2104 eliminates bids from out-of-service service observing circuits.

The scanning instruction routine then proceeds to test accumulator register 1435 in step 2105. If the accumulator does not contain all zeroes, this indicates that bids have been accepted from in-service ones of the service observing circuits. In this case the program proceeds to decode the service evaluation bids to determine which service observing circuits have generated bids.

Before beginning the decoding process, however, the scanning instruction routine, in step 2108, causes all zeroes to be inserted in scratch pad memory 1438 register G3. Register G3 is used to keep track of whether the scanning routine is performed on input ports 0 through 7 or input ports 8 through 13. In the case of the present scan operation on input ports 0 through 7 all zeroes are inserted in register G3. If a scan operation is performed on input ports 8 through 13 the binary number 8 is inserted into register G3. The significance of these numbers is explained in connection with the command decoding routine discussed hereinafter.

Before the decoding process is discussed, assume that in routine step 2105, previously discussed, accumulator register 1435 contained all zeroes indicating that no bids were accepted from in-service ones of the service observing circuits. In this case an instruction jump occurs to step 2106 and the contents of the scratch pad memory 1438 register G0 identifying the present service observing bids are complemented and stored in accumulator register 1435. At step 2107 the complemented bids in accumulator register 1435 are stored in register G5 of scratch pad memory 1438 in preparation for the next scanning operation. The routine then proceeds via point E to step 2204, FIG. 22. In step 2204, signals from input word 2 of input multiplexer logic 1002, FIG. 10, identifying service evaluation bid information for service observing input ports 8 through 13 is read into accumulator register 1435. At step 2206, the service evaluation bid information is stored in register G0 of scratch pad memory 1438. To detect new seizure signals the service evaluation bid information is ANDed in step 2208 with bid information from the previous "scan" stored in scratch pad memory register G12.

Advantageously, according to the invention, the service evaluation bids are next ANDed, in step 2210, with service observing circuit status information stored in scratch pad memory register G11. Bids from out-of-service ones of the service observing circuits are thus eliminated. According to the illustrative instruction routine in step 2212, the accumulator register 1435 is next tested for an all "zeroes" condition. If accumulator register 1435 contains all zeroes indicating that no evaluation bids have been received from in-service ones of the service observing circuits, an instruction jump is performed at step 2213. The service evaluation bid information for service observing input ports 8 through 15 is complemented and stored in scratch pad memory register G12, step 2216, in preparation for a subsequent scan operation. The scanning instruction routine then proceeds via point H to the beginning of the service observing circuit scan routine, FIG. 21, to begin additional scans for incoming service evaluation bid information.

However, if at step 2212, FIG. 22, the accumulator does not contain all zeroes indicating that service evaluation bids have been accepted from in-service ones of the service observing circuits, the scanning instruction routine proceeds to prepare for decoding of the bid information to detect which service observing circuits are requesting service. Specifically, the bid information is first temporarily stored in scratch pad memory register G0 at step 2218. Next, in steps 2225 and 2226 a binary number 8 is loaded into accumulator register 1435 and then into scratch pad memory register G3. A mentioned previously, the information recorded in register G3 of scratch pad memory 1438 is used to later keep track of the input port set 0 through 7 and 8 through 13 that is being processed. Finally, the service evaluation bid information, step 2227, in scratch pad memory register G0 is reinserted into accumulator register 1435. The scanning instruction routine then begins a decoding phase at point G in FIG. 21.

The decoding phase of the scanning instruction routine at point G is entered from either step 2108 or 2227 and selects one input port of interface circuitry 200 which is desiring service and causes binary identifying number to be inserted into accumulator register 1435. Selection of a bidding input port is performed on a strict priority basis. The highest priority is assigned input ports are ports 0 and 8 and the lowest priority is assigned input ports 7 and 13. Selection of a bidding input port circuit is thus simplified. In steps 2111 through 2120 each bit of the accumulator register 1435 starting with bit 0 is successively examined for the presence of a one bit. As a result of previous operations, accumulator register 1435 contains at this time bids from accepted in-service ones of the input ports. If a one bit is detected, an instruction jump occurs in which the corresponding input port number is loaded into accumulator register 1435. For example, if at step 2114 a test operation determines that bit 1 of accumulator register 1435 is a "one", indicating that input port one is in-service and is requesting service, then an instruction jump occurs to step 2115 and the binary number one is loaded into accumulator register 1435. The scanning instruction routine then proceeds to point F at which the input port number is formatted for transmission to service evaluation center 121. Each accumulator register bit is examined at steps 2111, 2114, 2117 and 2120 until the first one bit is found. At this point, a branch occurs in the scanning instruction routine and the identified service observing circuit data is processed. The remaining bidding service observing circuits are not processed until another scan operation. All branches of the scanning instruction routine end at point F to initiate the step of formatting an input port number. If, however, none of bits 0 through 7 are "one" this indicates an error in the detection phase and a suitable error routine is entered at step 2123. An error routine, for example, may consist of sending a suitable message indicating an error to service evaluation center 121 and awaiting further instructions therefrom.

The sequence of instructions of the scanning instruction routine for formatting the input port number for transmission to service evaluation center 121 begins at point F, FIG. 22. At step 2201, accumulator register 1435 contining the number of the input port requesting service is added to the contents of scratch pad memory register G3. This step corrects the input port number determined in the decoding phase previously discused. Correction is necessary because the input port numbers loaded in accumulator register 1435 during steps 2112, 2115, 2118, and 2121 are only correct for input ports 0 through 7. As previously discussed, register G3 of scratch pad memory 1438 contains all zeroes if the information in accumulator register 1435 refers to ports 0 through 7. In this case step 2201 has no effect. However, if the information in accumulator register 1435 refers to ports 8 through 13 which use the same decoding phase, then scratch pad memory register G3 contains the binary number 8 which when added to the input port number recorded in accumulator register 1435 corrects it to the proper number. The corrected input port number is then stored in scratch pad memory register G5 for future reference by the scanning instruction routine.

At steps 2205 and 2207, the corrected input port number in accumulator register 1435 is shifted three places to the left by rotate operations and complemented. This prepares the input port number for transmission to service evaluation center 121. At step 2209, the result is stored in scratch pad memory register G3. The scanning instruction routine then proceeds to step 2211 during which the input port number recorded in scratch pad memory register G3 is sent, via data transmission circuit 220, to service evaluation center 121. In the process, parity and address bits are added to the input port number to form a data word suitable for transmission over a data link. The scanning instruction routine then enters the call acceptance routine at step 2214.

Figure 27:
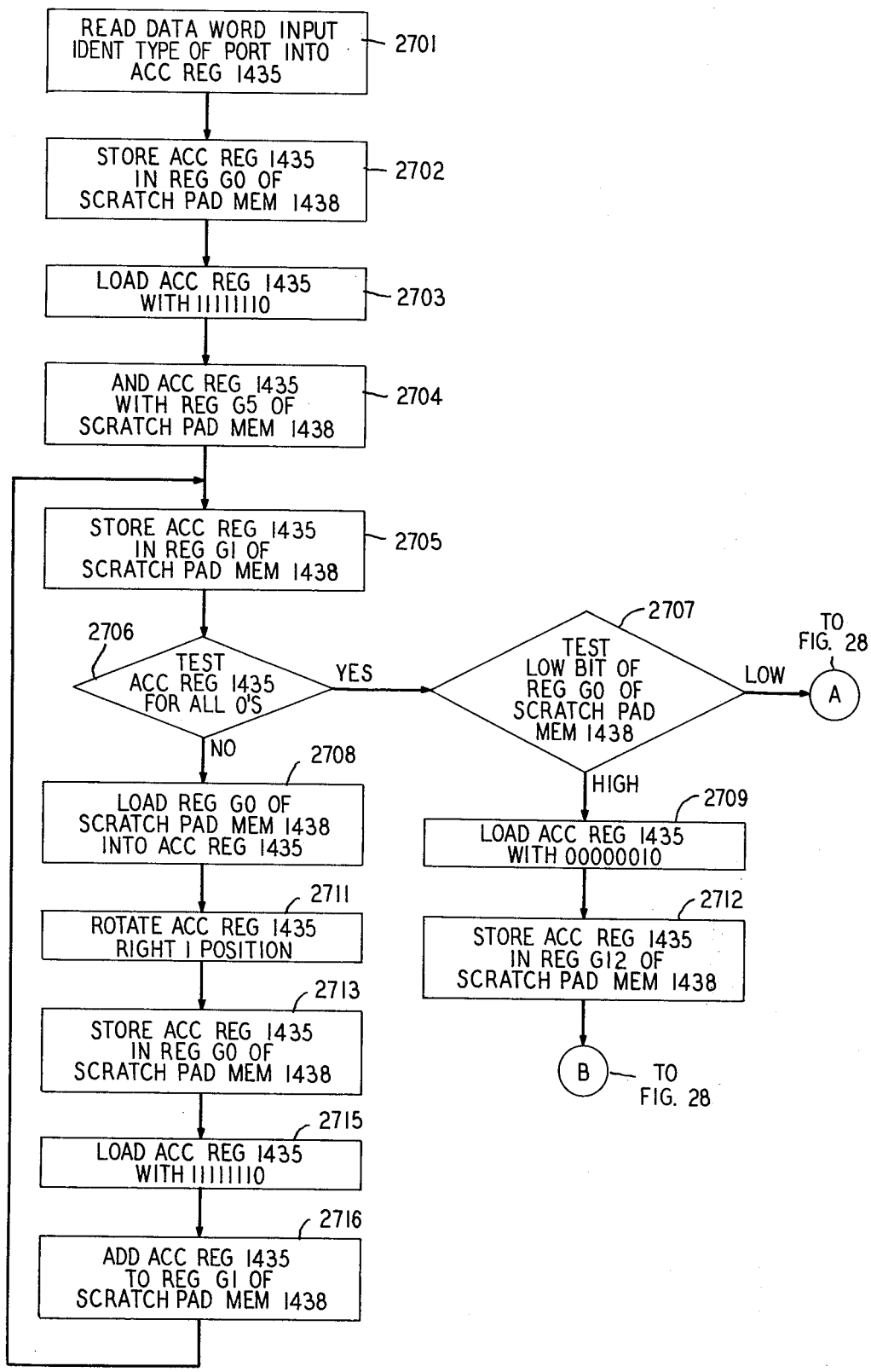
FIGS. 27 through 29 are flow charts of the call acceptance instruction routine of the present invention.
Figure 28:
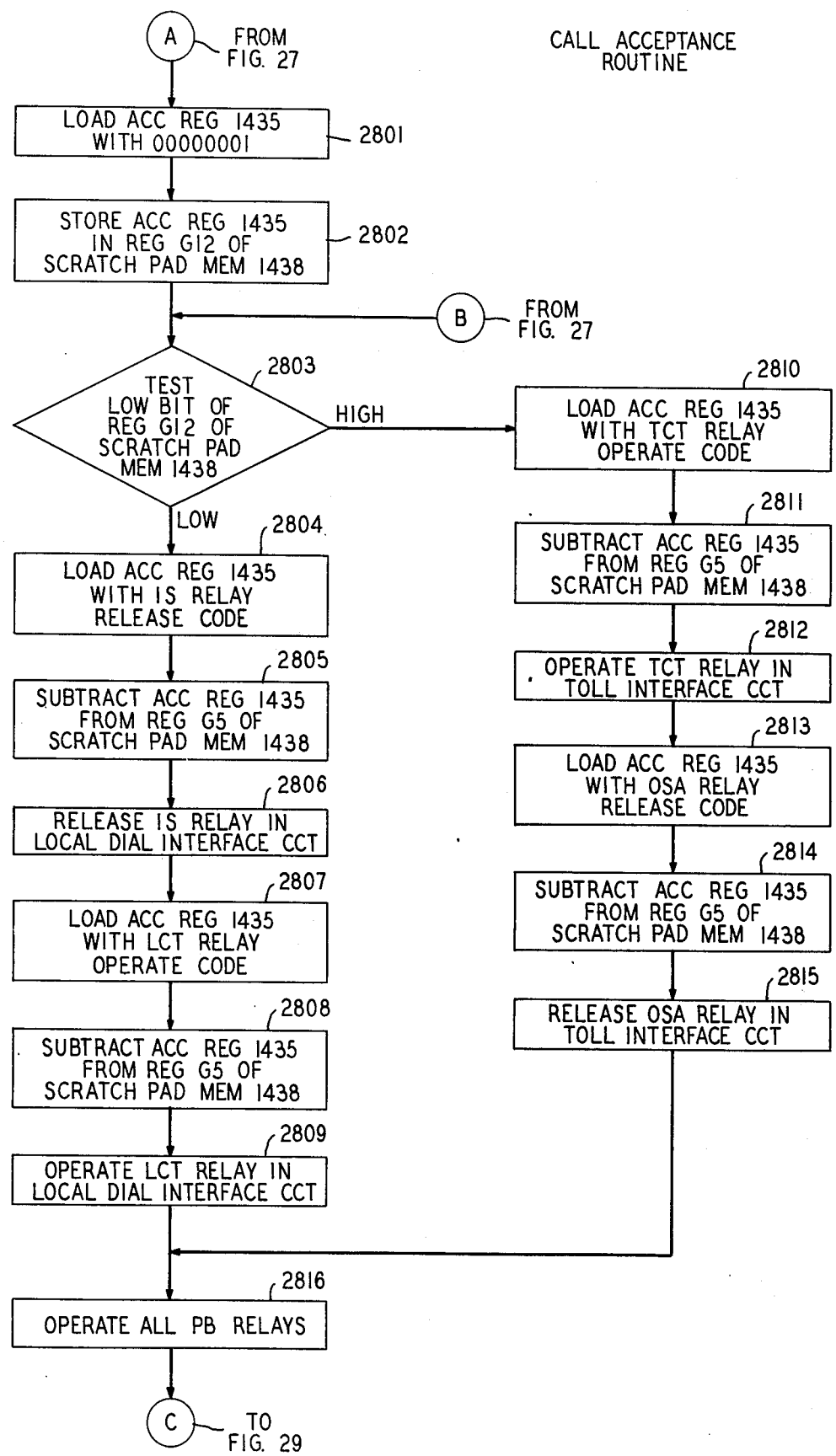
Figure 29:
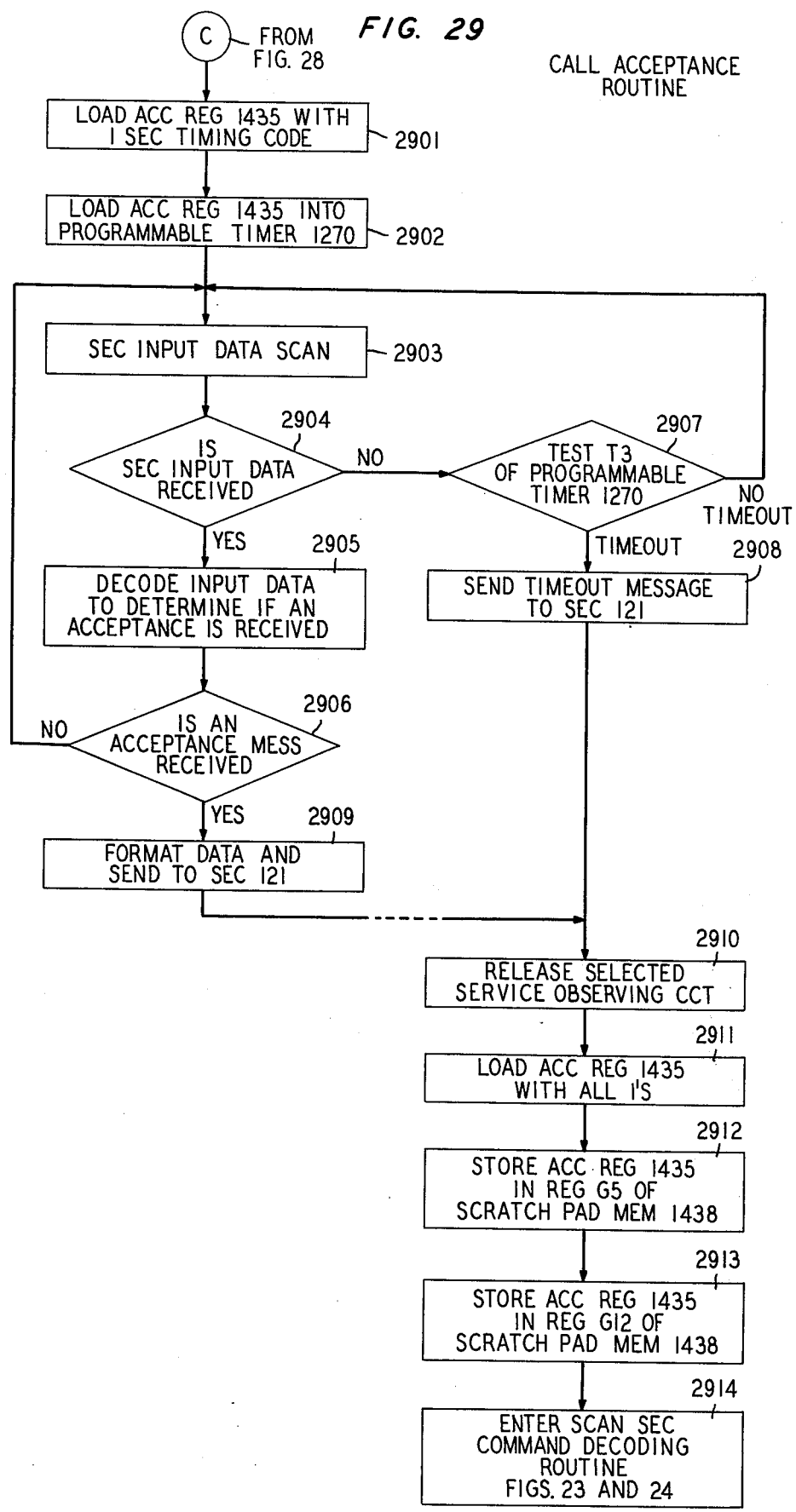

The call acceptance routine shown in FIGS. 27, 28 and 29 causes operation of selected relays in interface circuitry 200, FIGS. 3 and 4, that result in the input port selected by the above discussed scanning instruction routine being connected to and preparing service observing terminal 100 to send data to the service evaluation center 121. In addition, the call acceptance routine detects and times a call acceptance command returning from service evaluation center 121.

As shown in FIG. 27, the call acceptance routine begins with a determination of whether a toll or local dial input port is involved. Specifically, in step 2701, terminal control 215 controls input multiplexer logic 1002 to read a data word into accumulator register 1435. The selected data word indicates whether the input port circuit is a local dial, FIG. 4, or a toll, FIG. 3, service observing circuit. This information is necessary to operate the relays in interface circuitry 200 in the proper sequence. Since the selected data word identifying the input port contains only eight bits and there can be fourteen input port circuits, two input port circuits must be represented by each bit. In particular, input ports 0 and 1 are represented by bit 0, input ports 2 and 3 are represented by bit 1, etc. If the input port represented by a bit is a local dial type of input port, the bit is set to a logical "one". If the input port is a toll type of input port, the corresponding bit in the selected data word is set to "zero". The pair of input ports associated with each data word bit 0,1;2,3;4,5, etc. must both be either local dial or toll input ports.

The acceptance routine then proceeds to determine the type of input port in order to prepare interface circuitry 200 for data collection. Specifically, the selected data word identifying the type of input port is first stored in register G0 of scratch pad memory 1438, step 2702. The call acceptance routine then decodes the type of input port identified by the selected data word. At step 2703 accumulator register 1435 is loaded with all ones except for a zero in the least significant bit position. The contents of scratch pad memory register G5 identifying the number of the input previously identified by the scanning instruction routine are then ANDed in step 2704 with accumulator register 1435. These operations cause the input port identifying number to be rounded off to an even number so that the decoding sequence can operate with pairs of input ports. In step 2705, the contents of accumulator register 1435 comprising the "rounded off" input port even number are stored in scratch pad memory register G1. The call acceptance routine then proceeds to steps 2706, 2708, 2711, 2713, 2715 and 2716. These steps form an instruction "loop" which is repeated until a test condition indicates that accumulator register 1435 contains all zeroes. Specifically, during each pass through the instruction loop, the selected data word stored in scratch pad memory register G0 is rotated to the right one position. In addition, the rounded off input port even number recorded in register G1 of scratch pad memory 1438 is decreased by two. Thus, when the rounded off input port number recorded in scratch pad memory register G1 is reduced to zero the bit of the selected input port data word corresponding to the input port pair selected for evaluation will be in the rightmost position. This rightmost bit is then tested to determine the type of input port circuit which has been selected. In particular, at step 2706, accumulator register 1435 is checked for an all zeroes condition. If accumulator register 1435 is not in an all zeroes condition, the call acceptance routine proceeds to step 2708 in which the input port type data information recorded in scratch pad memory register G0 is loaded into accumulator register 1435. In steps 2711 and 2713 the input port type information loaded into accumulator register 1435 is rotated one position to the right and then restored in scratch pad memory register G0. In steps 2715 and 2716 accumulator register 1435 is first loaded with all ones except for a zero in the least significant bit position and then the input port number recorded in register G1 of scratch pad memory 1438 is added to accumulator register 1435. The call acceptance routine then returns to step 2705 in which the reduced port number is stored in register G1. The decoding process in steps 2706, 2708, 2711, 2713, 2715 and 2716 is repeated until the test operation at step 2706 indicates that accumulator register 1435 contains all zeroes at which time the bit of the input port type data word stored in scratch pad memory register G0 corresponding to the selected input port circuit is shifted to the rightmost position. The call acceptance routine then jumps to step 2707 in which the rightmost or least significant bit of scratch pad memory register G0 is tested to determine the type on input port. If the bit is high, indicating a local dial input port, register G12 of scratch pad memory 1438 is loaded with a binary 2 in steps 2709 and 2712. The call acceptance routine then proceeds to the relay operation section at point B.

When the rightmost bit of scratch pad memory register G0 is low indicating a toll input port is involved, step 2707, the call instruction routine proceeds to point A. At point A, FIG. 28, the binary number one is loaded into scratch pad memory register G12 in accordance with steps 2801 and 2802.

The call acceptance routine then enters a relay operation sequence beginning with test operation 2803 in which the least significant bit of scratch pad memory register G12 is tested to determine whether a toll or local dial input port sequence should be followed. A one or high bit indicates that a toll input port sequence consisting of steps 2810 through 2815 should be followed. A low bit in the least significant bit position of scratch pad memory register G12 indicates the local dial input port sequence consisting of steps 2804 through 2809 should be followed.

The local dial input port sequence or relay operation begins with step 2804 in which accumulator register 1435 is loaded via a direct loading operation with a code that initiates release of the IS relay in the selected local dial input port circuit. The local dial input port IS relay is operated during a previously executed routine in which all local dial input ports are put in service. In step 2805, the contents of scratch pad memory register G5 containing the input port number is subtracted from accumulator register 1435 containing the IS relay release code. This operation causes the local dial input port number to be inserted into the IS relay release code. In step 2806, the IS relay in the selected local dial input port circuit is released under control of the IS relay release code stored in accumulator register 1435. Specifically, IS relay release code stored in accumulator register 1435 is transferred to control instruction decoder 217, FIG. 12 and relay control memory 212, FIG. 9. Under control of the decoded command, relay control memory 212 releases relay IS in the selected local dial input port circuit. The functions of relay IS and their relation to the operation of the local dial input port circuit are discussed previously in connection with the interface circuitry 200. In steps 2807 through 2809, a similar routine is performed in which cut-through relay LCT, FIG. 4, is operated to connect the selected local dial service observing circuit to service observing terminal 100. In particular, in steps 2807 through 2809 of FIG. 28, the LCT relay operate code is loaded into accumulator register 1435, corrected for the proper local dial input port number and used to enable relay control memory 212, FIG. 9, to operate the proper LCT relay.

At steps 2810 through 2815, FIG. 28, the call acceptance routine initiates a routine to operate the cut-through TCT relay and release the OSA relay in the selected toll input port circuit. The operations of these two relays are more fully discussed in connection with the toll interface circuitry, 300, FIG. 3.

In the case of either the selection of a local dial or toll input port, both relay operation routines advance to step 2816 in which all toll input port position busy relays PB FIG. 3 are operated. In particular, all toll input port PB relays are operated by means of a command directly loaded into relay control memory 212, FIG. 9, from the read-only memory of program storage unit PSU 1311. The operation of the PB relays makes busy all toll input port circuits except for the selected toll input port circuit to prevent conflicting service evaluation bids. The call acceptance routine, FIG. 29, next proceeds via point C and begins an operation to monitor data incoming from the service evaluation center 121 for an acceptance message. More particularly, a one-second timing interval is initiated, and a routine is entered to scan for input data from service evaluation center 121. If an acceptance message is received within the one-second timing interval, then call processing is continued and output data is formatted and sent to service evaluation center 121. If an acceptance message is not received from service evaluation center 121 within the one-second timing interval, then the bidding service observing circuit is released. Service observing terminal 100 is restored to the idle state and a new scan is begun for an additional input.

Specifically, in steps 2901 and 2902 a one-second timing code is loaded into programmable timer 1270, FIG. 12. Programmable timer 1270 the begins timing for one second. At the end of the one-second timing interval, programmable timer 1270 places a low signal on lead T3. The call acceptance routine then enters the hereinafter described service evaluation center input scan routine to scan for incoming data. The input data scan routine has two return points to the main routine, depending on whether data has been detected or not. These two entry points are depicted symbolically in step 2904. If the input data scan routine has detected no incoming data, the routine jumps to step 2907 in which programmable timer 1270 is checked by testing lead T3 to detect a timeout. If no timeout has occurred, then the instruction routine returns to step 2903. Steps 2903, 2904 and 2907 are repeated until either input data is detected and received from service evaluation center 121 or a timeout occurs. If a timeout occurs, a timeout message is sent to service evaluation center 121 at step 2908 and the selected service observing circuit is released in step 2910. If input data is received from service evaluation center 121, the call acceptance routine proceeds to step 2905 in which the input data from the service evaluation center 121 is decoded to determine whether it is an acceptance message. If an acceptance message is not received in step 2906, the call acceptance routine returns to step 2903 to scan for additional input. If an acceptance message is received, the call acceptance routine proceeds to step 2909 wherein output data collected by service observing terminal 100 is formatted and forwarded to the service evaluation center 121. Since the output data formatting and transmission routines form no part of the present invention, they are not discussed in detail herein. Combinations of the operations previously discussed are used to read data into terminal control 215 via input multiplexer 210. The read in data is then formatted into a form suitable for transmission to service evaluation center 121.

After the data has been collected, a command is received from service evaluation center 121 which causes the selected service observing circuit to be released. The call acceptance routne then proceeds to step 2910 in which the release operation takes place. In this operation, various relays are operated and released in the sequence discussed in connection with FIGS. 3 and 4 to cause the selected service observing circuit to be disconnected from service observing terminal 100 and restored to the idle condition. The control sequence is not important for an understanding of the present invention and will not be discussed further herein.

After release of the selected service observing circuit is complete, the call acceptance routine, FIG. 29, restores various internal registers to idle values. In particular, at steps 2911 and 2913 registers G5 and G12 of scratch pad memory 1438 are loaded with 1's in preparation for the service observing circuit scan routine which is entered in step 2914. Terminal control 215 then proceeds to scan for more input data.

The command decoding routine is entered during the call acceptance routine and scans for inputs from service evaluation center 121, FIGS. 23 and 24. The scan SEC command decoding routine first detects and stores input data from service evaluation center 121 and then partially decodes the stored input data to determine if any initialization or, advantageously, if any status register update commands are present. In particular, at step 2301, the command decoding routine checks for the presence of input data by testing lead T2. As previously discussed, a low signal appearing on lead T2, FIG. 12, indicates that incoming data is present in receive FIFO register 1261. If there is no input data present, the command decoding routine returns to the call acceptance routine at step 2302. If, however, input data is present, the input data is read into accumulator register 1435, FIGS. 13 and 14, via a data transfer instruction from receive FIFO register 1261 at step 2303 and stored in scratch pad memory register G0 in step 2304. The command decoding routine then proceeds to partially decode the input data to determine if certain initializing commands are present. If these commands are not present, the command decoding routine returns to the call acceptance routine for further decoding.

In particular, the input data in accumulator register 1435 is incremented at step 2305 and then tested for all zeroes in step 2309. If accumulator register 1435 contains all zeroes, this indicates that the command received was all "ones" and that more data is to follow. Accordingly, the command decoding routine jumps to step 2310 and proceeds to scan for more input by proceeding to step 2301. If accumulator register 1435 is not all zeroes at step 2309, the command decoding routine proceeds to step 2311 in which the input data in accumulator register 1435 is restored to its original value by decrementing accumulator register 1435. The input data is next tested in step 2312 to determine the presence of all zeroes. An all zero command indicates that terminal control 215 is to enter a "hold" state during which call processing operations stop and terminal control 215 waits for further instructions from service evaluation center 121 as in step 2313. The hold state is useful when service evaluation center 121 detects serious errors and maintenance action must be taken.

If the input data is not all zeroes, the input data is next checked for a command which puts all the input port interface circuits in an active state by placing all ones in the scratch pad memory registers G10 and G11. In particular, accumulator register 1435 is first loaded in step 2315 with the command 00001010 to place all input ports in service and then scratch pad memories register G0 is substracted at step 2316 from accumulator register 1435. A test is then performed at step 2317 on accumulator register 1435 to check if all zeroes are present. If accumulator register 1435 contains all zeroes, this indicates that the command received via the input data is the all input ports in-service command and in steps 2318 and 2325 scratch pad memories registers G10 and G11 are loaded with all ones. The commond decoding routine then proceeds to step 2301 to scan for more input.

If accumulator register 1435 does not have all zeroes to indicate that the place all ports in-service command was not received, accumulator register 1435 is incremented in step 2319 and tested at step 2326 to determine if a command to initialize all input ports was received. The initialization command indicates that all input ports should be placed in an out-of-service state by inserting all zeroes in scratch pad memory register G10 and G11. If accumulator register contains all zeroes in step 2326, this condition indicates that a place all input ports out-of-service command was received. Accordingly, in steps 2327 and 2329, scratch pad memory registers G10 and G11 are loaded with zeroes. The command decoding routine then returns to step 2301 to scan for additional input data.

If neither a place all input ports in service or a place all input ports out-of-service command is received, the input data from the service evaluation center 121 applies to one selected input port. In this case, the input port number is contsined in the four least significant or rightmost bits of the input data. In order to further decode the input data, the command decoding routine masks the input data to set the input port number to zero to avoid interference in the decoding of the remainder of the input data. Specifically, in steps 2328 and 2330, accumulator register 1435 is loaded with mask 11110000 and then ANDed with the input data contained in scratch pad memory register G0. The input port number appearing in the rightmost bits is then effectively masked out. The command decoding routine then proceeds to point A to continue decoding of the input data.

At point A, FIG. 24, the decoding of the input data continues with step 2410 in which the input data with the input port number masked out is stored in scratch pad memory register G1.

Advantageously, according to the principles of the invention, the illustrative command decoding routine proceeds to check if the input command received from service evaluation center 121 instructs terminal control 215 to change or update the input port status registers. As earlier set forth, scratch pad memory registers G10 and G11 and designated the input port status registers contain a bit location uniquely associated with each input port interface circuit. A one appearing in the bit location indicates that the associated input port is in an active state and service evaluation bits transmitted therefrom will be accepted by service evaluation center 121. A zero in a bit location indicates that service evaluation bits from the corresponding input port will not be accepted at service evaluation center 121. According to the principles of the invention, the contents of the status registers G10 and G11 of scratch pad memory 1438 may be dynamically changed during system operation by commands received from the service evaluation center 121. Steps 2411 through 2414 and 2420 through 2423 comprise the part of the illustrative command decoding routine which controls terminal control 215 to decode status commands and update scratch pad memory status registers G10 and G11. In particular, there are two types of status commands. One type of status command causes an input port to be placed in service and the other type of status command causes an input port to be placed out-of-service. The in-service status command has the form 0001XXXX where the X's indicate the number of the input port which is to be placed in service. The out-of-service status command has the form 0010XXXX where the X's indicate the number of the input port which is to be placed out-ofservice. However, as described previously, the masked command computed by the command decoding routine in steps 2328 2330, 2410 and stored in scratch pad memory register G1 has the input port number set to zero so that all the X's in the above commands recorded in scratch pad memory register G1 are zeroes.

Beginning at step 2411, the command decoding routine decodes the input data the determine if an in-service or out-of-service status command is present. In step 2411, accumulator register 1435 is loaded with the code 00010000 corresponding to the in-service port status command with the input port number set to zero. In steps 2412 and 2413, the contents of accumulator register 1435 is subtracted from the masked input status command stored in scratch pad memory register G1. An all zeroes condition appearing in accumulator register 1435 and detected at step 2413 indicates that the input data is an in-service input port status command. The command decoding routine jumps to step 2414 and enters the update instruction routine, point A1, to update the status of the scratch pad memory input port status registers G10 and G11. If, in step 2413, accumulator register 1435 does not contain all zeroes, the command decoding routine checks in a similar fashion for an out-of-service input port status command in steps 2421 through 2423. If an out-of-service input port status command is detected, the command decoding routine enters the update instruction routine at point B1.

If neither an out-of-service nor an in-service input port status command is detected, the input data stored in scratch pad memory register G0 is loaded into accumulator register 1435 at step 2425 and the command decoding routine, step 2426, returns to the call acceptance routine for further decoding.

An illustrative update instruction routine for changing the contents of the scratch pad memory input port status registers G10 and G11 is set forth in FIGS. 25 and 26. According to the principles of the invention, the contents of the scratch pad memory input port status registers G10 and G11 can be changed in accordance with commands sent from service evaluation center 121 to service observing terminal 100. The update instruction routine is used to insert one and zero bits into bit locations in the scratch pad memory input port status registers G10 and G11 and is entered at point A1 from the command decoding routine upon decoding an in-service input port status command. At point A1, step 2501, a mask containing a single one bit located in the rightmost location is prepared to change one selected bit of the scratch pad memory input port status register G10 and G11. This one bit will be subsequently shifted until it coincides with the bit position to be updated. The shifted mask will then be ORed with the scratch pad memory status register G10 and G11 to set the selected bit position to a logical one.

If the command decoding routine decodes an out-of-service input port status command, the update instruction routine is entered at point B1. From point B1, step 2502, a mask containing a single zero is loaded into accumulator register 1435. As hereinafter explained, the zero is shifted until it coincides with the proper bit location and the mask is then ANDed with the scratch pad memory input port status register G10 and G11 to insert a zero in the proper bit location.

After the proper mask is loaded into accumulator register 1435 it is stored in scratch pad memory register G3 in step 2505 for later use. The command input data stored in register G0 of scratch pad memory 1428 is next masked so that only the input port number remains. In particular, at steps 2506 and 2507, accumulator register 1435 is loaded with a mask 00001111 and ANDed with the command input information recorded in scratch pad memory register G0. These operations zero all bits of the input data except those containing the input port number. The update instruction routine then enters an instruction "loop" consisting of steps 2508 through 2514 in which the mask stored in scratch pad memory register G3 is shifted to bring the single 1 or 0 identifying the input port number into proper position. In particular, the input port number remaining in accumulator register 1435 after step 2507 is first tested at step 2508 for an all zero condition indicating that the shifting operation is complete. Assuming that the shifting operation is not complete, the input port number is first decremented at step 2509 and then stored in scratch pad memory registerG1, step 2510. The mask stored in register G3 of scratch pad memory 1438 is then rotated 1 position to the left and restored in scratch pad memory register G3, steps 2511, 2512, and 2513. The decremented input port number recorded in scratch pad memory register G1 is then loaded into accumulator register 1435, step 2514, and the update instruction routine returns to step 2508 to again test accumulator register 1435. Thus, on each pass through the instruction "loop" the input port number is decreased by one and the mask recorded in scratch pad memory register G3 is shifted by 1 position to the left. When the test instruction at step 2508 finally yields an all zeroes condition, the mask recorded in scratch pad memory register G3 will have been shifted a number of times equal to the input port number. This shifting operation moves the single one or zero bit identifying the input port in the mask to the proper location.

Assuming that the shifting operation has taken place and an all zeroes condition has been detected at step 2508, the update instruction routine proceeds to step 2515 in which the input port status command received from service evaluation center 121 and stored in scratch pad memory register G0 is loaded into accumulator register 1435. The update instruction routine then proceeds to step 2516 in which the third bit location of the input port status command is tested. The third bit location identifies the most significant bit of the input port number and indicates whether input ports 0 through 7 or 8 through 13 are involved. As earlier set forth, the status information for input ports 0 through 7 and for input ports 8 through 13 is stored in registers G10 and G11, respectively, of scratch pad memory 1438. Thus, the test at step 2516 indicates which of scratch pad memory registers G10 or G11 is involved. If the tested third bit location is low thereby indicating input ports 0 through 7 and scratch pad memory register G10 is involved, the update instruction routine jumps to point C discussed hereinafter.

If, on the other hand, the test of the third bit location at step 2516 detects a high bit indicating that input ports 8 through 13 and scratch pad memory register G11 is involved, then the update instruction routine proceeds to test the fourth bit location at step 2518. The fourth bit location of the input port status command indicates whether the selected input port is to be placed in or out of service. A logical 1 or high bit indicates that the selected input port is to be placed in-service. In this case, the update instruction routine jumps to steps 2519 and 2520 in which the shifted mask recorded in scratch pad memory register G3 and containing a one bit in the proper location is ORed with the contents of scratch pad memory register G11 to cause a one to be inserted in the selected input port location and place the associated service observing circuit in an in-service state. The update instruction routine then proceeds to point D as discussed hereinafter.

If the fourth bit of accumulator register 1435 tests low in step 2518, this indicates the selected input port is to be placed out-of-service. In this case, at steps 2522 and 2523 the shifted mask stored in scratch pad memory register G3 and containing a single zero is ANDed with scratch pad memory register G11 to place a zero in the proper bit location in scratch pad memory register G11 to place the corresponding service observing circuit out of service. The update instruction routine then proceeds to point D.

At point D, FIG. 26, scratch pad memory register G11 is updated when the contents of accumulator register 1435 containing the corrected bit location are stored in scratch pad memory register G11. The update instruction routine then proceeds to step 2605 and returns to the command decoding routine, FIG. 23, to detect more input command information from service evaluation center 121.

Point C in FIG. 26 is entered from step 2516, FIG. 25, when a test of the third bit location of the input port status command indicates input ports 0 through 7 and scratch pad memory register G10 is involved. By a series of operations equivalent to those described for scratch pad memory register G11, scratch pad memory register G10 is updated with the proper information in the selected bit location. The update instruction routine thus proceeds to step 2605 and returns to the command decoding routine, FIG. 23, for other service evaluation center 121 commands.

SUMMARY

It is obvious from the foregoing that the facility, economy, and efficiency of service observing systems may be substantially enhanced by the provision of a service observing system arranged to dynamically control a plurality of remote service observing terminals to supervise incoming service observations. It is further obvious from the foregoing that the aforesaid service observing system arrangement for enabling a centralized service evaluation center to control and update a plurality of remote service observing terminals to determine an operational status of associated service observing circuits facilitates the handling of service observing data collected from a plurality of service observed circuits.

While the apparatus of our invention has been disclosed in a specific telephone service observing system, it is to be understood that such an embodiment is intended to be illustrative of the principles of our invention in that numerous other arrangements may be devised by those skilled in the art without departing from the spirit and scope of the invention.

What is claimed is:

1. A service observing terminal for selectively collecting information from one of a plurality of service observing circuits and for transmitting said information to an evaluation center, said terminal including means for concurrently scanning groups of said service observing circuits to detect bids for evaluation requests, memory means having a plurality of addressable memory locations associated with said service observing circuits for determining an operational status of said service observing circuits, means responsive to commands received from said evaluation center for decoding said commands to obtain addresses of said memory locations and service status indications to be stored in selected ones of said addressable memory locations associated with each service observing circuit, said service status indications having a first state identifying when said evaluation center will accept an evaluation request and a second state identifying when said evaluation center will not accept an evaluation request from the service observing circuits, means controlled by said memory means for selecting one of a plurality of said bidding service observing circuits on a priority basis, each of said service observing circuits having first status state indications stored in one of said addressable memory locations associated therewith, means enabled by said selecting means for transmitting an evaluation request received bid signal to said evaluation center, and means enabled by receipt of an evaluation request bid accepted signal from said evaluation center within a predetermined interval of time of transmission of said received bid signal for coupling said selected one service observing circuit to said evaluation center and forwarding information thereto.

2. A service observing terminal according to claim 1 wherein said concurrently scanning means comprises means having a register location associated with each of said service observing circuits and responsive to a bid for an evaluation request from one of said service observing circuits for storing an evaluation bid in the register location associated with said one service observing circuit.

3. A service observing terminal according to claim 2 wherein said decoding means comprises means responsive to said decoded commands for computing a correction code, means responsive to said decoded commands for combining the service status states stored in said memory means with said correction code to obtain corrected service status states, and means for recording said corrected service status states in said memory means.

4. A service observing terminal according to claim 3 wherein said selecting and transmitting means comprises means responsive to said evaluation request bids generated by said service observing circuits for logically combining said storing means with said memory means to detect selected evaluation request bids generated by ones of said service observing circuits having a first status state associated therewith, and means responsive to the detection of selected service evaluation request bids for accepting one of said selected evaluation request bids to be transmitted to said evaluation center.

5. A service observing terminal according to claim 4 further comprising means for collecting data from said service observing circuits, and means responsive to said accepting means for connecting the selected service observing circuit having generated said selected evaluation request bid to said data collecting means.

6. A service observing terminal according to claim 5 further comprising, timing means activated by said selecting bid transmitting means for generating a timeout signal after a predetermined time interval has elapsed, and control means for disconnecting the service observing circuit having generated said transmitted selected evaluation request bid from sid data collecting means when the timeout signal is generated by said timing means before an acceptance command is received from said evaluation center.

7. a service observing terminal according to claim 6 wherein said combining means comprises mans responsive to the service status indications decoded by said decoding means being in a first and second command state for logically ORing and Anding respectively said correction code with the service status indication states stored in said memory means.

8. A service observing terminal according to claim 7 wherein said computing means comprises a correction register having a storage location corresponding to each of said addressable memory locations, mans responsive to the service status states decoded by said decoding means being in the first command state for inserting a single one bit into one of the storage locations and for inserting zero bits into the remaining storage locations, means responsive to the service status states decoded by said decoding means being in the second command state for inserting a single zero bit into one of the storage locations and for inserting one bits into the remaining storage locations, and means responsive to the addresses decoded by said decoding means for shifting said correction register to move the single one and the single zero bits into a storage location corresponding to one of said memory locations.

9. A service observing terminal for use in selectively collecting call information from a plurality of service observation circuits and processing the call information at an evaluation center, said terminal comprising means for storing information, means responsive to commands received from said evaluation center for decoding said commands and selectively recording status information identifying operational states of ones of said service observation circuits in said storing means, means responsive to said decoding and selectively recording means for selecting on a priority basis and in accordance with the recorded status information one service observation circuit from a plurality of service observation circuits each having generated an evaluation request bid for information processing, and means responsive to said selecting means for transmitting a bid received signal to said evaulation center and for coupling said one selected service observation circuit to said evaluation center in response to a bid accepted signal received therefrom within a predetermined interval of time.

10. A service observing terminal according to claim 9 wherein said storing means comprises a memory register having a plurality of locations each associated with one of said service observation circuits, and means responsive to said evaluation center commands for storing status information having a first state in ones of the memory register locations associated with selected ones of said service observation circuits and for storing status information having a second state in other locations.

11. A service observing terminal according to claim 10 wherein said selecting means comprises a request register having a location associated with each of said memory register locations, means responsive to said generated information processing bids for inserting a bid code into each of said request register locations corresponding to one of said service observation circuits having generated an information processing bid, and mans responsive to the status information stored in said memory register for correcting bid information stored in said request register by removing bid codes from request register locations corresponding to a memory register location storing status information having a second state.

12. A service observing terminal according to claim 11 further comprising means responsive to the corrected bid information stored in said request register for collecting call information from the selected service observation circuit, and means for forwarding the collected call information to said evaluation center.

13. In a service observing terminal arranged for collecting call information from a plurality of service observing circuits and for sending the collected call information to centrally located equipment, said terminal including means for concurrently scanning groups of the service observing circuits to detect service requests generated thereby, and means for forwarding the call information gathered from the service observing circuits to the centrally located equipment, the invention comprising memory means having a plurality of addressable storage locations, means responsive to commands generated by the centrally located equipment for decoding said commands and selectively storing a service status indication associated with each service observing circuit in the addressable storage locations, said service indication having a first state denoting when the centrally located equipment will accept service requests from the associated service observing circuit and a second state denoting when the centrally located equipment will not accept service requests from said associated service observing circuit, means responsive to said memory means for preferentially selecting one of a group of said service observing circuits each having generated a service request and each associated with a sevice status indication first state stored in the addressable storage location associated with the service observing circuit means responsive to said memory means for forwarding a bid signal in response to the service request generated by said selected one service observing circuit to said centrally located equipment, and means enabled by the receipt of a centrally located equipment bid accepted signal within a predetermined interval of time for coupling said selected one service observing circuit to said centrally located equipment to forward call information thereto.

14. In a service observing terminal according to claim 13, the invention further comprising means responsive to the service request from said selected one of the service observing circuits associated with the service status indication first state for generating a code identifying said one service observing circuit and means responsive to the generated code for sending the generated code to the centrally located equipment together with the service request.

15. In a service observing terminal, the invention according to claim 14 wherein said decoding and selectively storing means comprises means responsive to the centrally located equipment generated commands for decoding the generated commands to determine addresses of selected ones of the memory addressable storage locations and the corresponding states of the service status indications to be stored therein, and means responsive to the decoded address and service status indications for replacing service status indications previously stored in said selected memory addressable storage locations with said decoded service status indications.

16. In a service observing terminal, the invention according to claim 15, wherein said preferentially selecting means comprises a scan register having a plurality of storage locations, each storage location corresponding to one of said service observing circuits, means responsive to the service requests generated by the service observing circuits for loading a request code indication in the scan register locations corresponding to the service observing circuit requesting service, and means responsive to request code indications stored in said scan register and to service status indications stored in said memory means for selectively determining a requesting one of the service observing circuits having a first state associated therewith.

17. In a service observing terminal, the invention according to claim 16, wherein said selectively determining means comprises means for logically ANDing the request code indications and the service status indications stored in said memory means to identify ones of the service requesting service observing circuits, and means for successively examining each of the identified service requesting service observing circuits and identifying one thereof.

18. A method for operating a service observing terminal including memory means having a plurality of addressable storage locations and register means to collect call information from a plurality of service observing circuits and transmit the collected call information to remote equipment, said method comprising the steps of:

concurrently scanning groups of the service observing circuits to detect evaluation requests generated thereby, receiving commands from the remote equipment, said commands specifying addresses of the storage locations and a service status associated with each one of the service observing circuits, said service status having a first state identifying when the remote equipment will accept evaluation requests from the associated service observing circuit and a second state identifying when said remote equipment will not accept evaluation requests from the associated service observing circuit, storing the received service status states in selected ones of the memory means addressable storage locations associated with ones of the service observing circuits, selecting one of a plurality of the service observing circuits each having generated a service request and each having a service status first state stored in one of said addressable storage locations associated with the service observing circuit, coupling said selected one service observing circuit to the remote equipment, and forwarding call information collected from said selected one service observing circuit having generated an evaluation request to said remote equipment in accordance with a service status first state stored in one of said memory means addressable storage locations associated with said selected service observing circuit.

19. A method for operating a service observing terminal according to claim 18 wherein the step of storing service status states further comprises the steps of:

decoding said remote equipment commands to determine an address of a selected one of the memory means addressable storage locations and the identity of the service status state to be accorded the associated service observing circuit, computing a correction code from said determined address and said service status state identity, logically combining service status states previously stored in the memory means with said computed correction code to obtain corrected service status states, and recording said corrected service status states in said memory means addressable storage locations.

20. A method for operating a service observing terminal according to claim 18 wherein the steps of selecting said one service observing circuit further comprising the steps of:

registering detected evaluation requests generated by ones of the service observing circuits in said register means, logically combining the detected evaluation requests registered in the register means with the service status states stored in the memory means to detect service evaluation requests generated by selected service observing circuits having a first status state associated therewith, preferentially selecting one of said service observing circuits having a first state associated therewith and having generated an evaluation request, and transmitting the selected evaluation request to the remote equipment.

21. A method for operating a service observing terminal to collect call information from a plurality of service observation circuits and send the collected call information to remote processing equipment for processing and which terminal includes a storage means, said method comprising the steps of:

receiving and decoding commands transmitted from the processing equipment, said commands including status information identifying selected ones of the service observing circuits, storing said status information in the storage means, concurrently scanning groups of said service observation circuits to detect service evaluation bids generated by ones of said service observation circuits identified by said stored status information, selecting on a priority basis one of said bidding service observation circuits, sending a bid for call information processing generated by the selected service observing circuit to said processing equipment, and coupling said selected service observation circuit to the remote processing equipment in response to a bid accepted signal received within a predetermined interval of time from said remote processing equipment.

22. A method for operating a service observing terminal according to claim 21 wherein the step of concurrently scanning the service observation circuits further comprises the steps of:

registering the service evaluation bids generated by each of said service observing circuits in the storage means, logically combining said service evaluation bids registered in the storage means with said status information stored in the storage means to identify service evaluation bids from said scanned service observing circuits.

* * * * *